(12) United States Patent
Umezaki

(10) Patent No.: US 9,941,308 B2
(45) Date of Patent: Apr. 10, 2018

(54) DISPLAY DEVICE AND ELECTRONIC DEVICE INCLUDING THE SAME

(71) Applicant: Semiconductor Energy Laboratory Co., Ltd., Atsugi-shi, Kanagawa-ken (JP)

(72) Inventor: Atsushi Umezaki, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 15/145,908

(22) Filed: May 4, 2016

(65) Prior Publication Data

US 2016/0247838 A1    Aug. 25, 2016

Related U.S. Application Data

(63) Continuation of application No. 14/552,547, filed on Nov. 25, 2014, now Pat. No. 9,337,184, which is a
(Continued)

(30) Foreign Application Priority Data

Nov. 28, 2008    (JP) ................................ 2008-304124

(51) Int. Cl.
*G02F 1/136*    (2006.01)
*H01L 27/12*    (2006.01)
(Continued)

(52) U.S. Cl.
CPC ........ *H01L 27/1255* (2013.01); *G02F 1/1368* (2013.01); *G02F 1/13624* (2013.01);
(Continued)

(58) Field of Classification Search
CPC   G02F 1/13624; G09G 3/3648; G09G 3/3655; G09G 3/3647; G09G 3/3685; G09G 3/3677; G09G 3/3688
(Continued)

(56) References Cited

U.S. PATENT DOCUMENTS 5,003,356 A    3/1991   Wakai et al.
5,032,883 A    7/1991   Wakai et al.
(Continued)

FOREIGN PATENT DOCUMENTS

CN    001514284 A    7/2004
CN    101017291 A    8/2007
(Continued)

OTHER PUBLICATIONS

Chinese Office Action (Application No. 200980147422.9) dated Jan. 5, 2013.
(Continued)

*Primary Examiner* — Phu Vu
(74) *Attorney, Agent, or Firm* — Fish & Richardson P.C.

(57) ABSTRACT

It is an object to decrease the number of transistors connected to a capacitor. In a structure, a capacitor and one transistor are included, one electrode of the capacitor is connected to a wiring, and the other electrode of the capacitor is connected to a gate of the transistor. Since a clock signal is input to the wiring, the clock signal is input to the gate of the transistor through the capacitor. Then, on/off of the transistor is controlled by a signal which synchronizes with the clock signal, so that a period when the transistor is on and a period when the transistor is off are repeated. In this manner, deterioration of the transistor can be suppressed.

18 Claims, 34 Drawing Sheets

Related U.S. Application Data continuation of application No. 13/769,999, filed on Feb. 19, 2013, now Pat. No. 8,902,374, which is a continuation of application No. 12/614,852, filed on Nov. 9, 2009, now Pat. No. 8,902,144.

(51) Int. Cl.

| | | |
|---|---|---|
| *G02F 1/1362* | (2006.01) | |
| *G02F 1/1343* | (2006.01) | |
| *G09G 3/3266* | (2016.01) | |
| *G09G 3/34* | (2006.01) | |
| *G09G 3/36* | (2006.01) | |
| *G11C 19/28* | (2006.01) | |
| *H01L 27/06* | (2006.01) | |
| *H01L 27/32* | (2006.01) | |
| *H01L 29/786* | (2006.01) | |
| *G02F 1/1368* | (2006.01) | |

(52) U.S. Cl.
CPC .. *G02F 1/134309* (2013.01); *G02F 1/136286* (2013.01); *G09G 3/3266* (2013.01); *G09G 3/3413* (2013.01); *G09G 3/3614* (2013.01); *G09G 3/3648* (2013.01); *G11C 19/28* (2013.01); *H01L 27/0629* (2013.01); *H01L 27/124* (2013.01); *H01L 27/1222* (2013.01); *H01L 27/1225* (2013.01); *H01L 27/3262* (2013.01); *H01L 27/3265* (2013.01); *H01L 27/3276* (2013.01); *H01L 29/7869* (2013.01); *H01L 29/78663* (2013.01); *H01L 29/78672* (2013.01); *G09G 2300/0426* (2013.01); *G09G 2310/0235* (2013.01); *G09G 2310/0251* (2013.01); *G09G 2310/0286* (2013.01); *G09G 2310/061* (2013.01); *G09G 2310/08* (2013.01); *G09G 2320/0252* (2013.01); *G09G 2330/021* (2013.01)

(58) Field of Classification Search
USPC .......................................................... 349/48
See application file for complete search history.

(56) References Cited

U.S. PATENT DOCUMENTS

| | | |
|---|---|---|
| 5,055,899 A | 10/1991 | Wakai et al. |
| 5,166,085 A | 11/1992 | Wakai et al. |
| 5,229,644 A | 7/1993 | Wakai et al. |
| 5,327,001 A | 7/1994 | Wakai et al. |
| 5,754,266 A | 5/1998 | Ohta et al. |
| 5,828,262 A | 10/1998 | Rees |
| 5,929,958 A | 7/1999 | Ohta et al. |
| 5,956,111 A | 9/1999 | Ohta et al. |
| 5,978,059 A | 11/1999 | Ohta et al. |
| 6,064,460 A | 5/2000 | Ohta et al. |
| 6,201,590 B1 | 3/2001 | Ohta et al. |
| 6,417,906 B2 | 7/2002 | Ohta et al. |
| 6,420,988 B1 | 7/2002 | Azami et al. |
| 6,606,045 B2 | 8/2003 | Azami et al. |
| 6,774,412 B2 | 8/2004 | Komaki |
| 6,774,419 B2 | 8/2004 | Kimura |
| 6,906,385 B2 | 6/2005 | Moon et al. |
| 6,980,194 B2 | 12/2005 | Tobita |
| 7,006,030 B2 | 2/2006 | Oki |
| 7,023,410 B2 | 4/2006 | Lee et al. |
| 7,057,588 B2 | 6/2006 | Asano et al. |
| 7,109,966 B2 | 9/2006 | Abe et al. |
| 7,151,015 B2 | 12/2006 | Suzawa et al. |
| 7,161,177 B2 | 1/2007 | Suzawa et al. |
| 7,405,716 B2 | 7/2008 | Lee et al. |
| 7,414,694 B2 | 8/2008 | Furukoshi |
| 7,447,292 B2 | 11/2008 | Hsu et al. |
| 7,486,269 B2 | 2/2009 | Moon |
| 7,492,853 B2 | 2/2009 | Tobita |
| 7,521,349 B2 | 4/2009 | Komaki |
| 7,535,027 B2 | 5/2009 | Moon et al. |
| 7,629,612 B2 | 12/2009 | Kimura |
| 7,671,282 B2 | 3/2010 | Lee |
| 7,674,650 B2 | 3/2010 | Akimoto et al. |
| 7,692,617 B2 | 4/2010 | Kim et al. |
| 7,732,819 B2 | 6/2010 | Akimoto et al. |
| 7,738,623 B2 | 6/2010 | Tobita |
| 7,859,510 B2 | 12/2010 | Umezaki |
| 7,872,722 B2 | 1/2011 | Kimura |
| 7,910,490 B2 | 3/2011 | Akimoto et al. |
| 7,932,521 B2 | 4/2011 | Akimoto et al. |
| 7,936,332 B2 | 5/2011 | Lee et al. |
| 7,947,981 B2 | 5/2011 | Yamazaki et al. |
| 7,978,274 B2 | 7/2011 | Umezaki et al. |
| 8,008,690 B2 | 8/2011 | Moon et al. |
| 8,054,279 B2 | 11/2011 | Umezaki et al. |
| 8,102,340 B2 | 1/2012 | Lee et al. |
| 8,130,354 B2 | 3/2012 | Kimura |
| 8,194,026 B2 | 6/2012 | Lee et al. |
| 8,212,257 B2 | 7/2012 | Kimura |
| 8,274,077 B2 | 9/2012 | Akimoto et al. |
| 8,456,396 B2 | 6/2013 | Umezaki |
| 8,462,100 B2 | 6/2013 | Umezaki |
| 8,466,463 B2 | 6/2013 | Akimoto et al. |
| 8,470,647 B2 | 6/2013 | Suzawa et al. |
| 8,493,309 B2 | 7/2013 | Tobita |
| 8,520,159 B2 | 8/2013 | Umezaki et al. |
| 8,586,991 B2 | 11/2013 | Kimura |
| 8,610,179 B2 | 12/2013 | Moon et al. |
| 8,629,069 B2 | 1/2014 | Akimoto et al. |
| 8,643,586 B2 | 2/2014 | Umezaki |
| 8,669,550 B2 | 3/2014 | Akimoto et al. |
| 8,780,307 B2 | 7/2014 | Kimura |
| 8,790,959 B2 | 7/2014 | Akimoto et al. |
| 8,796,069 B2 | 8/2014 | Akimoto et al. |
| 8,816,949 B2 | 8/2014 | Tobita |
| 8,841,680 B2 | 9/2014 | Kimura |
| 8,908,115 B2 | 12/2014 | Umezaki et al. |
| 8,964,156 B2 | 2/2015 | Kimura |
| 9,099,562 B2 | 8/2015 | Akimoto et al. |
| 9,184,183 B2 | 11/2015 | Umezaki |
| 9,263,468 B2 | 2/2016 | Umezaki et al. |
| 9,310,657 B2 | 4/2016 | Kim et al. |
| 9,335,599 B2 | 5/2016 | Umezaki |
| 9,606,408 B2 | 3/2017 | Umezaki et al. |
| 9,684,215 B2 | 6/2017 | Umezaki |
| 9,829,761 B2 | 11/2017 | Kimura |
| 2003/0169224 A1 | 9/2003 | Tobita |
| 2004/0150610 A1 | 8/2004 | Zebedee et al. |
| 2005/0008114 A1 | 1/2005 | Moon |
| 2005/0083259 A1 | 4/2005 | Kim et al. |
| 2005/0264507 A1 | 12/2005 | Jang et al. |
| 2006/0001637 A1 | 1/2006 | Pak et al. |
| 2006/0056267 A1 | 3/2006 | Kim et al. |
| 2006/0291610 A1 | 12/2006 | Lo et al. |
| 2007/0040792 A1 | 2/2007 | Kwag et al. |
| 2007/0046619 A1 | 3/2007 | Sano et al. |
| 2007/0171179 A1 | 7/2007 | Morosawa |
| 2007/0247932 A1 | 10/2007 | Tobita |
| 2007/0274433 A1 | 11/2007 | Tobita |
| 2007/0296662 A1 | 12/2007 | Lee et al. |
| 2008/0007296 A1 | 1/2008 | Umezaki |
| 2008/0062112 A1 | 3/2008 | Umezaki |
| 2008/0080661 A1 | 4/2008 | Tobita |
| 2008/0088555 A1 | 4/2008 | Shin et al. |
| 2008/0224985 A1 | 9/2008 | Jang |
| 2008/0231617 A1 | 9/2008 | Miyake et al. |
| 2008/0308805 A1 | 12/2008 | Akimoto et al. |
| 2009/0224245 A1 | 9/2009 | Umezaki |
| 2010/0026619 A1 | 2/2010 | Umezaki |
| 2011/0104851 A1 | 5/2011 | Akimoto et al. |
| 2011/0121290 A1 | 5/2011 | Akimoto et al. |
| 2015/0340513 A1 | 11/2015 | Akimoto et al. |
| 2016/0223850 A1 | 8/2016 | Kim et al. |
| 2017/0176794 A1 | 6/2017 | Umezaki et al. |

(56) References Cited

U.S. PATENT DOCUMENTS

FOREIGN PATENT DOCUMENTS

| | | | |
|---|---|---|---|
| CN | 101064085 A | 10/2007 | |
| CN | 101122720 A | 2/2008 | |
| EP | 0732612 A | 9/1996 | |
| EP | 1006664 A | 6/2000 | |
| EP | 1202108 A | 5/2002 | |
| EP | 1670142 A | 6/2006 | |
| EP | 1770788 A | 4/2007 | |
| EP | 1870877 A | 12/2007 | |
| EP | 1887554 A | 2/2008 | |
| EP | 1895545 A | 3/2008 | |
| EP | 1995787 A | 11/2008 | |
| EP | 1998373 A | 12/2008 | |
| EP | 1998374 A | 12/2008 | |
| EP | 1998375 A | 12/2008 | |
| JP | 63-302546 A | 12/1988 | |
| JP | 64-082674 A | 3/1989 | |
| JP | 05-090427 A | 4/1993 | |
| JP | 09-307442 A | 11/1997 | |
| JP | 2002-055660 A | 2/2002 | |
| JP | 2003-058097 A | 2/2003 | |
| JP | 2003-273228 A | 9/2003 | |
| JP | 2003-338749 A | 11/2003 | |
| JP | 2004-274050 A | 9/2004 | |
| JP | 2004-335876 A | 11/2004 | |
| JP | 2005-050502 A | 2/2005 | |
| JP | 2005-122152 A | 5/2005 | |
| JP | 2005-522734 | 7/2005 | |
| JP | 2006-024350 A | 1/2006 | |
| JP | 2006-039524 A | 2/2006 | |
| JP | 2006-079041 A | 3/2006 | |
| JP | 2006-286990 A | 10/2006 | |
| JP | 2006-309893 A | 11/2006 | |
| JP | 2007-123861 A | 5/2007 | |
| JP | 2007-151092 A | 6/2007 | |
| JP | 2007-207413 A | 8/2007 | |
| JP | 2007-242129 A | 9/2007 | |
| JP | 2007-250052 A | 9/2007 | |
| JP | 2007-317288 A | 12/2007 | |
| JP | 2008-003602 A | 1/2008 | |
| JP | 2008-083692 A | 4/2008 | |
| JP | 2008-112550 A | 5/2008 | |
| JP | 2008-251094 A | 10/2008 | |
| KR | 2006-0134615 A | 12/2006 | |
| KR | 2007-0105271 A | 10/2007 | |
| KR | 2008-0026391 A | 3/2008 | |
| TW | 518752 | 1/2003 | |
| TW | 200502891 | 1/2005 | |
| TW | 200529727 | 9/2005 | |
| TW | I240902 | 10/2005 | |
| TW | I241552 | 10/2005 | |
| TW | I249905 | 2/2006 | |
| TW | 200611039 | 4/2006 | |
| TW | 200735014 | 9/2007 | |
| TW | I286338 | 9/2007 | |
| TW | 200802270 | 1/2008 | |
| TW | 200826030 | 6/2008 | |
| TW | 200826052 | 6/2008 | |
| TW | 200828237 | 7/2008 | |
| TW | 200834197 | 8/2008 | |
| TW | 200834503 | 8/2008 | |
| TW | 200845396 | 11/2008 | |
| WO | WO-03/087921 | 10/2003 | |
| WO | WO-2007/080813 | 7/2007 | |

OTHER PUBLICATIONS

International Search Report (Application No. PCT/JP2009/069142) dated Dec. 15, 2009.
Written Opinion (Application No. PCT/JP2009/069142) dated Dec. 15, 2009.
Taiwanese Office Action (Application No. 98140369) dated Sep. 24, 2014.
Korean Office Action (Application No. 2011-7014779) dated Jun. 30, 2015.
Chinese Office Action (Application No. 201410389911.8) dated Oct. 28, 2015.
Korean Office Action (Application No. 2016-7025809) dated Dec. 13, 2016.
Korean Office Action (Application No. 2016-7011030) dated Jul. 25, 2016.
Taiwanese Office Action (Application No. 106119122) dated Jan. 4, 2018.
Taiwanese Office Action (Application No. 106140334) dated Jan. 5, 2018.

PERIOD T1

PERIOD T2

PERIOD T3

PERIOD T4

PERIOD T5

PERIOD T1

PERIOD T2

PERIOD T3

PERIOD T4

PERIOD T5

FIG. 27A
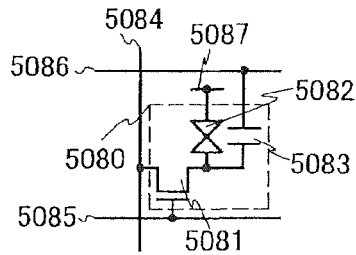
FIG. 27B
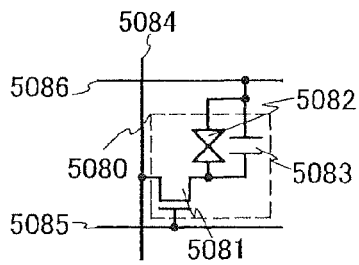
FIG. 27C
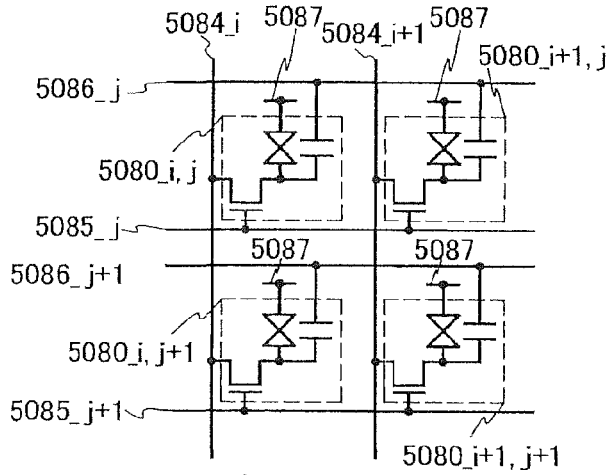
FIG. 27E
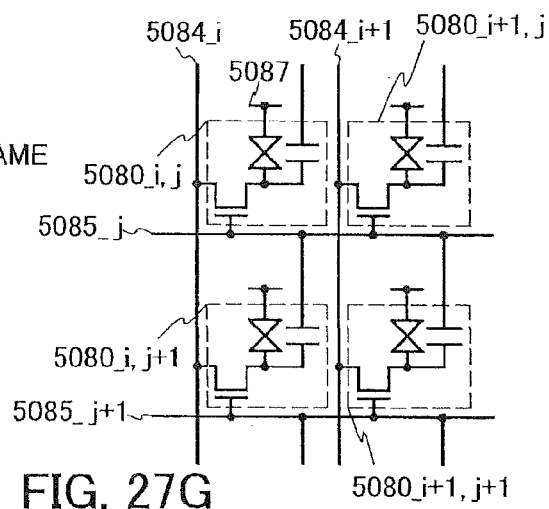
FIG. 27D
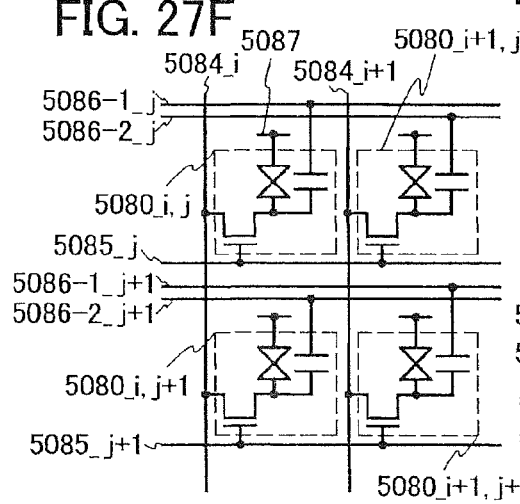
FIG. 27F
FIG. 27G
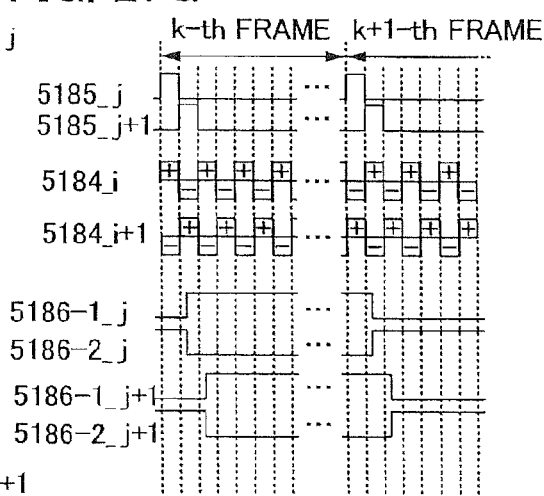

DISPLAY DEVICE AND ELECTRONIC DEVICE INCLUDING THE SAME

CROSS-REFERENCE TO RELATED APPLICATIONS

This application is a continuation of U.S. application Ser. No. 14/552,547, filed Nov. 25, 2014, now allowed, which is a continuation of U.S. application Ser. No. 13/769,999, filed Feb. 19, 2013, now U.S. Pat. No. 8,902,374, which is a continuation of U.S. application Ser. No. 12/614,852, filed Nov. 9, 2009, now U.S. Pat. No. 8,902,144, which claims the benefit of a foreign priority application filed in Japan as Serial No. 2008-304124 on Nov. 28, 2008, all of which are incorporated by reference.

TECHNICAL FIELD

The present invention relates to a semiconductor device, a display device, a liquid crystal display device, a driving method thereof, or a producing method thereof. In specific, the present invention relates to a semiconductor device, a display device, or a liquid crystal display device including a driver circuit formed over the same substrate as a pixel portion, or a driving method of the device. Alternatively, the present invention relates to an electronic device including the device.

BACKGROUND ART

In recent years, with the increase of large display devices such as liquid crystal televisions, display devices have been actively developed. In specific, a technique of forming a driver circuit such as a gate driver over the same substrate as a pixel portion by using a transistor formed using a non-single-crystal semiconductor has been actively developed because the technique makes a great contribution for reduction in cost and improvement in reliability.

However, deterioration such as increase in threshold voltage or decrease in mobility is caused in the transistor formed using the non-single-crystal semiconductor. As the deterioration of the transistor advances, there is a problem in that the driver circuit becomes hard to operate and an image cannot be displayed. Accordingly, Patent Document 1 discloses a structure of a shift register which can suppress the deterioration of the transistor. In Patent Document 1, one electrode of a capacitor is connected to a wiring to which a clock signal is input and the other electrode of the capacitor is connected to gates of two transistors, so that the potential of the other electrode of the capacitor is increased or decreased by making the potential synchronize with the clock signal. In this manner, by utilizing capacitive coupling of the capacitor, signals that synchronize with the clock signal are generated in the gates of the two transistors. Then, by using the signals that synchronize with the clock signal, on and off of the transistors is controlled. Accordingly, since a period when the transistor is on and a period when the transistor is off are repeated, the deterioration of the transistors can be suppressed.

REFERENCE

[Patent Document 1] Japanese Published Patent Application No. 2006-24350

However, in Patent Document 1, since the other electrode of the capacitor is connected to the gates of the two transistors, there is a problem in that the parasitic capacitance of a node connected to the capacitor is high. Accordingly, there is a problem in that the potential in an H level of a signal that synchronizes with a clock signal becomes low. In that case, there is a problem in that a time during which a transistor can be turned is shortened if the threshold voltage of the transistor increases. That is, there is a problem in that the life of a shift register is shortened. Alternatively, since the parasitic capacitance of the node connected to the capacitor is high, there is a problem in that the capacitance value of the capacitor should be large. Accordingly, since an area where the one electrode of the capacitor and the other electrode of the capacitor overlap with each other needs to be large, there is a problem in that the layout area of the capacitor becomes large.

In Patent Document 1, since the area of the capacitor needs to be large, there is a problem in that short circuit between the one electrode and the other electrode tends to be caused due to dust or the like. As a result, there is a problem in that yield is decreased and cost is increased.

In Patent Document 1, since the capacitance value of the capacitor needs to be large, there is a problem in that delay or distortion of a signal (e.g., a clock signal or an inverted clock signal) supplied to the capacitor becomes obvious. Alternatively, there is a problem in that power consumption is increased.

Since a circuit having high current driving capability is used as a circuit for outputting a signal to be supplied to the capacitor, there is a problem in that an outside circuit (hereinafter also referred to as an external circuit) becomes large. Alternatively, there is a problem in that a display device becomes large.

In Patent Document 1, a period when a gate of a pull-up transistor Tu is in a floating state exists. Accordingly, noise or the like is caused because the potential of the gate of the pull-up transistor Tu is not stable. Therefore, there is a problem in that the shift register malfunctions.

In view of the foregoing problems, it is an object to decrease the number of transistors connected to a capacitor. Alternatively, it is an object to decrease the parasitic capacitance of a transistor connected to the capacitor. Alternatively, it is an object to increase the potential in an H level of a signal which synchronizes with a clock signal. Alternatively, it is an object to decrease a layout area. Alternatively, it is an object to extend life. Alternatively, it is an object to decrease delay or distortion of a signal. Alternatively, it is an object to reduce power consumption. Alternatively, it is an object to decrease the adverse effect of noise. Alternatively, it is an object to suppress or relieve deterioration of a transistor. Alternatively, it is an object to suppress malfunction. Alternatively, it is an object to prevent short circuit between one electrode of a capacitor and the other electrode of the capacitor. Alternatively, it is an object to decrease the current driving capability of an outside circuit. Alternatively, it is an object to reduce the size of an outside circuit. Alternatively, it is an object to reduce the size of a display device. Note that the descriptions of these problems do not disturb the existence of other problems.

DISCLOSURE OF INVENTION

In a structure, a capacitor and one transistor are included, one electrode of the capacitor is connected to a wiring, and the other electrode of the capacitor is connected to a gate of the transistor. Since a clock signal is input to the wiring, the clock signal is input to the gate of the transistor through the capacitor. Then, on/off of the transistor is controlled by a signal which synchronizes with the clock signal, so that a period when the transistor is on and a period when the transistor is off are repeated. In this manner, deterioration of the transistor can be suppressed.

According to one exemplary embodiment of the present invention, a liquid crystal display device includes a driver circuit and a pixel. The pixel includes a liquid crystal element. The driver circuit includes a first transistor, a second transistor, a third transistor, a fourth transistor, and a capacitor. A first terminal of the first transistor is electrically connected to a first wiring. A second terminal of the first transistor is electrically connected to a second wiring. A first terminal of the second transistor is electrically connected to the second wiring. A second terminal of the second transistor is electrically connected to a gate of the first transistor. A gate of the second transistor is electrically connected to the first wiring. A first terminal of the third transistor is electrically connected to a third wiring. A second terminal of the third transistor is electrically connected to the gate of the first transistor. A first terminal of the fourth transistor is electrically connected to the third wiring. A second terminal of the fourth transistor is electrically connected to a gate of the third transistor. A gate of the fourth transistor is electrically connected to the gate of the first transistor. One electrode of the capacitor is electrically connected to the first wiring. The other electrode of the capacitor is electrically connected to the gate of the third transistor.

Note that a variety of switches can be used as a switch. For example, an electrical switch, a mechanical switch, or the like can be used. That is, any element can be used as long as it can control a current flow, without limitation to a certain element. For example, a transistor (e.g., a bipolar transistor or a MOS transistor), a diode (e.g., a PN diode, a PIN diode, a Schottky diode, an MIM (metal insulator metal) diode, an MIS (metal insulator semiconductor) diode, or a diode-connected transistor), or the like can be used as a switch. Alternatively, a logic circuit in which such elements are combined can be used as a switch.

An example of a mechanical switch is a switch formed using a MEMS (micro electro mechanical system) technology, such as a digital micromirror device (DMD).

Note that a CMOS switch may be used as a switch by using both an n-channel transistor and a p-channel transistor.

Note that when it is explicitly described that "A and B are connected", the case where A and B are electrically connected, the case where A and B are functionally connected, and the case where A and B are directly connected are included therein. Here, each of A and B is an object (e.g., a device, an element, a circuit, a wiring, an electrode, a terminal, a conductive film, or a layer). Accordingly, another element may be interposed between elements having a connection relation illustrated in drawings and texts, without limitation to a predetermined connection relation, for example, the connection relation illustrated in the drawings and the texts.

For example, in the case where A and B are electrically connected, one or more elements which enable electrical connection between A and B (e.g., a switch, a transistor, a capacitor, an inductor, a resistor, and/or a diode) may be connected between A and B. Alternatively, in the case where A and B are functionally connected, one or more circuits which enable functional connection between A and B (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a dc-dc converter, a step-up dc-dc converter, or a step-down dc-dc converter) or a level shifter circuit for changing a potential level of a signal; a voltage source; a current source; a switching circuit; an amplifier circuit such as a circuit which can increase signal amplitude, the amount of current, or the like, an operational amplifier, a differential amplifier circuit, a source follower circuit, or a buffer circuit; a signal generation circuit; a memory circuit; and/or a control circuit) may be connected between A and B. For example, in the case where a signal output from A is transmitted to B even when another circuit is interposed between A and B, A and B are functionally connected.

Note that when it is explicitly described that "A and B are electrically connected", the case where A and B are electrically connected (i.e., the case where A and B are connected with another element or another circuit interposed therebetween), the case where A and B are functionally connected (i.e., the case where A and B are functionally connected with another circuit interposed therebetween), and the case where A and B are directly connected (i.e., the case where A and B are connected without another element or another circuit interposed therebetween) are included therein.

That is, when it is explicitly described that "A and B are electrically connected", the description is the same as the case where it is explicitly only described that "A and B are connected".

Note that a display element, a display device which is a device including a display element, a light-emitting element, and a light-emitting device which is a device including a light-emitting element can employ various modes and can include various elements. For example, a display medium, whose contrast, luminance, reflectivity, transmittance, or the like changes by electromagnetic action, such as an EL (electroluminescence) element (e.g., an EL element including organic and inorganic materials, an organic EL element, or an inorganic EL element), an LED (e.g., a white LED, a red LED, a green LED, or a blue LED), a transistor (a transistor which emits light depending on the amount of current), an electron emitter, a liquid crystal element, electronic ink, an electrophoretic element, a grating light valve (GLV), a plasma display panel (PDP), a digital micromirror device (DMD), a piezoelectric ceramic display, or a carbon nanotube can be used as a display element, a display device, a light-emitting element, or a light-emitting device. Note that display devices having EL elements include an EL display; display devices having electron emitters include a field emission display (FED), an SED-type flat panel display (SED: surface-conduction electron-emitter display), and the like; display devices having liquid crystal elements include a liquid crystal display (e.g., a transmissive liquid crystal display, a transflective liquid crystal display, a reflective liquid crystal display, a direct-view liquid crystal display, or a projection liquid crystal display); display devices having electronic ink or electrophoretic elements include electronic paper.

Note that a liquid crystal element is an element which controls transmission or non-transmission of light by optical modulation action of liquid crystals and includes a pair of electrodes and liquid crystals. Note that the optical modulation action of liquid crystals is controlled by an electric filed applied to the liquid crystals (including a horizontal electric field, a vertical electric field, and a diagonal electric field). Note that the following can be used for a liquid crystal element: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a polymer dispersed liquid crystal (PDLC), a ferroelectric liquid crystal, an anti-ferroelectric liquid crystal, a mainchain liquid crystal, a side-chain high-molecular liquid crystal, a plasma addressed liquid crystal (PALC), a banana-shaped liquid crystal, and the like. In addition, the following can be used as a diving method of a liquid crystal: a TN (twisted nematic) mode, an STN (super twisted nematic) mode, an IPS (in-plane-switching) mode, an FFS (fringe field switching) mode, an MVA (multi-domain vertical alignment) mode, a PVA (patterned vertical alignment) mode, an ASV (advanced super view) mode, an ASM (axially symmetric aligned microcell) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a guest-host mode, a blue phase mode, and the like. Note that the present invention is not limited to this, and a variety of liquid crystal elements and driving methods thereof can be used as a liquid crystal element and a driving method thereof.

Note that electroluminescence, a cold cathode fluorescent lamp, a hot cathode fluorescent lamp, an LED, a laser light source, a mercury lamp, or the like can be used as a light source of a display device in which a light source is needed, such as a liquid crystal display (e.g., a transmissive liquid crystal display, a transflective liquid crystal display, a reflective liquid crystal display, a direct-view liquid crystal display, or a projection liquid crystal display), a display device including a grating light valve (GLV), or a display device including a digital micromirror device (DMD). Note that the present invention is not limited to this, and a variety of light sources can be used as a light source.

Note that a variety of transistors can be used as a transistor, without limitation to a certain type. For example, a thin film transistor (TFT) including a non-single-crystal semiconductor film typified by amorphous silicon, polycrystalline silicon, microcrystalline (also referred to as microcrystal, nanocrystal, or semi-amorphous) silicon, or the like can be used.

Note that by using a catalyst (e.g., nickel) in the case of forming microcrystalline silicon, crystallinity can be further improved and a transistor having excellent electrical characteristics can be formed. In this case, crystallinity can be improved by just performing heat treatment without performing laser irradiation. Accordingly, a gate driver circuit (e.g., a scan line driver circuit) and part of a source driver circuit (e.g., an analog switch) can be formed using the same substrate as a pixel portion. In addition, in the case of not performing laser irradiation for crystallization, unevenness in crystallinity of silicon can be suppressed. Therefore, high-quality images can be displayed.

Note that polycrystalline silicon and microcrystalline silicon can be formed without using a catalyst (e.g., nickel).

A transistor can be formed using a semiconductor substrate, an SOI substrate, or the like. Thus, a transistor with few variations in characteristics, sizes, shapes, or the like, with high current supply capability, and with a small size can be formed. By using such a transistor, power consumption of a circuit can be reduced or a circuit can be highly integrated.

A transistor including a compound semiconductor or an oxide semiconductor, such as ZnO, a-InGaZnO, SiGe, GaAs, IZO, ITO, or SnO, a thin film transistor obtained by thinning such a compound semiconductor or an oxide semiconductor, or the like can be used. Thus, manufacturing temperature can be lowered and for example, such a transistor can be formed at room temperature. Accordingly, the transistor can be formed directly on a substrate having low heat resistance, such as a plastic substrate or a film substrate.

Note that such a compound semiconductor or an oxide semiconductor can be used not only for a channel portion of the transistor but also for other applications. For example, such a compound semiconductor or an oxide semiconductor can be used for a resistor, a pixel electrode, or a light-transmitting electrode. Further, since such an element can be formed at the same time as the transistor, cost can be reduced.

A transistor or the like formed by an inkjet method or a printing method can be used. Thus, a transistor can be formed at room temperature, can be formed at a low vacuum, or can be formed using a large substrate. Since the transistor can be formed without using a mask (reticle), the layout of the transistor can be easily changed. Further, since it is not necessary to use a resist, material cost is reduced and the number of steps can be reduced. Furthermore, since a film is formed only in a necessary portion, a material is not wasted as compared to a manufacturing method by which etching is performed after the film is formed over the entire surface, so that cost can be reduced.

A transistor or the like including an organic semiconductor or a carbon nanotube can be used. Thus, such a transistor can be formed over a flexible substrate. A semiconductor device formed using such a substrate can resist shocks.

Further, transistors with a variety of structures can be used. For example, a MOS transistor, a junction transistor, a bipolar transistor, or the like can be used as a transistor. By using a MOS transistor, the size of the transistor can be reduced. Thus, a large number of transistors can be mounted. By using a bipolar transistor, large current can flow. Thus, a circuit can be operated at high speed.

Note that a MOS transistor, a bipolar transistor, and the like may be formed over one substrate. Thus, reduction in power consumption, reduction in size, high-speed operation, and the like can be achieved.

Furthermore, a variety of transistors can be used.

Note that a transistor can be formed using a variety of substrates, without limitation to a certain type. For example, a single crystal substrate, an SOI substrate, a glass substrate, a quartz substrate, a plastic substrate, a stainless steel substrate, a substrate including a stainless steel foil, or the like can be used as a substrate.

Note that the structure of a transistor can be a variety of structures, without limitation to a certain structure. For example, a multi-gate structure having two or more gate electrodes can be used. By using the multi-gate structure, a structure where a plurality of transistors are connected in series is provided because channel regions are connected in series.

As another example, a structure where gate electrodes are formed above and below a channel can be used. Note that when the gate electrodes are formed above and below the channel, a structure where a plurality of transistors are connected in parallel is provided.

A structure where a gate electrode is formed above a channel region, a structure where a gate electrode is formed below a channel region, a staggered structure, an inverted staggered structure, a structure where a channel region is divided into a plurality of regions, or a structure where channel regions are connected in parallel or in series can be used. Alternatively, a structure where a source electrode or a drain electrode overlaps with a channel region (or part of it) can be used. Further, an LDD region may be provided.

Note that a variety of transistors can be used as a transistor, and the transistor can be formed using a variety of substrates. Accordingly, all the circuits that are necessary to realize a predetermined function can be formed using the same substrate. For example, all the circuits that are necessary to realize the predetermined function can be formed using a glass substrate, a plastic substrate, a single crystal substrate, an SOI substrate, or any other substrate. Alternatively, some of the circuits which are necessary to realize the predetermined function can be formed using one substrate and some of the circuits which are necessary to realize the predetermined function can be formed using another substrate. That is, not all the circuits that are necessary to realize the predetermined function are required to be formed using the same substrate. For example, some of the circuits which are necessary to realize the predetermined function can be formed by transistors using a glass substrate and some of the circuits which are necessary to realize the predetermined function can be formed using a single crystal substrate, so that an IC chip formed by a transistor using the single crystal substrate can be connected to the glass substrate by COG (chip on glass) and the IC chip may be provided over the glass substrate. Alternatively, the IC chip can be connected to the glass substrate by TAB (tape automated bonding) or a printed wiring board. Alternatively, when circuits with high driving voltage and high driving frequency, which consume large power, are formed using a single crystal substrate instead of forming such circuits using the same substrate, and an IC chip formed by the circuits is used, for example, increase in power consumption can be prevented.

Note that a transistor is an element having at least three terminals of a gate, a drain, and a source. The transistor has a channel region between a drain region and a source region, and current can flow through the drain region, the channel region, and the source region. Here, since the source and the drain of the transistor change depending on the structure, the operating condition, and the like of the transistor, it is difficult to define which is a source or a drain. Thus, a region which functions as a source and a drain is not referred to as a source or a drain in some cases. In such a case, one of the source and the drain might be referred to as a first terminal and the other of the source and the drain might be referred to as a second terminal, for example. Alternatively, one of the source and the drain might be referred to as a first electrode and the other of the source and the drain might be referred to as a second electrode. Alternatively, one of the source and the drain might be referred to as a first region and the other of the source and the drain might be referred to as a second region.

Note that a transistor may be an element having at least three terminals of a base, an emitter, and a collector. In this case, in a similar manner, one of the emitter and the collector might be referred to as a first terminal and the other of the emitter and the collector might be referred to as a second terminal.

Note that a semiconductor device corresponds to a device having a circuit including a semiconductor element (e.g., a transistor, a diode, or a thyristor). The semiconductor device may also correspond to all devices that can function by utilizing semiconductor characteristics. In addition, the semiconductor device corresponds to a device having a semiconductor material.

Note that a display device corresponds to a device having a display element. The display device may include a plurality of pixels each having a display element. Note that the display device may include a peripheral driver circuit for driving the plurality of pixels. Note that the peripheral driver circuit for driving the plurality of pixels may be formed using the same substrate as the plurality of pixels. The display device may include a peripheral driver circuit provided over a substrate by wire bonding or bump bonding, namely, an IC chip connected by chip on glass (COG) or an IC chip connected by TAB or the like. The display device may include a flexible printed circuit (FPC) to which an IC chip, a resistor, a capacitor, an inductor, a transistor, or the like is attached. Note that the display device may include a printed wiring board (PWB) which is connected through a flexible printed circuit (FPC) and to which an IC chip, a resistor, a capacitor, an inductor, a transistor, or the like is attached. The display device may include an optical sheet such as a polarizing plate or a retardation plate. The display device may include a lighting device, a housing, an audio input and output device, an optical sensor, or the like.

Note that a lighting device may include a backlight unit, a light guide plate, a prism sheet, a diffusion sheet, a reflective sheet, a light source (e.g., an LED or a cold cathode fluorescent lamp), a cooling device (e.g., a water cooling device or an air cooling device), or the like.

Note that a light-emitting device corresponds to a device having a light-emitting element or the like. In the case where a light-emitting device includes a light-emitting element as a display element, the light-emitting device is one of specific examples of a display device.

Note that a reflective device corresponds to a device having a light-reflective element, a light diffraction element, light-reflective electrode, or the like.

Note that a liquid crystal display device corresponds to a display device including a liquid crystal element. Liquid crystal display devices include a direct-view liquid crystal display, a projection liquid crystal display, a transmissive liquid crystal display, a reflective liquid crystal display, a transflective liquid crystal display, and the like.

Note that a driving device corresponds to a device having a semiconductor element, an electric circuit, or an electronic circuit. For example, a transistor which controls input of signals from a source signal line to pixels (also referred to as a selection transistor, a switching transistor, or the like), a transistor which supplies voltage or current to a pixel electrode, a transistor which supplies voltage or current to a light-emitting element, and the like are examples of the driving device. A circuit which supplies signals to a gate signal line (also referred to as a gate driver, a gate line driver circuit, or the like), a circuit which supplies signals to a source signal line (also referred to as a source driver, a source line driver circuit, or the like), and the like are also examples of the driving device.

Note that a display device, a semiconductor device, a lighting device, a cooling device, a light-emitting device, a reflective device, a driving device, and the like overlap with each other in some cases. For example, a display device includes a semiconductor device and a light-emitting device in some cases. Alternatively, a semiconductor device includes a display device and a driving device in some cases.

Note that when it is explicitly described that "B is formed on A" or "B is formed over A", it does not necessarily mean that B is formed in direct contact with A. The description includes the case where A and B are not in direct contact with each other, i.e., the case where another object is interposed between A and B. Here, each of A and B is an object (e.g., a device, an element, a circuit, a wiring, an electrode, a terminal, a conductive film, or a layer).

Accordingly, for example, when it is explicitly described that "a layer B is formed on (or over) a layer A", it includes both the case where the layer B is formed in direct contact with the layer A, and the case where another layer (e.g., a layer C or a layer D) is formed in direct contact with the layer A and the layer B is formed in direct contact with the layer C or the layer D. Note that another layer (e.g., a layer C or a layer D) may be a single layer or a plurality of layers.

In a similar manner, when it is explicitly described that "B is formed above A", it does not necessarily mean that B is formed in direct contact with A, and another object may be interposed therebetween. Thus, for example, when it is described that "a layer B is formed above a layer A", it includes both the case where the layer B is formed in direct contact with the layer A, and the case where another layer (e.g., a layer C or a layer D) is formed in direct contact with the layer A and the layer B is formed in direct contact with the layer C or the layer D. Note that another layer (e.g., a layer C or a layer D) may be a single layer or a plurality of layers.

Note that when it is explicitly described that "B is formed on A", "B is formed over A", or "B is formed above A", it includes the case where B is formed obliquely over/above A.

Note that the same can be said when it is described that "B is formed below A" or "B is formed under A".

Note that when an object is explicitly described in a singular form, the object is preferably singular. Note that the present invention is not limited to this, and the object can be plural. In a similar manner, when an object is explicitly described in a plural form, the object is preferably plural. Note that the present invention is not limited to this, and the object can be singular.

Note that size, the thickness of layers, or regions in diagrams are exaggerated for simplicity in some cases. Therefore, the present invention is not necessarily limited to the scale.

Note that diagrams are schematic views of ideal examples, and shapes or values are not limited to those illustrated in the diagrams. For example, it is possible to include variations in shape due to a manufacturing technique or an error, variations in signals, voltage values, or current values due to noise or a difference in a timing.

Note that a technical term is used in order to describe a particular embodiment or example or the like in many cases, and is not limited to this.

Note that terms which are not defined (including terms used for science and technology, such as technical terms or academic parlance) can be used as terms which have meaning equal to general meaning that an ordinary person skilled in the art understands. It is preferable that terms defined by dictionaries or the like be construed as consistent meaning with the background of related art.

Note that terms such as "first", "second", "third", and the like are used for distinguishing various elements, members, regions, layers, and areas from others. Therefore, the terms such as "first", "second", "third", and the like do not limit the number of the elements, members, regions, layers, areas, or the like. Further, for example, "first" can be replaced with "second", "third", or the like.

The number of transistors connected to a capacitor can be decreased. Alternatively, the parasitic capacitance of a transistor connected to the capacitor can be decreased. Alternatively, the potential in an H level of a signal which synchronizes with a clock signal can be increased. Alternatively, a layout area can be reduced. Alternatively, life can be extended. Alternatively, delay or distortion of a signal can be decreased. Alternatively, power consumption can be decreased. Alternatively, the adverse effect of noise can be decreased. Alternatively, deterioration of a transistor can be suppressed or relieved. Alternatively, malfunction can be suppressed. Alternatively, short circuit between one electrode of a capacitor and the other electrode of the capacitor can be prevented. Alternatively, the current driving capability of an outside circuit can be decreased. Alternatively, the size of an outside circuit can be reduced. Alternatively, the size of a display device can be reduced.

BRIEF DESCRIPTION OF DRAWINGS

FIGS. 27A to 27C, 27E, and 27F are circuit diagrams of a pixel and FIGS. 27D and 27G are timing charts each illustrating a driving method of the pixel.

BEST MODE FOR CARRYING OUT THE INVENTION

Figure 1A:
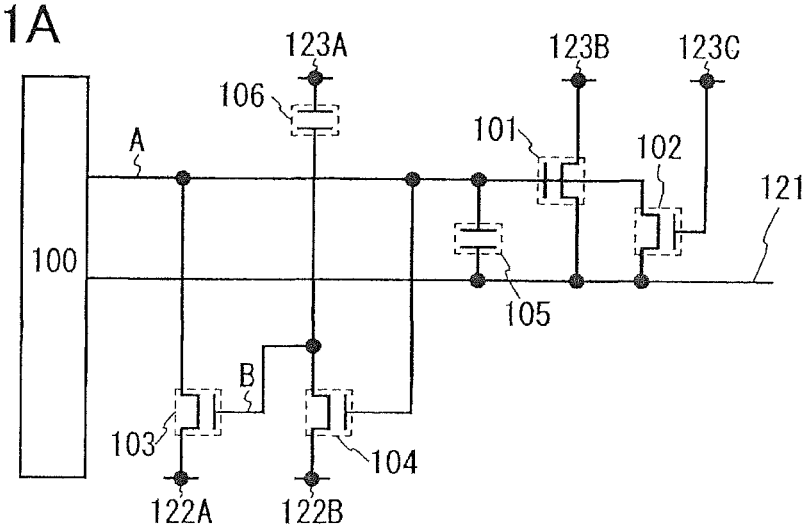
FIG. 1A is a circuit diagram of a semiconductor device and FIG. 1B is a timing chart for illustrating a driving method of the semiconductor device.

Hereinafter, embodiments will be described with reference to the drawings. However, the embodiments can be implemented with various modes. It will be readily appreciated by those skilled in the art that modes and details can be changed in various ways without departing from the spirit and scope of the present invention. Therefore, the invention should not be construed as being limited to the description of embodiment. Note that in structures of the invention described below, the same portions or portions having similar functions are denoted by the same reference numerals, and description thereof is not repeated.

Note that a content (or may be part of the content) described in one embodiment may be applied to, combined with, or replaced by a different content (or may be part of the different content) described in the same embodiment and/or a content (or may be part of the content) described in one or a plurality of different embodiments.

Note that in each embodiment, a content described in the embodiment is a content described with reference to a variety of diagrams or a content described with a paragraph disclosed in this specification.

Note that, by combining a diagram (or may be part of the diagram) described one embodiment with another part of the diagram, a different diagram (or may be part of the different diagram) described in the same embodiment, and/or a diagram (or may be part of the diagram) described in one or a plurality of different embodiments, much more diagrams can be formed.

[Embodiment 1]

In this embodiment, one example of a semiconductor device will be described. Note that the semiconductor device can be denoted as a driver circuit or a flip-flop.

First, one example of the semiconductor device of this embodiment will be described with reference to FIG. 1A. The semiconductor device in FIG. 1A includes a circuit 100, a transistor 101, a transistor 102, a transistor 103, a transistor 104, a capacitor 105, and a capacitor 106. Each of the transistors 101 to 104 is an n-channel transistor which is turned on when potential difference (Vgs) between a gate and a source gets higher than threshold voltage (Vth). However, this embodiment is not limited to this. Each of the transistors 101 to 104 can be a p-channel transistor. The p-channel transistor is turned on when potential difference (Vgs) between a gate and a source gets lower than threshold voltage (Vth).

A connection relation of the semiconductor device in FIG. 1A will be described. A first terminal of the transistor 101 is connected to a wiring 123B. A second terminal of the transistor 101 is connected to a wiring 121. A first terminal of the transistor 102 is connected to a gate of the transistor 101. A second terminal of the transistor 102 is connected to the wiring 121. A gate of the transistor 102 is connected to a wiring 123C. A first terminal of the transistor 103 is connected to a wiring 122A. A second terminal of the transistor 103 is connected to the gate of the transistor 101. A first terminal of the transistor 104 is connected to a wiring 122B. A second terminal of the transistor 104 is connected to the gate of the transistor 103. One electrode of the capacitor 105 is connected to the gate of the transistor 101. The other electrode of the capacitor 105 is connected to the wiring 121. One electrode of the capacitor 106 is connected to the wiring 123A. The other electrode of the capacitor 106 is connected to the gate of the transistor 103.

Note that a connection potion of the gate of the transistor 101, the first terminal of the transistor 102, the second terminal of the transistor 103, or the gate of the transistor 104 is denoted as a node A. Then, a connection potion of the gate of the transistor 103, the second terminal of the transistor 104, or the other electrode of the capacitor 106 is denoted as a node B. Note that the node A and the node B can be denoted as wirings.

Note that the wiring 121, the wiring 123A, the wiring 123B, the wiring 123C, the wiring 122A, and the wiring 122B can be denoted as terminals.

One example of a thing (e.g., a signal, voltage, or current) which can be input to each of the wirings (the wiring 121, the wirings 122A and 122B, and the wirings 123A to 123C) is described. However, a content described below is an example and this embodiment is not limited to this. A variety of things besides the thing described below can be input to each of the wirings. Each of the wirings can be in a floating state.

For example, a signal S1 is output from the wiring 121. Accordingly, the wiring 121 can function as a signal line. In specific, in the case where the wiring 121 is connected to a pixel, or in the case where the wiring 121 is provided so as to extend to a pixel portion, the wiring 121 can function as a gate line, a scan line, or a capacitor line. The signal S1 is an output signal of the semiconductor device and is a digital signal having an H level and an L level in many cases. The signal S1 can function as an output signal, a selection signal, a gate signal, or a scan signal.

For example, voltage V1 is supplied to the wirings 122A and 122B. Accordingly, the wirings 122A and 122B can function as power supply lines. The voltage V1 has approximately the same value as the signal S1 in an L level in many cases and can function as ground voltage, power supply voltage, or negative power supply voltage. However, this embodiment is not limited to this. A signal such as a clock signal can be input to the wirings 122A and 122B. In that case, the wirings 122A and 122B can function as signal lines or clock signal lines. Alternatively, different voltages or different signals can be input to the wirings 122A and 122B.

Note that the term "approximately" means that a value includes a variety of errors such as an error due to noise, an error due to variations in a process, an error due to variations in steps of manufacturing an element, and/or a measurement error.

For example, a signal S2 is input to the wirings 123A to 123C. Accordingly, the wirings 123A to 123C can function as signal lines. The signal S2 is a digital signal which repeatedly switch between an H level and an L level in a certain cycle in many cases and can function as a clock signal (CK). However, this embodiment is not limited to this. Power supply voltage can be supplied to the wirings 123A to 123C. In that case, the wirings 123A to 123C can function as power supply lines. Alternatively, different voltages or different signals can be input to the wirings 123A to 123C.

Note that in this embodiment, when the potential in an L level of a signal is V1 and the potential in an H level of a signal is V2, for example, V2 is higher than V1. However, this embodiment is not limited to this.

Note that voltage means a potential difference between one potential and reference potential (e.g., ground potential) in many cases. Accordingly, voltage, potential and a potential difference can be referred to as potential, voltage, and a voltage difference, respectively.

Examples of functions which the circuit 100, the transistors 101 to 104, the capacitor 105, and the capacitor 106 have will be described. However, a content described below is one example and this embodiment is not limited to the content below. The circuit 100 and each element can have a variety of functions in addition to the functions described below. Alternatively, it is possible that the circuit 100 and each element do not have the functions described below.

The circuit 100 has a function of controlling the potential or state of the node A and a function of controlling the potential or state of the wiring 121. For example, the circuit 100 has a function of raising the potential of the node A or the wiring 121, a function of decreasing the potential of the node A or the wiring 121, and/or a function of making the node A or the wiring 121 go into a floating state, or the like. The transistor 101 has a function of raising the potential of the wiring 121 in accordance with a signal (e.g., the signal S2) which is input to the wiring 123B. The transistor 102 has a function of controlling a timing when the wiring 121 and the node A are brought into electrical conduction in accordance with a signal (e.g., the signal S2) which is input to the wiring 123C and functions as a switch. The transistor 103 has a function of controlling a timing when the wiring 122A and the node A are brought into electrical conduction in accordance with the potential of the node B and functions as a switch. The transistor 104 has a function of controlling a timing when the wiring 122B and the node B are brought into electrical conduction in accordance with the potential of the node A and functions as a switch. The capacitor 105 has a function of raising the potential of the node A in accordance with the potential of the wiring 126 and/or a function of holding a potential difference between the gate and the second terminal of the transistor 101. The capacitor 106 has a function of controlling the potential of the node B in accordance with a signal (e.g., the signal S2) which is input to the wiring 123A.

Next, operation of the semiconductor device in FIG. 1A will be described with reference to FIG. 1B and FIGS. 2A to 2E. FIG. 1B is one example of a timing chart for illustrating the operation of the semiconductor device and there are a period T1, a period T2, a period T3, a period T4, and a period T5. In addition, FIG. 1B shows the signal S1, the signal S2, the potential Va of the node A, and the potential Vb of the node B. FIG. 2A is a schematic view of operation of the semiconductor device in FIG. 1A during the period T1. FIG. 2B is a schematic view of the operation of the semiconductor device in FIG. 1A during the period T2. FIG. 2C is a schematic view of the operation of the semiconductor device in FIG. 1A during the period T3. FIG. 2D is a schematic view of the operation of the semiconductor device in FIG. 1A during the period T4. FIG. 2E is a schematic view of the operation of the semiconductor device in FIG. 1A during the period T5.

Note that when the potential of the node A is raised, the semiconductor device sequentially performs operation during the period T1, operation during the period T2, and operation during the period T3. After that, the semiconductor device sequentially repeats operation during the period T4 and operation during the period T5 until the potential of the node A is raised again.

First, the signal S2 goes into an L level in the period T1. Then, the transistor 102 is turned off, so that the node A and the wiring 121 are brought out of electrical conduction. At the same time, the potential of the node B decreases due to capacitive coupling of the capacitor 106. When the potential of the node B at that time gets lower than the sum of the potential (V1) of the wiring 122A and the threshold voltage (Vth106) of the transistor 103, (V1+Vth106), the transistor 103 is turned off.

Accordingly, the wiring 122A and the node A are brought out of electrical conduction. On the other hand, the circuit 100 starts to raise the potential of the node A. Then, when the potential of the node A becomes equal to the sum of the potential (V1) of the wiring 122B and the threshold voltage (Vth104) of the transistor 104, (V1+Vth104), the transistor 104 is turned on. Accordingly, the wiring 122B and the node B are brought into electrical conduction. Therefore, since the voltage V1 is supplied from the wiring 122B to the node B, the potential of the node B is V1. As a result, since the transistor 103 is kept off, the wiring 122A and the node A are kept out of electrical conduction. Similarly, when the potential of the node A becomes equal to the sum of the potential (V1) of the wiring 123B and the threshold voltage (Vth101) of the transistor 101, (V1+Vth101), the transistor 101 is turned on. Accordingly, the wiring 123B and the wiring 121 are brought into electrical conduction. Therefore, since the signal S2 in the L level is supplied from the wiring 123B to the wiring 121, the potential of the wiring 121 is approximately equal to the potential of the wiring 123B (the L level of the signal S2 or V1). After that, since the circuit 100 stops supplying a signal to the node A when the potential of the node A is raised to a certain value (e.g., more than or equal to V1+Vth101 and less than or equal to V2), the circuit 100 and the node A are brought out of electrical conduction. Accordingly, the node A goes into a floating state, so that the potential of the node A is maintained as a large value. A potential difference between the node A and the wiring 121 at that time is held in the capacitor 105.

Note that the circuit 100 can supply the voltage V1, a signal in an L level, or the like to the wiring 121 during the period T1. Alternatively, the circuit 100 and the wiring 121 can be brought out of electrical conduction if the circuit 100 does not supply the signal or the like to the wiring 121. In addition, the circuit 100 can make the wiring 121 go into a floating state.

Next, since the potential of the node A is maintained as a large value during the period T2, the transistor 104 is kept on. Accordingly, since the wiring 122B and the node B are kept in electrical conduction, the potential of the node B is kept as V1. As a result, the transistor 103 is kept off, so that the wiring 122A and the node A are kept out of electrical conduction. Similarly, since the potential of the node A is maintained as a large value, the transistor 101 is kept on. Therefore, the wiring 123B and the wiring 121 are kept in electrical conduction. At that time, the level of the signal S2 raises from the L level to an H level. Accordingly, since the wiring 123B and the wiring 121 are kept in electrical conduction, the potential of the wiring 121 starts to be raised. Since the transistor 102 is turned on at the same time, the node A and the wiring 121 are brought into electrical conduction. However, the transistor 102 is turned off when the potential of the wiring 121 is raised to a value obtained by subtracting the threshold voltage (Vth102) of the transistor 102 from the potential (V2) of the wiring 123C, (V2−Vth102). Accordingly, the wiring 121 and the node A are brought out of electrical conduction. Here, the capacitor 105 keeps holding the potential difference between the wiring 121 and the node A in the period T1. Accordingly, when the potential of the wiring 121 is raised, the potential of the node A is raised to (V2+Vth101+α) (α is a positive number) by capacitive coupling of the capacitor 105. So-called bootstrap operation is performed. Accordingly, the potential of the wiring 121 is raised until it becomes equal to the potential (the H level of the signal S2 or V2) of the wiring 123B.

Note that since the circuit 100 does not supply a signal or the like to the node A during the period T2 in many cases, the circuit 100 and the node A are out of electrical conduction in many cases. In this manner, the circuit 100 makes the node A go into a floating state in many cases.

Note that since the circuit 100 does not supply a signal or the like to the wiring 121 during the period T2 in many cases, the circuit 100 and the wiring 121 are out of electrical conduction in many cases.

Next, the circuit 100 decreases the potential of the node A to V1 after the level of the signal S2 is dropped from the H level to the L level during the period T3. Accordingly, the transistor 101 is on until the potential of the node A becomes equal to the sum of the potential (V1) of the wiring 123B and the threshold voltage (Vth101) of the transistor 101, (V1+Vth101). Accordingly, since the signal S2 in the L level is supplied from the wiring 123B to the wiring 121, the potential of the wiring 121 decreases to the potential (V1) of the wiring 123B. Similarly, the transistor 104 is on until the potential of the node A becomes equal to the sum of the potential (V1) of the wiring 122B and the threshold voltage (Vth104) of the transistor 104, (V1+Vth104).

Accordingly, since the voltage V1 is supplied from the wiring 122B to the node B, the potential of the node B is kept as V1. As a result, the transistor 103 is kept off, so that the wiring 122A and the node A are kept out of electrical conduction. At that time, the capacitor 106 holds the potential difference between the potential of the wiring 123A (the L level of the signal S2 or V1) and the potential (V1) of the wiring 122B.

Note that the circuit 100 can supply the voltage V1, a signal in an L level, or the like to the wiring 121 during the period T3. Alternatively, the circuit 100 and the wiring 121 can be brought out of electrical conduction if the circuit 100 does not supply the signal or the like to the wiring 121. In addition, the circuit 100 can make the wiring 121 go into a floating state.

Next, the level of the signal S2 is raised from the L level to the H level during the period T4. At that time, since the potential of the node A is kept as V1, the transistor 101 and the transistor 104 are kept off. Accordingly, since the node B is kept in a floating state, the potential of the node B is raised by capacitive coupling of the capacitor 106. When the potential of the node B gets higher than the sum of the potential (V1) of the wiring 122A and the threshold voltage (Vth103) of the transistor 103, (V1+Vth103), the transistor 103 is turned on. Then, the wiring 122A and the node A are brought into electrical conduction. Accordingly, since the voltage V1 is supplied from the wiring 122A to the node A, the potential of the node A is maintained as V1. At the same time, since the transistor 102 is turned on, the wiring 121 and the node A are brought into electrical conduction. At that time, the voltage V1 is supplied from the wiring 122A to the node A. Accordingly, since the voltage V1 is supplied from the wiring 122A to the wiring 121, the potential of the wiring 121 is maintained as V1.

Note that the circuit 100 can supply the voltage V1, a signal in an L level, or the like to the node A during the period T4. Alternatively, the circuit 100 and the wiring 121 can be brought out of electrical conduction if the circuit 100 does not supply the signal or the like to the node A. In addition, the circuit 100 can make the node A go into a floating state.

Note that the circuit 100 can supply the voltage V1, a signal in an L level, or the like to the wiring 121 during the period T5. Alternatively, the circuit 100 and the wiring 121 can be brought out of electrical conduction if the circuit 100 does not supply the signal or the like to the wiring 121. In addition, the circuit 100 can make the wiring 121 go into a floating state.

Next, the level of the signal S2 is dropped from the H level to the L level during the period T5. At that time, since the potential of the node A is kept as V1, the transistor 101 and the transistor 104 are kept off. Accordingly, the potential of the node B is decreased by capacitive coupling of the capacitor 106. When the potential of the node B gets lower than the sum of the potential (V1) of the wiring 122A and the threshold voltage (Vth103) of the transistor 103, (V1+Vth103), the transistor 103 is turned off. Then, the wiring 122A and the node A are brought out of electrical conduction. Similarly, since the transistor 102 is turned off, the wiring 121 and the node A are brought out of electrical conduction. At that time, if the circuit 100 supplies the signal in the L level or the voltage V1 to the node A and the wiring 121, the potential of the node A and the potential of the wiring 121 are maintained as V1. However, even if the circuit 100 does not supply the signal in the L level or the voltage V1 to the node A and the wiring 121, the node A and the wiring 121 go into a floating state, whereby the potential of the node A and the potential of the wiring 121 are maintained as V1.

Figure 1B:
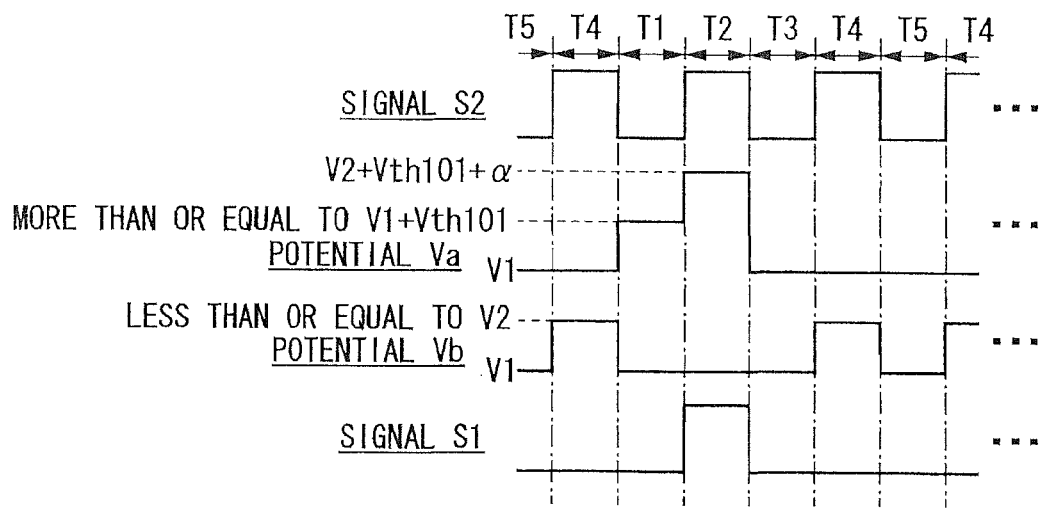
Figure 2A:
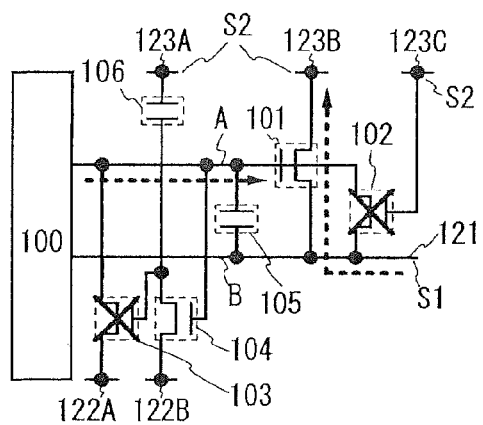
FIGS. 2A to 2E are schematic views illustrating a driving method of a semiconductor device.
Figure 2B:
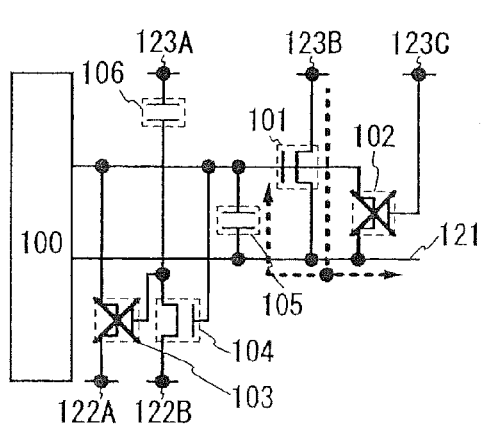
Figure 2C:
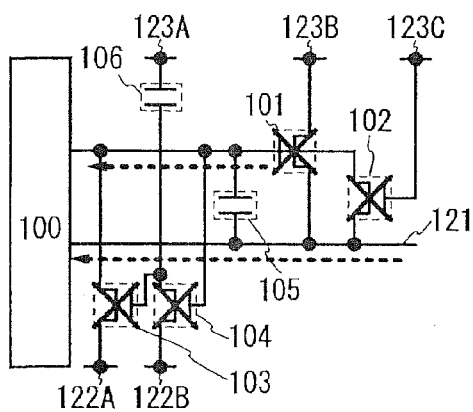
Figure 2D:
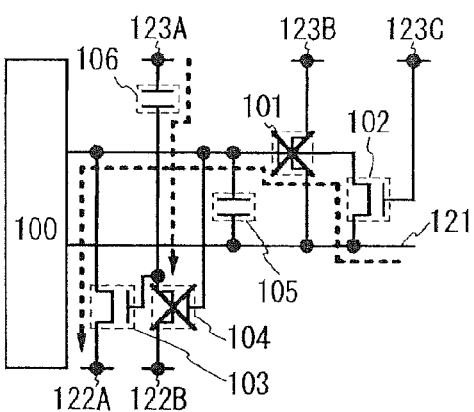
Figure 2E:
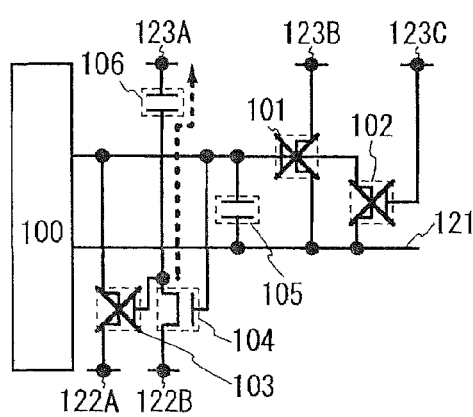

In the semiconductor device in FIG. 1A, the number of transistors that are connected to the other electrode of the capacitor 106 can be smaller than that of a conventional technique. Accordingly, the parasitic capacitance of a node connected to the other of the capacitor 106, that is, the parasitic capacitance of the node B can be made low. Note that the parasitic capacitance means total capacitance such as the gate capacitance of a transistor, the parasitic capacitance between a gate and source of the transistor, the parasitic capacitance between the gate and drain of the transistor, and/or wiring capacitance. However, this embodiment is not limited to this. A plurality of transistors can be connected to the other electrode of the capacitor 106.

Alternatively, since the parasitic capacitance of the node B can be reduced in the semiconductor device shown in FIG. 1A, the capacitance value of the capacitor 106 can be made smaller than that of the conventional technique. Accordingly, since an area where one electrode of the capacitor 106 and the other electrode of the capacitor 106 overlap with each other can be reduced, the layout area of the capacitor 106 can be reduced. As a result, short circuit between one electrode of the capacitor 106 and the other electrode of the capacitor 106 due to dust or the like can be prevented. Accordingly, improvement in yield or reduction in cost can be achieved. Alternatively, since the load of the wiring 123A can be reduced, distortion, delay, or the like of a signal (e.g., a signal S2) which is input to the wiring 123A can be suppressed. Alternatively, since the current driving capability of an outside circuit for supplying a signal to the wiring 123A can be made low, the size of the outside circuit can be reduced.

Alternatively, since the parasitic capacitance of the node B can be reduced in the semiconductor device in FIG. 1A, the amplitude voltage of the node B in the case where the potential of the wiring 123A is changed can be made high. Accordingly, during the period T4, since the potential of the node B can be made higher than that of the conventional technique, the Vgs of the transistor 103 can be made big. That is, since the on resistance of the transistor 103 can be made low, the potential of the node B during the period T4 can be easily maintained as V1. Alternatively, since the channel width (W) of the transistor 103 can be made small, reduction in a layout area can be achieved.

Alternatively, in the semiconductor device shown in FIG. 1A, during the period T2, the node A and the wiring 121 are in electrical conduction until the transistor 102 is turned off in many cases. Accordingly, since the potential of the node A is decreased, the gate voltage of the transistor 101 and the transistor 104 can be reduced. As a result, deterioration of characteristics of the transistor 101 and the transistor 104 can be suppressed. Alternatively, a breakdown of the transistor 101 and the transistor 104 can be suppressed. Alternatively, a transistor whose mobility is improved by thinning a gate insulating film can be used as the transistor. In the case where such a transistor is used, the channel width (W) of the transistor can be reduced. Accordingly, reduction in a layout area can be achieved.

Alternatively, all transistors in the semiconductor device in FIG. 1A can be n-channel transistors or p-channel transistors. Accordingly, as compared to a CMOS circuit, reduction in the number of steps, improvement in yield, or reduction in cost can be achieved. In specific, if all the transistors are n-channel transistors, a non-single-crystal semiconductor, a microcrystalline semiconductor, an organic semiconductor, or an oxide semiconductor can be used for a semiconductor layer of the transistor. Accordingly, reduction in the number of steps, improvement in yield, or reduction in cost can be achieved. However, this embodiment is not limited to this. The semiconductor device shown in FIG. 1A can be formed using a CMOS circuit in which a p-channel transistor and an n-channel transistor are combined.

Alternatively, in the semiconductor device shown in FIG. 1A, the transistors 101 to 104 are turned off during at least one of the period T4 and the period 15. Accordingly, since the transistor is not turned on during one operation period, deterioration of characteristics of the transistor, such as increase in threshold voltage or decrease in mobility can be suppressed.

In specific, in the case where the non-single-crystal semiconductor, the microcrystalline semiconductor, the organic semiconductor, or the oxide semiconductor is used for the semiconductor layer of the transistor, deterioration of the characteristics of the transistor becomes obvious. However, in the semiconductor device shown in FIG. 1A, deterioration of the characteristics of the transistor can be suppressed; therefore, the non-single-crystal semiconductor, the microcrystalline semiconductor, the organic semiconductor, or the oxide semiconductor can be used for the semiconductor layer of the transistor. However, this embodiment is not limited to this. A polycrystalline semiconductor or a single crystal semiconductor can be used for the semiconductor layer.

Note that the period T2 can be referred to as a selection period and periods other than the period T2 (the period T1, the period T3, the period T4, and the period T5) can be referred to as non-selection periods. Alternatively, the period T1, the period T2, the period T3, the period T4, and the period T5 can be referred to as a set period, an output period, a reset period, a first non-selection period, and a second non-selection period, respectively.

Note that the channel width (W) of the transistor 101 can be larger than that of the transistor 102, the transistor 103, and/or the transistor 104. Alternatively, the channel width of the transistor 101 can be the largest among those of the transistors included in the semiconductor device. In that case, since the on resistance of the transistor 101 is low, rising time and falling time of a signal (e.g., the signal S1) which is output from the wiring 121 can be shortened. Accordingly, during the period T2, a timing when the transistor 102 is turned off comes earlier. Therefore, malfunction of the semiconductor device due to too much reduction in the potential of the node A can be suppressed. However, this embodiment is not limited to this. The channel width of the transistor 101 can be smaller than that of any one of the transistors 102 to 104 or that of any one of the transistors included in the semiconductor device.

Note that the channel width of the transistor can also be referred to as a W/L ratio of the transistor (L: channel length).

Note that the potential of the signal in an L level which is input to the wiring 123A, the wiring 123B, and/or the wiring 123C can be lower than V1. In that case, backward bias can be applied to the transistor, so that deterioration of the characteristics of the transistor can be suppressed. In specific, since a period of time when the transistor 102 is on is long, the potential of the signal in the L level that is input to the wiring 123C is preferably lower than V1. However, this embodiment is not limited to this. The potential of the signal in the L level that is input to the wiring 123A, the wiring 123B, and/or the wiring 123C can be higher than V1.

Note that the potential of the signal in an H level which is input to the wiring 123A, the wiring 123B, and/or the wiring 123C can be lower than V2. In that case, the Vgs of the transistor is small, so that deterioration of the characteristics of the transistor can be eased. In specific, since a period of time when the transistor 102 is on is long, the potential of the signal in the H level that is input to the wiring 123C is preferably lower than V2. However, this embodiment is not limited to this. The potential of the signal in the H level that is input to the wiring 123A, the wiring 123B, and/or the wiring 123C can be higher than V2.

Note that the amplitude voltage of the signal that is input to the wiring 123A, the wiring 123B, and/or the wiring 123C can be lower than (V2−V1). In specific, since a period of time when the transistor 103 is on is long, the amplitude of the signal that is input to the wiring 123A is preferably lower than (V2−V1). In this manner, since the Vgs of the transistor 103 can be made small, deterioration of the characteristics of the transistor 103 can be suppressed. However, this embodiment is not limited to this. The amplitude voltage of the signal that is input to the wiring 123A, the wiring 123B, and/or the wiring 123C can be higher than (V2−V1).

Note that a signal can be input to the wiring 122A and/or the wiring 122B. In this manner, since the voltage V1 can be eliminated, the number of power supplies can be reduced. Alternatively, since backward bias can be applied to the transistor, deterioration of the characteristics of the transistor can be eased. In specific, a signal whose level goes into an L level during a period when the transistor 103 is on (e.g., the period T1, the period T3, and the period T5) can be input to the wiring 122A. For example, an inverted signal (hereinafter also referred to as an inverted clock signal) of the signal S2 can be given. A signal whose level goes into an L level during a period when the transistor 104 is on (e.g., the period T3, the period T4, and the period T5) can be input to the wiring 122B.

Note that voltage (e.g., the voltage V2) can be supplied to the wiring 123A, the wiring 123B, and/or the wiring 123C.

Accordingly, the semiconductor device can function as an inverter circuit or a buffer circuit.

Figure 3A:
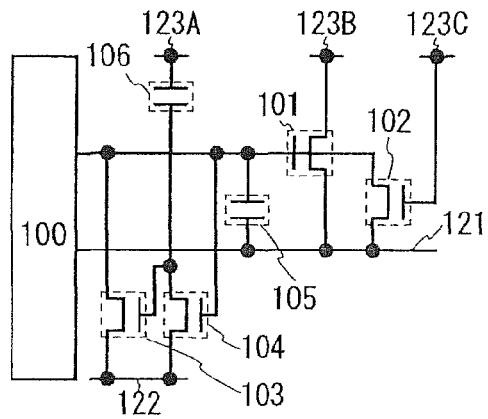
FIGS. 3A to 3E are circuit diagrams of a semiconductor device.

Note that as shown in FIG. 3A, since the same voltages (e.g., the voltage V1) are supplied to the wiring 122A and 122B in many cases, the wiring 122A and the wiring 122B can be shared. Accordingly, the first terminal of the transistor 103 and the first terminal of the transistor 104 are connected to the wiring 122. The wiring 122 corresponds to the wiring 122A or the wiring 122B. A signal similar to that input to the wiring 122A or the wiring 122B can be input to the wiring 122.

Note that the terms "a plurality of wirings is shared" mean that an element or a circuit which is connected to the plurality of wirings is connected to one wiring. Alternatively, the terms "a plurality of wirings is shared" mean that the plurality of wirings is connected to each other.

Figure 3B:
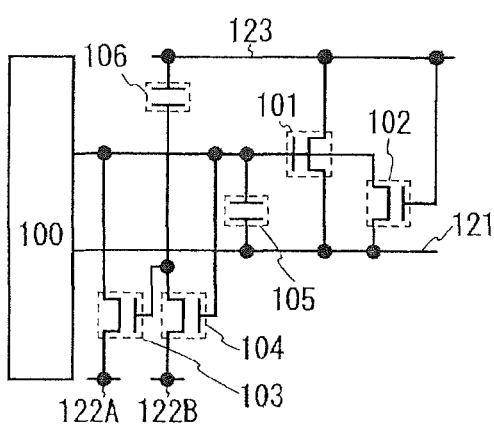

Note that as shown in FIG. 3B, since the same signals (e.g., the signal S2) are input to the wirings 123A to 123C in many cases, the wiring 123A to 123C can be shared. Accordingly, the first terminal of the transistor 101, the gate of the transistor 102, and one electrode of the capacitor 106 are connected to the wiring 123. The wiring 123 corresponds to the wirings 123A to 123C. A signal similar to that input to the wirings 123A to 123C can be input to the wiring 123. However, this embodiment is not limited to this. Any two or more of the wirings 123A to 123C can be shared.

Note that as in FIG. 3B, the wirings 123A to 123C can be shared in FIG. 3A.

Figure 3C:
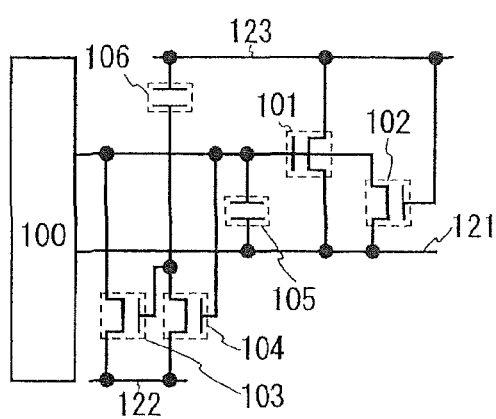

Note that as shown in FIG. 3C, by combining FIGS. 3A and 3B, the wiring 122A and the wiring 122B can be shared and, further, the wirings 123A to 123C can be shared. For example, the first terminal of the transistor 103 and the first terminal of the transistor 104 can be connected to the wiring 122. In addition, the first terminal of the transistor 101, the gate of the transistor 102, and one electrode of the capacitor 106 can be connected to the wiring 123.

Figure 3D:
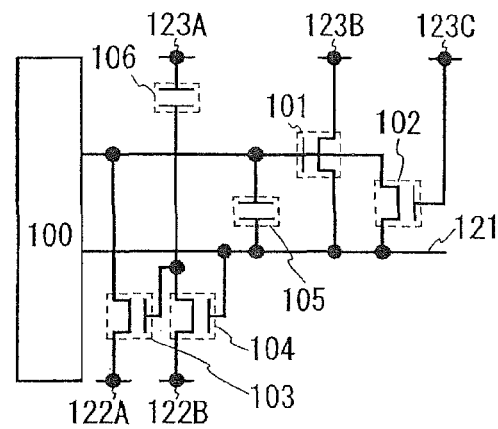

Note that as shown in FIG. 3D, the gate of the transistor 104 can be connected to the wiring 121. Since the gate of the transistor 104 is connected to the wiring 121, the voltage of the gate when the transistor 104 is turned on is V1 which is lower than the voltage (V1+Vth101+α) of the gate when the transistor 104 is turned on in FIG. 1A. Accordingly, a dielectric breakdown of the transistor 104 or deterioration of characteristics of the transistor 104 can be suppressed.

Note that as in FIG. 3D, the gate of the transistor 104 can be connected to the wiring 121 in FIGS. 3A to 3C.

Figure 3E:
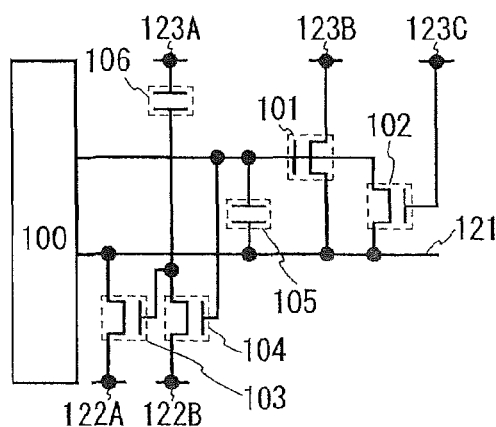

Note that as shown in FIG. 3E, the second terminal of the transistor 103 can be connected to the wiring 121. Since the second terminal of the transistor 103 is connected to the wiring 121, the voltage V1 is supplied from the wiring 122A to the wiring 121 during the period T4; therefore, the potential of the wiring 121 easily maintained as V1.

Note that as in FIG. 3E, the second terminal of the transistor 103 can be connected to the wiring 121 in FIGS. 3A to 3D.

Figure 4A:
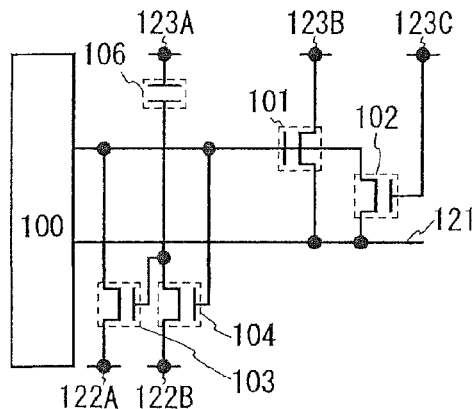
FIGS. 4A to 4F are circuit diagrams of a semiconductor device.

Note that as shown in FIG. 4A, the capacitor 105 can be eliminated. In that case, the parasitic capacitance between the gate and the second terminal of the transistor 101 can be used as the capacitor 105.

Note that in FIG. 4A, in the case where the parasitic capacitance between the gate and the second terminal of the transistor 101 is used as the capacitor 105, the parasitic capacitance between the gate and the second terminal of the transistor 101 is preferably higher than the parasitic capacitance between the gate and the first terminal of the transistor 101. Accordingly, in the transistor 101, an area where a conductive layer which functions as a gate electrode and a conductive layer which functions as a source electrode or drain electrode overlap with each other on the second terminal side is preferably larger than that on the first terminal side. However, this embodiment is not limited to this.

Note that as in FIG. 4A, the capacitor 105 can be eliminated in FIGS. 3A to 3E.

Figure 4B:
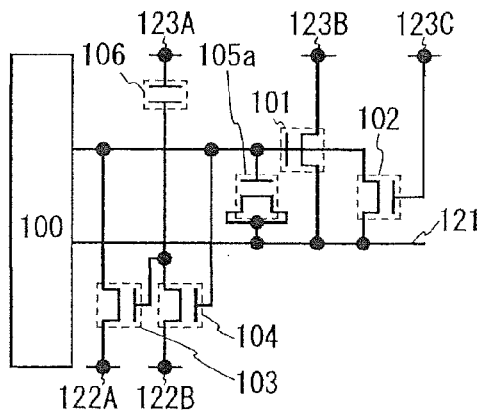

Note that as shown in FIG. 4B, a MOS capacitor can be used as the capacitor 105. In an example in FIG. 4B, a transistor 105a is used as the capacitor 105. The transistor 105a is an n-channel transistor. A first terminal and a second terminal of the transistor 105a are connected to the wiring 121. A gate of the transistor 105a is connected to the node A. In this manner, since the potential of the node A is high during a period in which the transistor 105a needs to function as a capacitor (such a period is the periods T1 and T2), the gate capacitance of the transistor 105a can be high. On the other hand, since the potential of the node A is low during a period in which the transistor 105a does not need to function as a capacitor (such a period is the periods T3, T4, and T5), the gate capacitance of the transistor 105a can be low. However, this embodiment is not limited to this. The transistor 105a can be a p-channel transistor. Alternatively, one of the first terminal and the second terminal of the transistor 105a can be in a floating state. Alternatively, the gate of the transistor 105a can be connected to the wiring 121. The first terminal and the second terminal of the transistor 105a can be connected to the node A. Alternatively, an impurity can be added to a channel region of the transistor 105a.

Note that as in FIG. 4B, the transistor 105a can be used as the capacitor 105, the first terminal and the second terminal of the transistor 105a can be connected to the wiring 121, and the gate of the transistor 105a can be connected to the node A in FIGS. 3A to 3E and FIG. 4A.

Figure 4C:
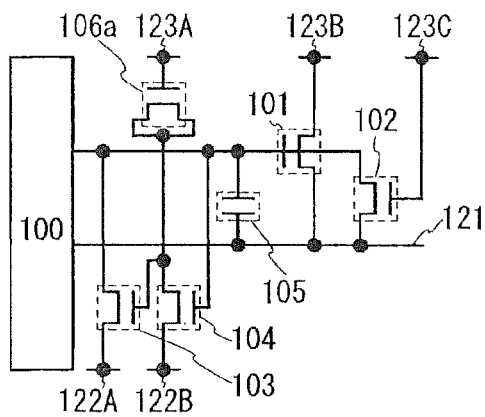

Note that as shown in FIG. 4C, a MOS capacitor can be used as the capacitor 106. In an example in FIG. 4C, a transistor 106a is used as the capacitor 106. The transistor 106a is an n-channel transistor. A first terminal and a second terminal of the transistor 106a are connected to the node B. A gate of the transistor 106a is connected to the wiring 123A. However, this embodiment is not limited to this. The transistor 106a can be a p-channel transistor. Alternatively, one of the first terminal and the second terminal of the transistor 106a can be in a floating state. Alternatively, the gate of the transistor 106a can be connected to the node B. The first terminal and the second terminal of the transistor 106a can be connected to the wiring 123A. Alternatively, an impurity can be added to a channel region of the transistor 106a.

Note that as in FIG. 4C, the transistor 106a can be used as the capacitor 106, the first terminal and the second terminal of the transistor 106a can be connected to the node B, and the gate of the transistor 106a can be connected to the wiring 123A in FIGS. 3A to 3E and FIGS. 4A and 4B.

Figure 4D:
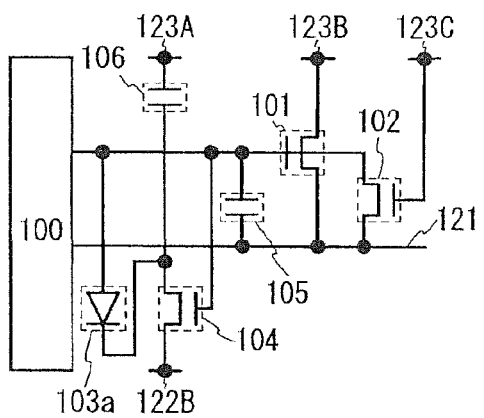

Note that as shown in FIG. 4D, the transistor 103 can be replaced with a diode 103a. The diode 103a corresponds to the transistor 103. In addition, the diode 103a has a function of decreasing the potential of the node A when the potential of the node B is lower than that of the node A, and a function of bringing the node A and the node B out of electrical conduction when the potential of the node B is higher than that of the node A. One terminal (hereinafter also referred to as an input terminal or an anode) of the diode 103a is connected to the node A. The other terminal (hereinafter also referred to as an output terminal or a cathode) of the diode 103a is connected to the node B.

Note that in the case where the transistor 103 is replaced with the diode 103*a* in FIG. 4D, voltage V2 can be supplied to the wiring 122B. Alternatively, an inverted signal (e.g., an inverted clock signal) of the signal S2 can be input to the wiring 123A.

Note that as in FIG. 4D, the transistor 103 can be replaced with the diode 103*a*, one terminal of the diode 103*a* can be connected to the node A, and the other terminal of the diode 103*a* can be connected to the node B in FIGS. 3A to 3E and FIGS. 4A to 4C.

Figure 4E:
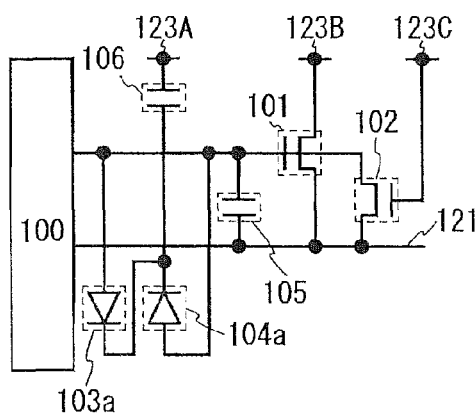

Note that as shown in FIG. 4E, the transistor 104 can be replaced with a diode 104*a*. In FIG. 4E, an example of the case where not only the transistor 104 but also the transistor 103 is replaced with a diode is shown. The diode 104*a* corresponds to the transistor 104. In addition, the diode 104*a* has a function of raising the potential of the node B when the potential of the node A is higher than that of the node B, and a function of bringing the node A and the node B out of electrical conduction when the potential of the node A is lower than that of the node B. One terminal of the diode 104*a* is connected to the node A. The other terminal of the diode 104*a* is connected to the node B.

Note that as in FIG. 4E, the transistor 104 can be replaced with the diode 104*a*, one terminal of the diode 104*a* can be connected to the node A, and the other terminal of the diode 104*a* can be connected to the node B in FIGS. 3A to 3E and FIGS. 4A to 4D.

Figure 4F:
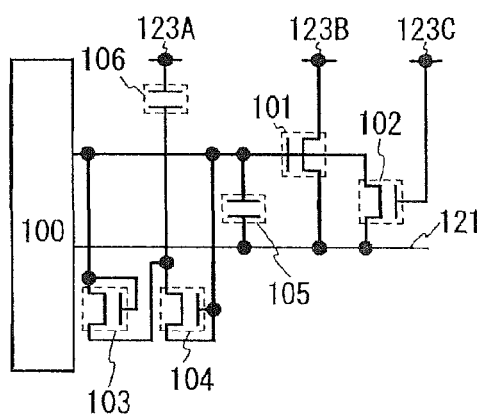

Note that as shown in FIG. 4F, a diode-connected transistor can be used as a diode. The diode-connected transistor 103 and the diode-connected transistor 104 correspond to the diode 103*a* and the diode 104*a*, respectively. The first terminal of the transistor 103 is connected to the node B. The second terminal and the gate of the transistor 103 are connected to the node A. The first terminal and the gate of the transistor 104 are connected to the node A. The second terminal of the transistor 104 is connected to the node B. However, this embodiment is not limited to this. The gate of the transistor 103 can be connected to the node B and the gate of the transistor 104 can be connected to the node B.

Note that as in FIG. 4F, the first terminal of the transistor 103 can be connected to the node B, the second terminal of the transistor 103 can be connected to the node A, and the gate of the transistor 103 can be connected to the node A in FIGS. 3A to 3E and FIGS. 4A to 4E. Alternatively, the first terminal of the transistor 104 can be connected to the node A, the second terminal of the transistor 104 can be connected to the node B, and the gate of the transistor 104 can be connected to the node A. However, this embodiment is not limited to this. The gate of the transistor 103 can be connected to the node B and the gate of the transistor 104 can be connected to the node B.

Figure 5A:
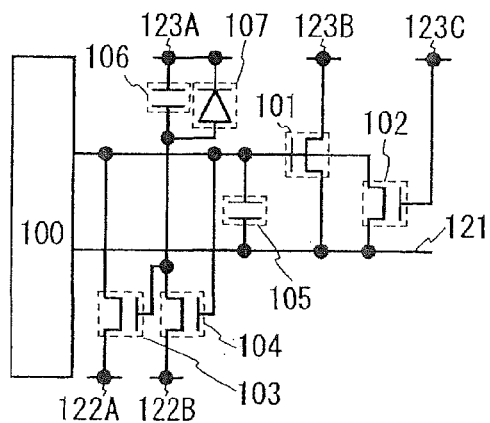
FIGS. 5A to 5E are circuit diagrams of a semiconductor device.

Note that as shown in FIG. 5A, a diode 107 can be additionally provided. The diode 107 has a function of decreasing the potential of the node B when a signal in an L level is input to the wiring 123A and a function of bringing the wiring 123A and the node B out of electrical conduction when a signal in an H level is input to the wiring 123A. One terminal of the diode 107 is connected to the node B. The other terminal of the diode 107 is connected to the wiring 123A. However, this embodiment is not limited to this. The other terminal of the diode 107 can be connected to a different wiring from the wiring 123A.

Note that as in FIG. 5A, the diode 107 can be additionally provided, one terminal of the diode 107 can be connected to the node B, and the other terminal of the diode 107 can be connected to the wiring 123A in FIGS. 3A to 3E and FIGS. 4A to 4F.

Figure 5B:
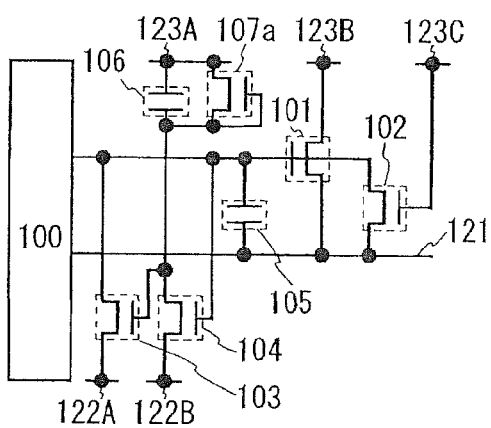

Note that as shown in FIG. 5B, a diode-connected transistor 107*a* can be additionally provided. The diode-connected transistor 107*a* corresponds to the diode 107 and is an n-channel transistor. A first terminal of the transistor 107*a* is connected to the wiring 123A. A second terminal and a gate of the transistor 107*a* are connected to the node B. However, this embodiment is not limited to this. The transistor 107*a* can be a p-channel transistor. Alternatively, the gate of the transistor 107*a* can be connected to the wiring 123A.

Note that as in FIG. 5B, the transistor 107*a* can be additionally provided, the first terminal of the transistor 107*a* can be connected to the wiring 123A, and the second terminal and the gate of the transistor 107*a* can be connected to the node B in FIGS. 3A to 3E, FIGS. 4A to 4F, and FIG. 5A. However, this embodiment is not limited to this. The gate of the transistor 107*a* can be connected to the node B.

Figure 5C:
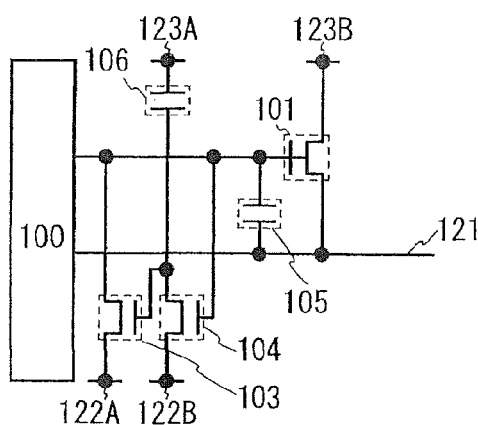

Note that as shown in FIG. 5C, the transistor 102 can be eliminated.

Note that as in FIG. 5C, the transistor 102 can be eliminated in FIGS. 3A to 3E, FIGS. 4A to 4F, and FIGS. 5A and 5B.

Figure 5D:
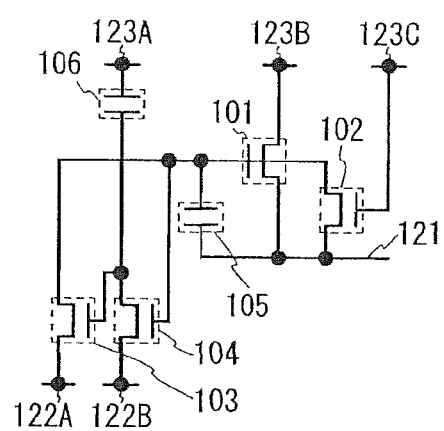

Note that as shown in FIG. 5D, the circuit 100 can be eliminated.

Note that as in FIG. 5D, the circuit 100 can be omitted in FIGS. 3A to 3E, FIGS. 4A to 4F, and FIGS. 5A to 5C.

Figure 5E:
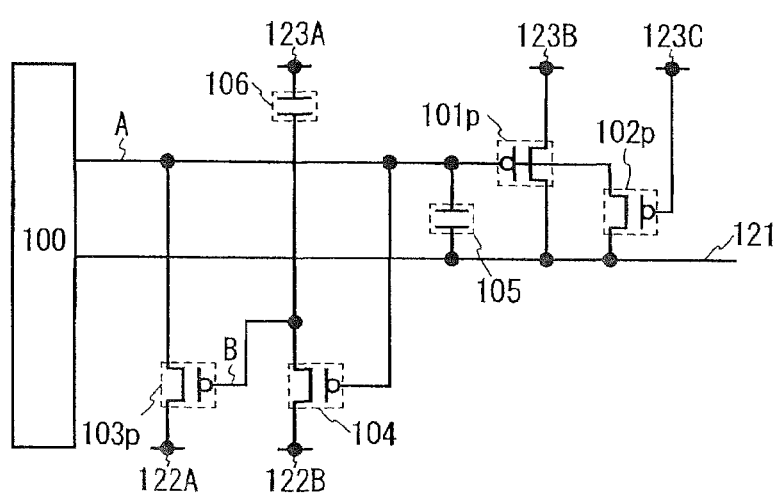

Note that as shown in FIG. 5E, the transistor 101, the transistor 102, the transistor 103, and the transistor 104 can be replaced with a transistor 101*p*, a transistor 102*p*, a transistor 103*p*, and a transistor 104*p*, respectively. The transistors 101*p* to 104*p* correspond to the transistors 101 to 104, respectively, and are p-channel transistors.

Note that in FIG. 5E, a relation of potential is opposite to that in the semiconductor device in FIG. 1A in many cases. For example, the voltage V2 can be supplied to the wirings 122A and 122B and an inverted signal of the signal S2 can be input to the wirings 123A and 123B. Similarly, an inverted signal of the signal S1 is output from the wiring 121 in many cases.

Note that in FIG. 5E, the circuit 100 has a function of decreasing the potential of the node A during the period T1 in many cases. Alternatively, the circuit 100 has a function of raising the potential of the node A to V2 during the period T3 in many cases.

Note that as in FIG. 5E, p-channel transistors can be used as the transistors 101 to 104 in FIGS. 3A to 3E, FIGS. 4A to 4F, and FIGS. 5A to 5D.

[Embodiment 2]

In this embodiment, one example of the semiconductor device will be described. The semiconductor device of this embodiment is a specific example of the semiconductor device described in Embodiment 1. In specific, a specific example of the circuit 100 will be described in this embodiment. Note that the content described in Embodiment 1 can be applied to the semiconductor device in this embodiment.

Figure 6A:
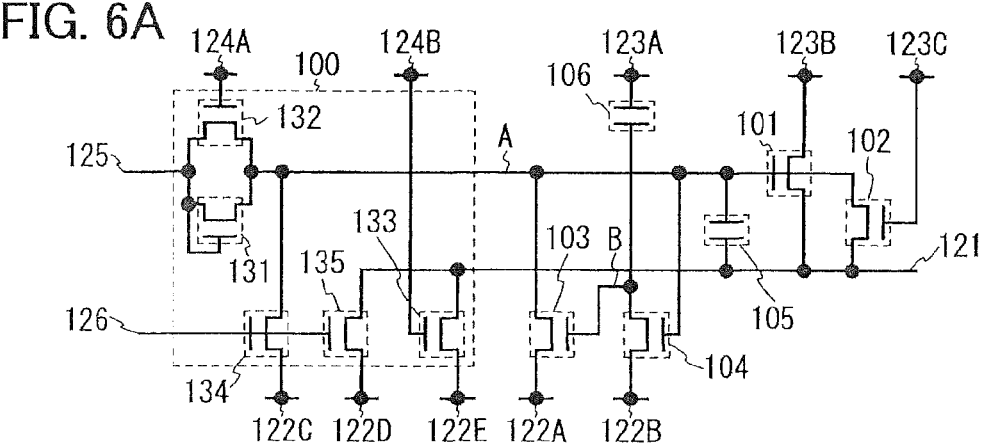
FIG. 6A is a circuit diagram of a semiconductor device and FIGS. 6B and 6C are timing charts each illustrating a driving method of the semiconductor device.

The specific example of the circuit 100 will be explained with reference to FIG. 6A. However, FIG. 6A is one example and this embodiment is not limited to this. Circuits of a variety of structures can be used as the circuit 100 besides the circuit with the structure shown in FIG. 6A. Note that a portion which is similar to that in FIG. 1A is denoted by the same reference numeral and the description thereof is omitted.

The circuit 100 includes a transistor 131, a transistor 132, a transistor 133, a transistor 134, and a transistor 135. Each of the transistors 131 to 135 is an n-channel transistor. However, each of the transistors 131 to 135 can be a p-channel transistor.

A connection relation of the transistors included in the circuit 100 will be described. A first terminal of the transistor 131 is connected to a wiring 125. A second terminal of the transistor 131 is connected to the node A. A gate of the transistor 131 is connected to the wiring 125. A first terminal of the transistor 132 is connected to the wiring 125. A second terminal of the transistor 132 is connected to the node A. A gate of the transistor 132 is connected to the wiring 124A. A first terminal of the transistor 133 is connected to a wiring 122E. A second terminal of the transistor 133 is connected to the wiring 121. A gate of the transistor 133 is connected to a wiring 124B. A first terminal of the transistor 134 is connected to a wiring 122C. A second terminal of the transistor 134 is connected to the node A. A gate of the transistor 134 is connected to the wiring 126. A first terminal of the transistor 135 is connected to a wiring 122D. A second terminal of the transistor 135 is connected to the wiring 121. A gate of the transistor 135 is connected to the wiring 126.

An example of a thing (e.g., a signal, voltage, or current) which can be input to the wirings 122C to 122E, the wirings 124A and 124B, the wiring 125, and the wiring 126 will be described. However, the content described below is one example and this embodiment is not limited to this. A variety of things besides that described below can be input to each wiring. In addition, each wiring can be made in a floating state.

Like the wirings 122A and 122B, the voltage V1 is supplied to the wirings 122C to 122E. Accordingly, the wirings 122C to 122E can function as power supply lines. However, this embodiment is not limited to this. A signal such as a clock signal can be input to the wirings 122C to 122E. In that case, the wirings 122C to 122E can function as signal lines. Alternatively, different voltages can be supplied to the wirings 122C to 122E.

For example, a signal S3 is input to the wirings 124A and 124B. Accordingly, the wirings 124A and 124B can function as signal lines. The signal S3 is an inverted signal of the signal S2 or a signal which is out of phase with the signal S2 by approximately 180° in many cases and can function as an inverted clock signal (CKB). However, this embodiment is not limited to this. Voltage can be supplied to the wirings 124A and 124B. In that case, the wirings 124A and 124B can function as power supply lines. Alternatively, different signals can be input to the wirings 124A and 124B.

For example, a signal S4 is input to the wiring 125. Accordingly, the wiring 125 can function as a signal line. The signal S4 is a digital signal with an L level and an H level in many cases and can function as a start signal (SP), a transfer signal from a different row (stage), or a signal for selecting a different row. However, this embodiment is not limited to this. Voltage can be supplied to the wiring 125. In that case, the wiring 125 can function as a power supply line.

For example, a signal S5 is input to the wiring 126. Accordingly, the wiring 126 can function as a signal line. The signal S5 is a digital signal with an L level or an H level in many cases and can function as a reset signal (RE) or a signal for selecting a different row. However, this embodiment is not limited to this. Voltage can be supplied to the wiring 126. In that case, the wiring 126 can function as a power supply line.

One example of functions of the transistors 131 to 135 will be described. However, the content described below is one example and this embodiment is not limited to this. The transistors 131 to 135 can have a variety of functions besides that described below. Alternatively, it is possible that the transistors 131 to 135 do not have the functions described below.

The transistor 131 has a function of raising the potential of the node A in accordance with a signal (e.g., the signal S4) input to the wiring 125 and functions as a diode. The transistor 132 has a function of controlling a timing when the wiring 125 and the node A are brought into electrical conduction in accordance with a signal (e.g., the signal S3) input to the wiring 124A and functions as a switch. The transistor 133 has a function of controlling a timing when the wiring 122E and the wiring 121 are brought into electrical conduction in accordance with a signal (e.g., the signal S3) input to the wiring 124B and functions as a switch. The transistor 134 has a function of controlling a timing when the wiring 122C and the node A are brought into electrical conduction in accordance with a signal (e.g., the signal S5) input to the wiring 126 and functions as a switch. The transistor 135 has a function of controlling a timing when the wiring 122D and the wiring 121 are brought into electrical conduction in accordance with a signal (e.g., the signal S5) input to the wiring 126 and functions as a switch.

Figure 6B:
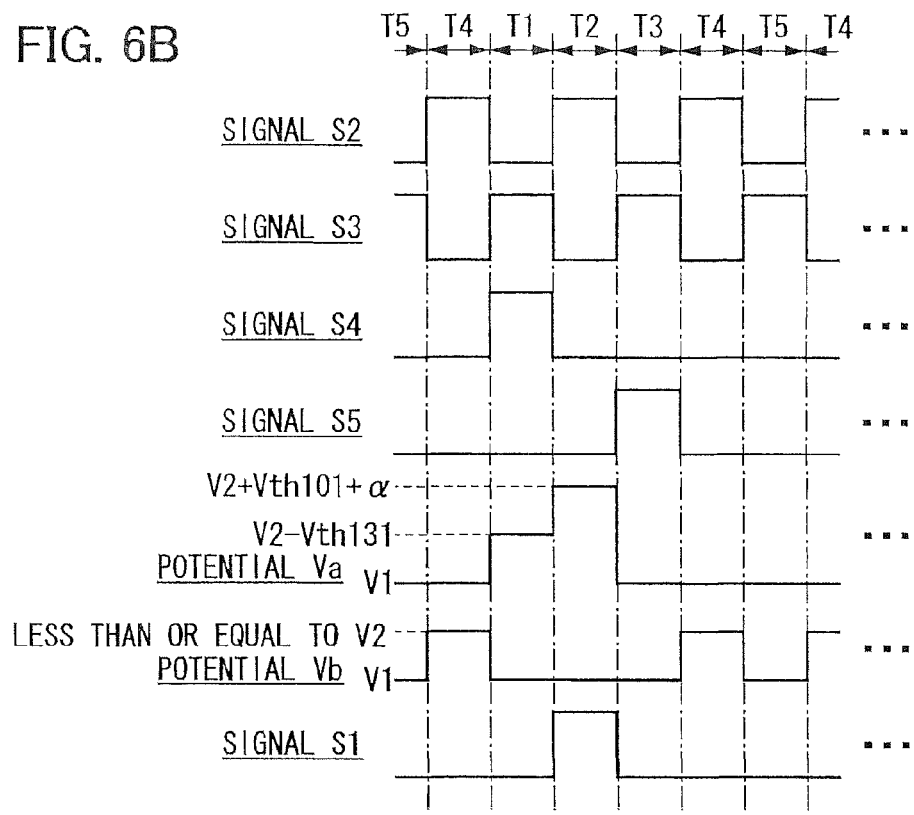
Figure 7A:
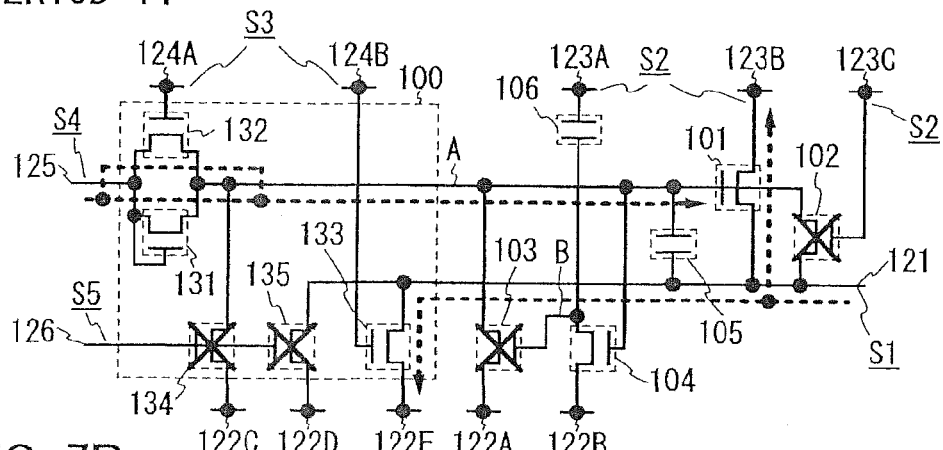
FIGS. 7A to 7C are schematic views illustrating a driving method of a semiconductor device.
Figure 7B:
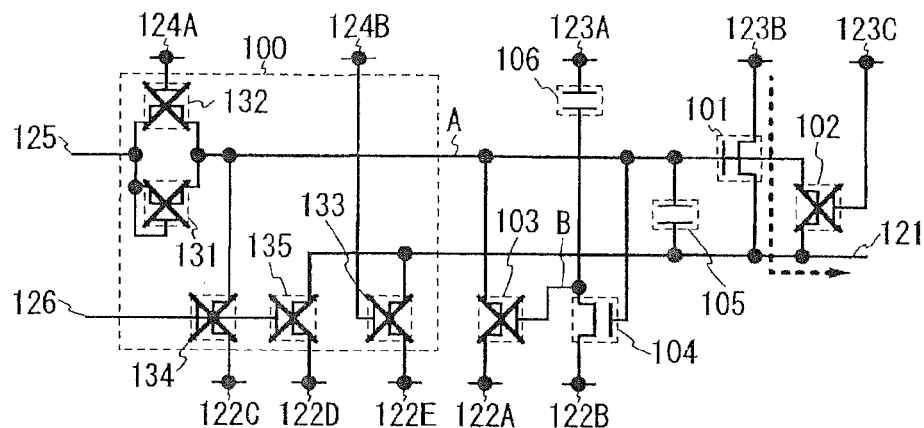
Figure 7C:
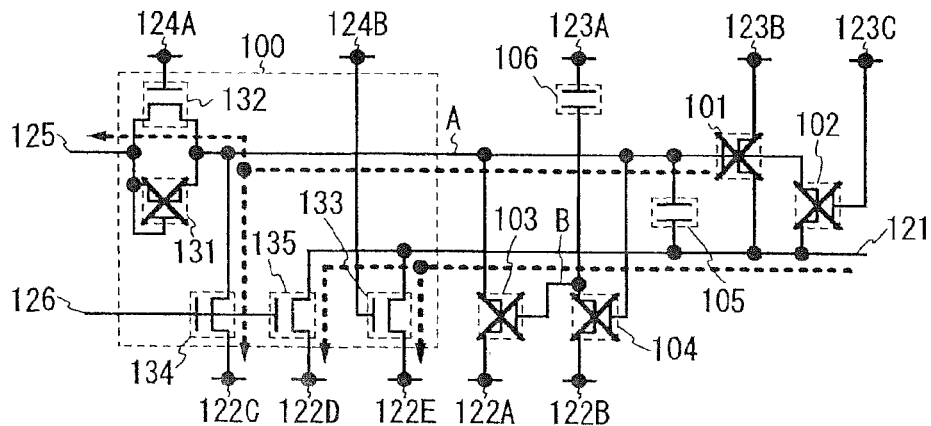
Figure 8A:
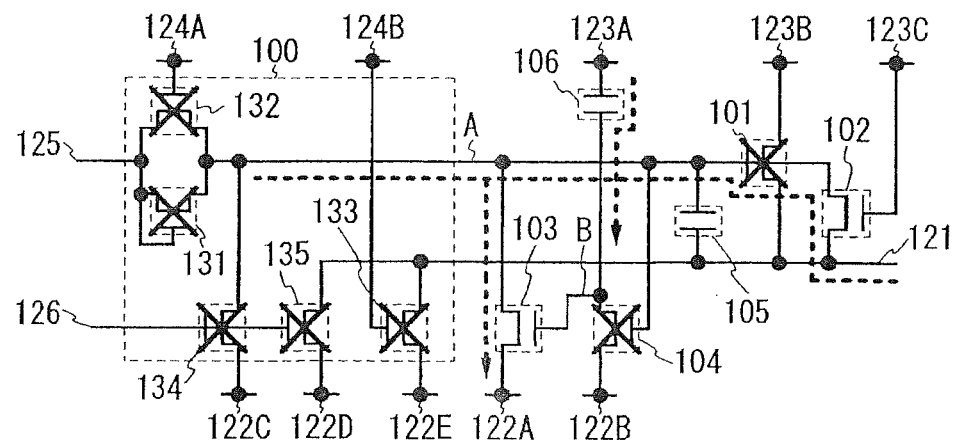
FIGS. 8A and 8B are schematic views illustrating a driving method of a semiconductor device.
Figure 8B:
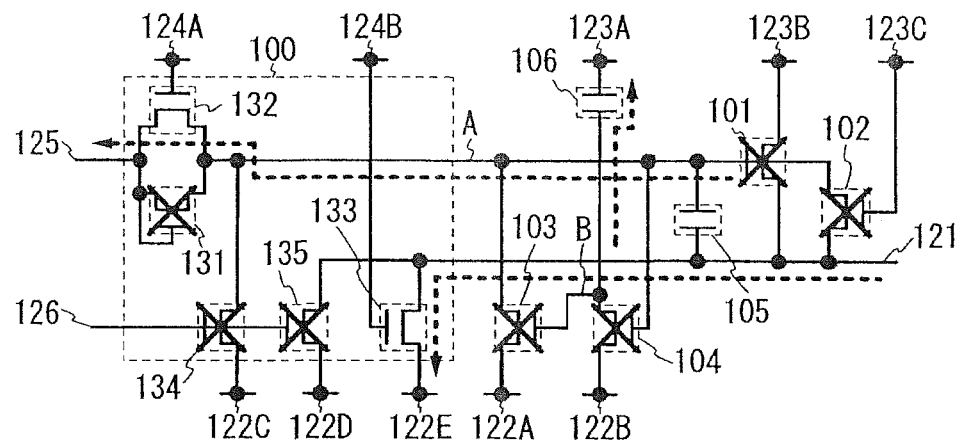

Next, operation of the semiconductor device in FIG. 6A will be described with reference to FIG. 6B, FIGS. 7A to 7C, and FIGS. 8A and 8B. FIG. 6B is one example of a timing chart for illustrating the operation of the semiconductor device and there are a period T1, a period T2, a period T3, a period T4, and a period T5. FIG. 7A is a schematic view of the operation of the semiconductor device in FIG. 6A during the period T1. FIG. 7B is a schematic view of the operation of the semiconductor device in FIG. 6A during the period T2. FIG. 7C is a schematic view of the operation of the semiconductor device in FIG. 6A during the period T3. FIG. 8A is a schematic view of the operation of the semiconductor device in FIG. 6A during the period T4. FIG. 8B is a schematic view of the operation of the semiconductor device in FIG. 6A during the period T5. Note that description of operation in common with the semiconductor device in FIG. 1A is omitted.

First, during the period T1, since the signal S5 is in an L level, the transistor 134 and the transistor 135 are turned off. Accordingly, the wiring 122C and the node A are brought out of electrical conduction and the wiring 122D and the wiring 121 are brought out of electrical conduction. At the same time, since the signal S3 and the signal S4 are made to be in an H level, the transistor 131, the transistor 132, and the transistor 133 are turned on. Then, the wiring 125 and the node A are brought into electrical conduction and the wiring 122E and the wiring 121 are brought into electrical conduction. Accordingly, the signal (the signal S4 in the H level) input to the wiring 125 is supplied from the wiring 125 to the node A, whereby the potential of the node A starts to be raised. Further, since the wiring 122E and the wiring 121 are brought into electrical conduction, the voltage V1 is supplied from the wiring 122E to the wiring 121. After that, when the potential of the node A is raised to a value obtained by subtracting the threshold voltage (Vth131) of the transistor 131 from the potential (V2) in the H level of the signal S4, (V2−Vth131), the transistor 131 is turned off. Similarly, when the potential of the node A is raised to a value obtained by subtracting the threshold voltage (Vth132) of the transistor 132 from the potential (V2) in the H level of the signal S3, (V2−Vth132), the transistor 132 is turned off. When the transistor 131 and the transistor 132 are off, charge is not supplied to the node A. Accordingly, the potential of the node A is maintained as a large value (at least greater than or equal to V1+Vth101) and the node A goes into a floating state. Here, for simplicity, the transistor 131 and the transistor 132 are turned off when the potential of the node A becomes (V2−Vth131). Accordingly, the wiring 125 and the node A are brought out of electrical conduction. The potential of the node A at that time is maintained as (V1 −Vth131) and the node A goes into a floating state.

Next, during the period T2, since the signal S4 is in an L level, the transistor 131 is kept off. Then, since the signal S3 goes into an L level, the transistor 132 is kept off and the transistor 133 is turned off. Accordingly, the wiring 125 and the node A are kept out of electrical conduction and the wiring 122E and the wiring 121 are brought out of electrical conduction. At that time since the signal S5 is kept in the L level, the transistor 134 and the transistor 135 are kept off. Accordingly, the wiring 122C and the node A are kept out of electrical conduction and the wiring 122D and the wiring 121 are kept out of electrical conduction.

Next, during the period T3, since the signal S4 is kept in the L level, the transistor 131 is kept off. Then, since the signal S5 goes into an H level, the transistor 134 and the transistor 135 are turned on. Accordingly, the wiring 122C and the node A are brought into electrical conduction and the wiring 122D and the wiring 121 are brought into electrical conduction. Accordingly, since the voltage V1 is supplied from the wiring 122C to the node A, the potential of the node A is decreased to V1. Similarly, since the voltage V1 is supplied from the wiring 122D to the wiring 121, the potential of the wiring 121 is decreased to V1. At the same time, since the signal S3 goes into an H level, the transistor 132 and the transistor 133 are turned on. Thus, the wiring 125 and the node A are brought into electrical conduction and the wiring 122E and the wiring 121 are brought into electrical conduction. Accordingly, since the signal S4 in the L level is supplied to the node A, the potential of the node A is decreased to V1. Similarly, since the voltage V1 is supplied to the wiring 121, the potential of the wiring 121 is decreased to V1.

Next, during the period T4, since the signal S4 is kept in the L level, the transistor 131 is kept off. Then, since the signal S5 goes into an L level, the transistor 134 and the transistor 135 are turned off. Accordingly, the wiring 122C and the node A are brought out of electrical conduction and the wiring 122D and the wiring 121 are brought out of electrical conduction. At that time, since the signal S4 goes into an L level, the transistor 132 and the transistor 133 are turned off. Accordingly, the wiring 125 and the node A are brought out of electrical conduction and the wiring 122E and the wiring 121 are brought out of electrical conduction.

Next, during the period T5, since the signal S4 is kept in the L level, the transistor 131 is kept off. Then, since the signal S5 is kept in the L level, the transistor 134 and the transistor 135 are kept off. Accordingly, the wiring 122C and the node A are kept out of electrical conduction and the wiring 122D and the wiring 121 are kept out of electrical conduction. At that time, since the signal S3 goes into an H level, the transistor 132 and the transistor 133 are turned on. Accordingly, the wiring 125 and the node A are brought into electrical conduction and the wiring 122E and the wiring 121 are brought into electrical conduction. Accordingly, since the signal S4 in the L level is supplied from the wiring 125 to the node A, the potential of the node A is maintained as V1. Similarly, since the voltage V1 is supplied from the wiring 122E to the wiring 121, the potential of the wiring 121 is maintained as V1.

In the semiconductor device in FIG. 6A, since the signal in the L level or the voltage V1 is supplied to the node A during the periods T4 and T5, noise of the node A can be reduced. Therefore, malfunction can be prevented.

Alternatively, in the semiconductor device in FIG. 6A, since both of the transistor 131 and the transistor 132 are turned on during the period T1, the potential of the node A can be quickly raised. Alternatively, the channel width of the transistor 131 or the channel width of the transistor 132 can be made small.

Note that the channel width of the transistor 131 can be larger than that of the transistor 134 or the transistor 103. Similarly, the channel width of the transistor 132 can be larger than that of the transistor 134 or the transistor 103. This is because the potential of the node A is preferably raised quickly during the period T2 and the potential of the node A is preferably decreased slowly during the period T3. That is, when the potential of the node A is raised quickly during the period T2, increase in driving frequency, suppression of through current, reduction in power consumption, or the like can be achieved. On the other hand, when the potential of the node A is decreased slowly during the period T3, an on time of the transistor 101 becomes long, whereby a rising time of a signal (e.g., the signal S1) output from the wiring 121 can be shortened. Therefore, the channel width of the transistor that has a function of raising the potential of the node A during the period T2 is preferably larger than that of the transistor that decreases the potential of the node A during the period T3. However, this embodiment is not limited to this. The channel width of the transistor 131 can be smaller than that of the transistor 134 or the transistor 103. Similarly, the channel width of the transistor 132 can be smaller than that of the transistor 134 or the transistor 103.

Note that the sum of the channel width of the transistor 131 and the channel width of the transistor 134 can be larger than the channel width of the transistor 134 or the channel width of the transistor 103. This is because, during the period T2, the signal S4 in the H level is supplied from the wiring 125 to the node A through two transistors of the transistor 131 and the transistor 132 connected in parallel. However, this embodiment is not limited to this. The sum of the channel width of the transistor 131 and the channel width of the transistor 134 can be smaller than the channel width of the transistor 134 or the channel width of the transistor 103.

Note that the channel width of the transistor 134 can be smaller than that of the transistor 133. Similarly, the channel width of the transistor 132 can be smaller than that of the transistor 133. Similarly, the channel width of the transistor 103 can be smaller than that of the transistor 102. This is because the load (e.g., wiring resistance, parasitic capacitance, a transistor to be connected, or the like) of the wiring 121 is higher than that of the node A in many cases. Accordingly, the channel width of a transistor that has a function of supplying a signal or voltage to the node A is preferably smaller than that of a transistor that supplies a signal or voltage to the wiring 121. However, this embodiment is not limited to this. The channel width of the transistor 134 can be larger than that of the transistor 133. Similarly, the channel width of the transistor 132 can be larger than that of the transistor 133. Similarly, the channel width of the transistor 103 can be larger than that of the transistor 102.

Note that the channel width of the transistor 103 can be larger than that of the transistor 132. This is because the transistor 103 has a function of maintaining the potential of the node A as V1 during the period T4 while the transistor 132 has a function of maintaining the potential of the node A as V1 during the period T5. In specific, a signal (e.g., the signal S2) input to the wiring 123B is in an H level during the period T4. At that time, if the potential of the node A is raised and the transistor 101 is turned on, the potential of the wiring 121 is raised. Therefore, since the transistor 103 is required to maintain the potential of the node A as V1 and keep the transistor 101 off, the channel width of the transistor 103 is preferably large. On the other hand, since a signal (e.g., the signal S2) input to the wiring 123B is in an L level during the period T5, the potential of the wiring 121 is not raised even if the transistor 101 is turned on. That is, even if the potential of the node A is raised or decreased from V1, the potential of the wiring 121 is not raised. Therefore, since there is no great necessity for reducing the on resistance of the transistor 132, the channel width of the transistor 132 is preferably small. However, this embodiment is not limited to this. The channel width of the transistor 103 can be smaller than that of the transistor 132. This is because the transistor 132 has a function of raising the potential of the node A during the period T1. By increasing the channel width of the transistor 132, the potential of the node A can be quickly raised.

Note that the channel width of the transistor 102 can be smaller than that of the channel width of the transistor 133. This is because, if the channel width of the transistor 102 is too large, the potential of the node A decreases too much during the period T2, whereby the semiconductor device malfunctions. In specific, both of the transistor 102 and the transistor 133 have a function of maintaining the potential of the wiring 121 as V1. However, during the period T2, the transistor 102 is on until the potential of the wiring 121 is raised to a value obtained by subtracting the threshold voltage (Vth102) of the transistor 102 from the potential (V2) of the wiring 123C, (V2−Vth102). Therefore, in order to prevent the potential of the node A from decreasing too much during the period T2, the channel width of the transistor 102 is preferably small. On the other hand, the channel width of the transistor 133 is preferably large in order to maintain the potential of the wiring 121 as V1. However, this embodiment is not limited to this. The channel width of the transistor 102 can be larger than that of the transistor 133. This is because there is a high possibility that the potential of the wiring 121 is raised when the signal S2 goes into an H level during the period T4. Therefore, by increasing the channel width of the transistor 102, rise of the potential of the wiring 121 can be easily suppressed.

Note that as in Embodiment 1, the potential of the signal in the L level which is input to the wiring 124A, the wiring 124B, the wiring 125, and/or the wiring 126 can be lower than V1. In specific, since a period of time when the transistor 132 and the transistor 133 are on is long, the potential of the signal in the L level which is input to the wiring 124A and the wiring 124B is preferably lower than V1.

Note that as in Embodiment 1, the potential of the signal in the H level which is input to the wiring 124A, the wiring 124B, the wiring 125, and/or the wiring 126 can be lower than V2. In specific, since the transistor 132 and the transistor 133 easily deteriorate, the potential of the signal in the H level which is input to the wiring 124A and the wiring 124B is preferably lower than V2.

Note that as in Embodiment 1, a signal can be input to the wiring 122C, the wiring 122D, or the wiring 122E. For example, a signal which goes into an L level during a period (e.g., the period T3) in which the transistor 134 is on can be input to the wiring 122C. For example, the signal S2 or the signal S4 can be given as the signal. A signal which goes into an L level during a period (e.g., the period T3) in which the transistor 135 is on can be input to the wiring 122D. For example, the signal S2 or the signal S4 can be given as the signal. A signal which goes into an L level during a period (e.g., the period T1, the period T3, and the period T5) in which the transistor 133 is on can be input to the wiring 122E. For example, the signal S2 or the signal S3 can be given as the signal.

Figure 13A:
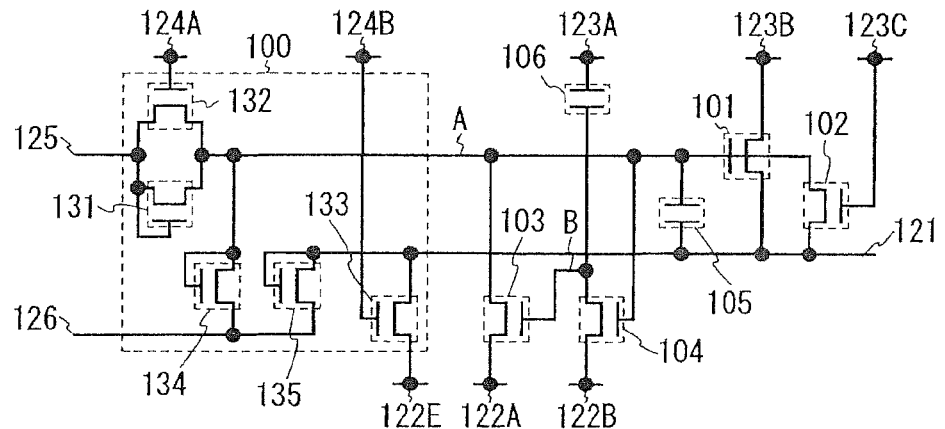
FIGS. 13A to 13C are circuit diagrams of a semiconductor device.
Figure 13B:
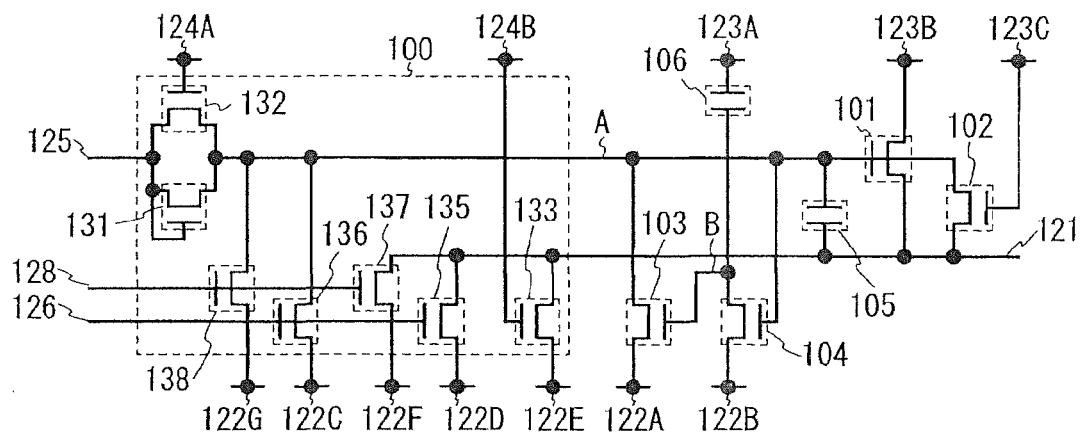
Figure 13C:
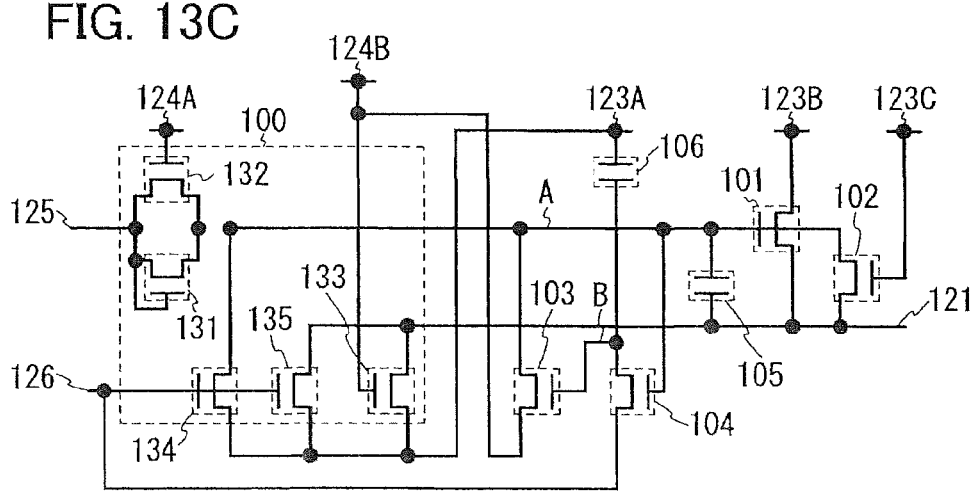

Note that FIG. 13C shows a structure in which the first terminal of the transistor 103 is connected to the wiring 124B, the first terminal of the transistor 104 is connected to the wiring 126, the first terminal of the transistor 133 is connected to the wiring 123A, the first terminal of the transistor 134 is connected to the wiring 123A, and the first terminal of the transistor 135 is connected to the wiring 123A, for example. However, this embodiment is not limited to this. The first terminal of the transistor 103 can be connected to the wiring 124A or the wiring 125. Alternatively, the first terminal of the transistor 133, the first terminal of the transistor 134, or the first terminal of the transistor 135 can be connected to the wiring 121, the wiring 123B, the wiring 123C, or the wiring 126.

Note that as in Embodiment 1, voltage (e.g., the voltage V1 or the voltage V2) can be supplied to the wiring 124A, the wiring 124B and/or the wiring 126. In this manner, the semiconductor device can function as an inverter circuit or a buffer circuit.

Figure 9A:
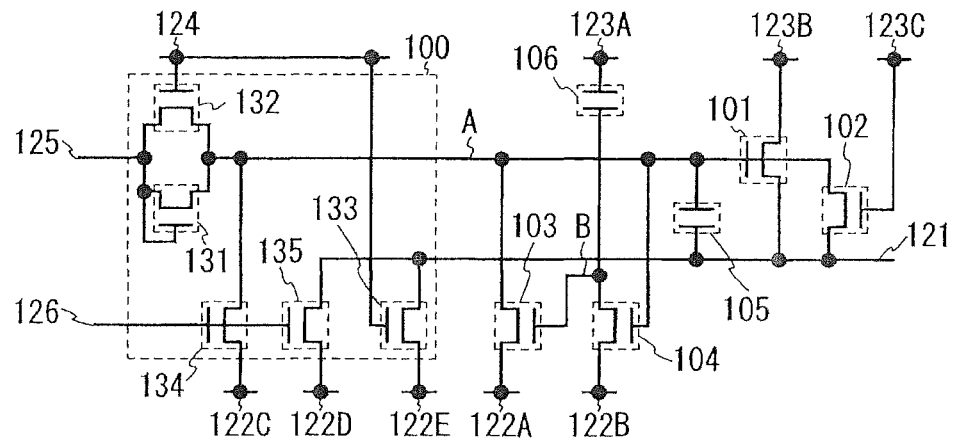
FIGS. 9A to 9C are circuit diagrams of a semiconductor device.

Note that as shown in FIG. 9A, since the same signal (e.g., the signal S3) is input to the wiring 124A and the wiring 124B, the wiring 124A and the wiring 124B can be shared. Accordingly, the gate of the transistor 132 and the gate of the transistor 133 are connected to the wiring 124. The wiring 124 corresponds to the wiring 124A or the wiring 124B. A signal similar to that input to these wirings can be input to the wiring 124.

Figure 9B:
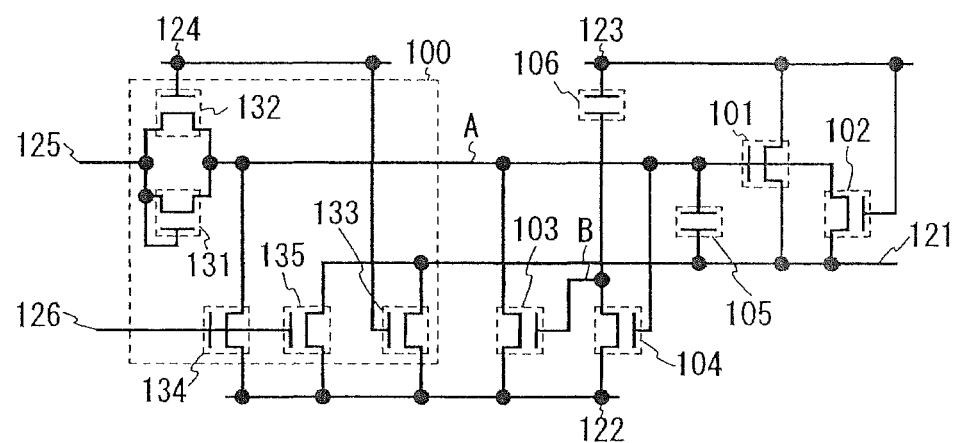
Figure 9C:
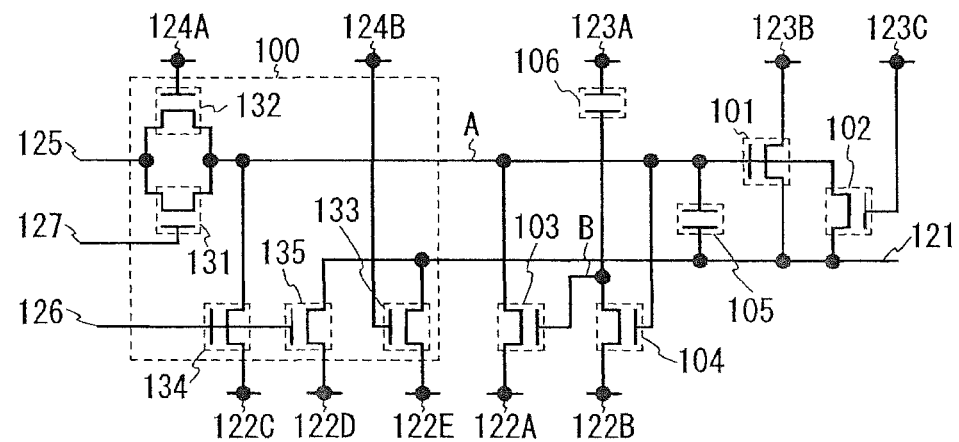

Note that FIG. 9C shows a structure in which FIG. 3C and FIG. 9A are combined. For example, the first terminal of the transistor 101, the gate of the transistor 102, and one electrode of the capacitor 106 are connected to the wiring 123. The gate of the transistor 132 and the gate of the transistor 133 are connected to the wiring 124. The first terminal of the transistor 103, the first terminal of the transistor 104, the first terminal of the transistor 133, the first terminal of the transistor 134, and the first terminal of the transistor 135 are connected to the wiring 122.

Note that as shown in FIG. 9C, the gate of the transistor 131 can be connected to the wiring 127. For example, the voltage V2 is supplied to the wiring 127 and the wiring 127 can function as a power supply line. However, this embodiment is not limited to this. A variety of things such as current, voltage, or a signal can be input to the wiring 127. For example, since a signal that is input to the wiring 127 is preferably in an H level during the period T1 and is in an L level during the period T2, the signal S3 can be input to the wiring 127. In that case, the wiring 127 can be connected to the wiring 124A or the wiring 124B and function as a signal line.

Note that in FIG. 9C, although the gate of the transistor 131 is connected to the wiring 127, this embodiment is not limited to this. For example, the first terminal of the transistor 131 can be connected to the wiring 127 and the gate of the transistor 131 can be connected to the wiring 125.

Note that as in FIG. 9C, the gate of the transistor 131 can be connected to the wiring 127 in FIGS. 9A and 9B.

Figure 10A:
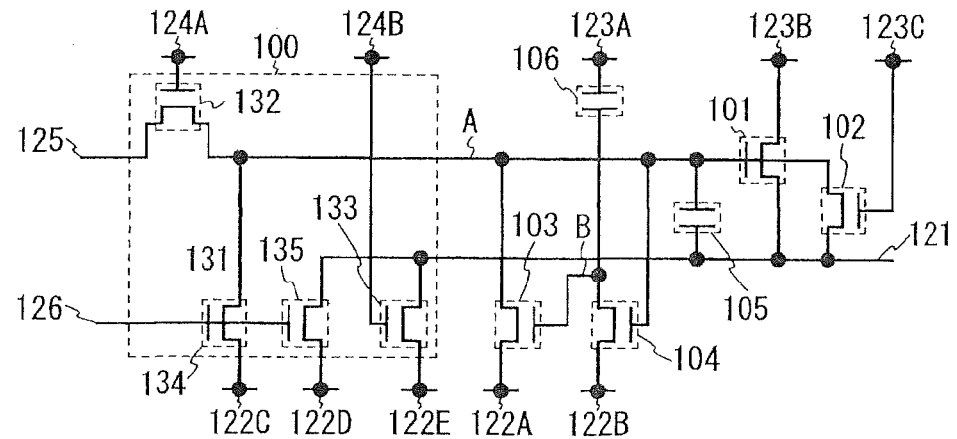
FIGS. 10A to 10C are circuit diagrams of a semiconductor device.

Note that as shown in FIG. 10A, the transistor 131 can be eliminated. Even though the transistor 131 is eliminated, the potential of the node A is raised because the transistor 132 is on during the period T1.

Note that as in FIG. 10A, the transistor 131 can be eliminated in FIGS. 9A to 9C.

Figure 10B:
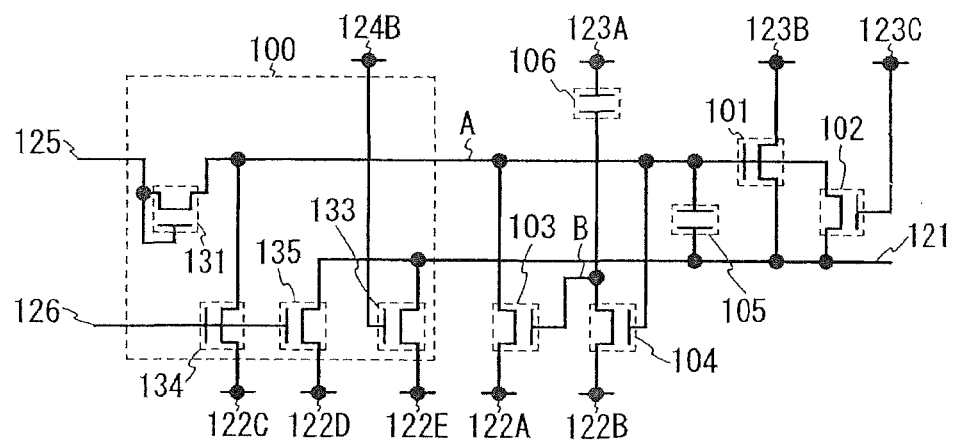

Note that as shown in FIG. 10B, the transistor 132 can be eliminated. Even though the transistor 132 is eliminated, the potential of the node A is maintained as V1 because the node A goes into a floating state in the period T5.

Note that as in FIG. 10B, the transistor 132 can be eliminated in FIGS. 9A to 9C and FIG. 10A.

Figure 10C:
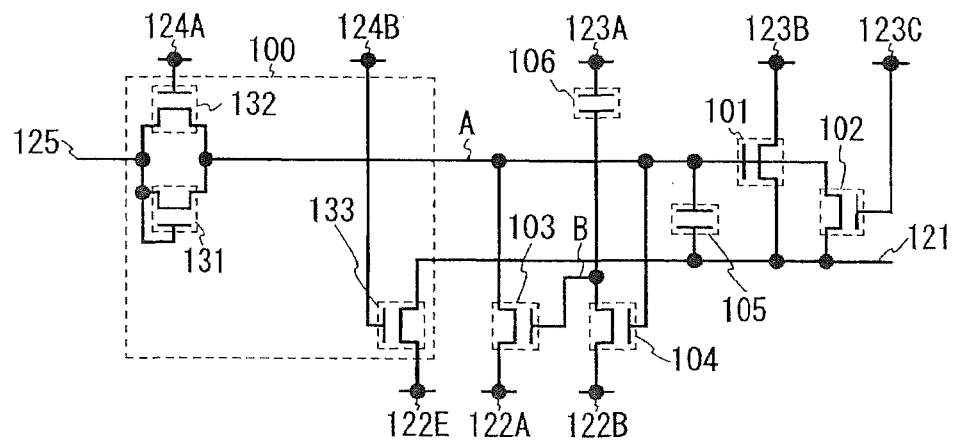

Note that as shown in FIG. 10C, the transistor 134 and the transistor 135 can be eliminated. Alternatively, one of the transistor 134 and the transistor 135 can be eliminated. Even though the transistor 134 is eliminated, the potential of the node A is decreased to V1 because the transistor 132 is turned on in the period T3. Similarly, even though the transistor 135 is eliminated, the potential of the wiring 121 is decreased to V1 because the transistor 133 is turned on in the period T3.

Note that as in FIG. 10C, the transistor 134 and the transistor 135 can be eliminated in FIGS. 9A to 9C and FIGS. 10A and 10B.

Figure 11A:
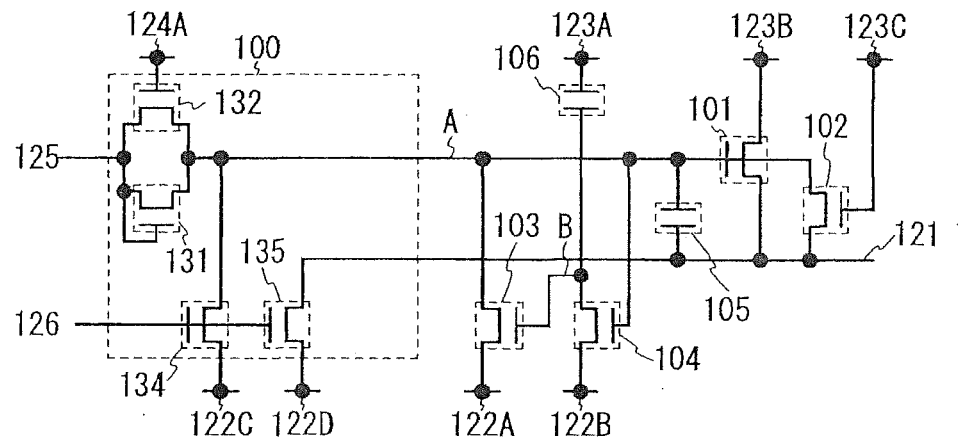
FIGS. 11A to 11C are circuit diagrams of a semiconductor device.

Note that as shown in FIG. 11A, the transistor 133 can be eliminated. Even though the transistor 133 is eliminated, the potential of the wiring 121 is maintained as V1 because the wiring 121 goes into a floating state in the period T5.

Note that as in FIG. 11A, the transistor 133 can be eliminated in FIGS. 9A to 9C and FIGS. 10A to 10C.

Figure 11B:
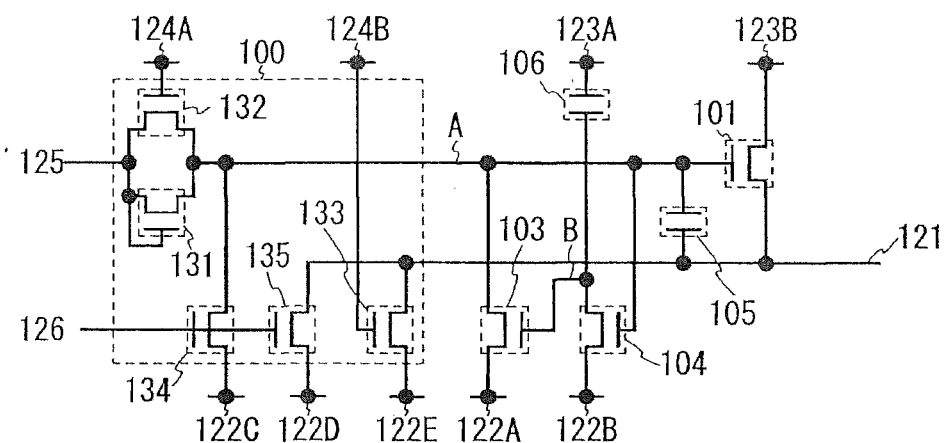

Note that as shown in FIG. 11B, the transistor 102 can be eliminated. Even though the transistor 102 is eliminated, the potential of the wiring 121 is maintained as V1 because the wiring 121 goes into a floating state in the period T4.

Note that as in FIG. 11B, the transistor 102 can be eliminated in FIGS. 9A to 9C, FIGS. 10A to 10C, and FIG. 11A.

Figure 11C:
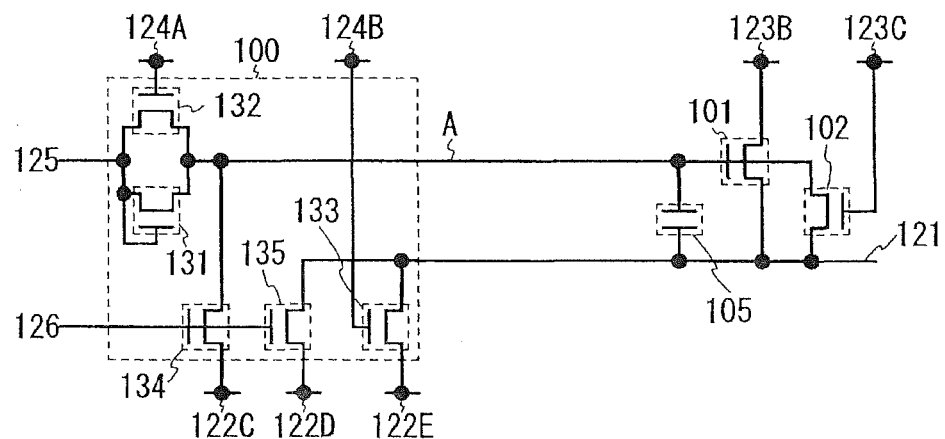

Note that as shown in FIG. 11C, the transistor 103, the transistor 104, and the capacitor 106 can be eliminated. Even though the transistor 103, the transistor 104, and the capacitor 106 are eliminated, the potential of the wiring 121 is maintained as V1 because the wiring 121 goes into a floating state in the period T4.

Note that as in FIG. 11C, the transistor 103, the transistor 104, and the capacitor 106 can be eliminated in FIGS. 9A to 9C, FIGS. 10A to 10C, and FIGS. 11A and 11B.

Figure 12A:
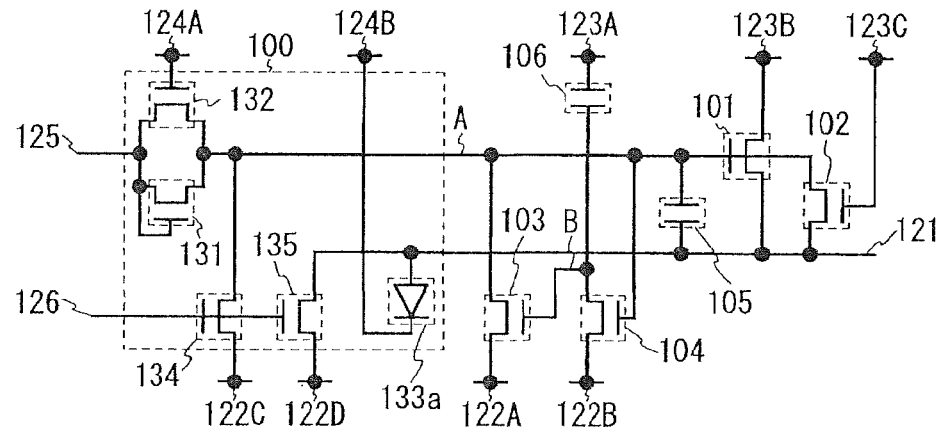
FIGS. 12A to 12C are circuit diagrams of a semiconductor device.

Note that as shown in FIG. 12A, the transistor 133 can be replaced with a diode 133a. The diode 133a corresponds to the transistor 133. The diode 133a has a function of decreasing the potential of the wiring 121 when a signal in an L level is input to the wiring 124B, and a function of bringing the wiring 124B and the wiring 121 out of electrical conduction when a signal in an H level is input to the wiring 124B. One terminal (hereinafter referred to as an input terminal or an anode) of the diode 133a is connected to the wiring 121. The other terminal (hereinafter referred to as an output terminal or a cathode) of the diode 133a is connected to the wiring 124B.

Note that in FIG. 12A, in the case where the transistor 133 is replaced with the diode 133a, the signal S2 can be input to the wiring 124B. Therefore, the wiring 124B can be connected to the wirings 123A to 123C and the wiring 124B and the wirings 123A to 123C can be shared.

Note that as in FIG. 12A, the transistor 133 can be replaced with the diode 133a, one terminal of the diode 133a can be connected to the wiring 121, and the other terminal of the diode 133a can be connected to the wiring 124B in FIGS. 9A to 9C, FIGS. 10A to 10C, and FIGS. 11A to 11C.

Figure 12B:
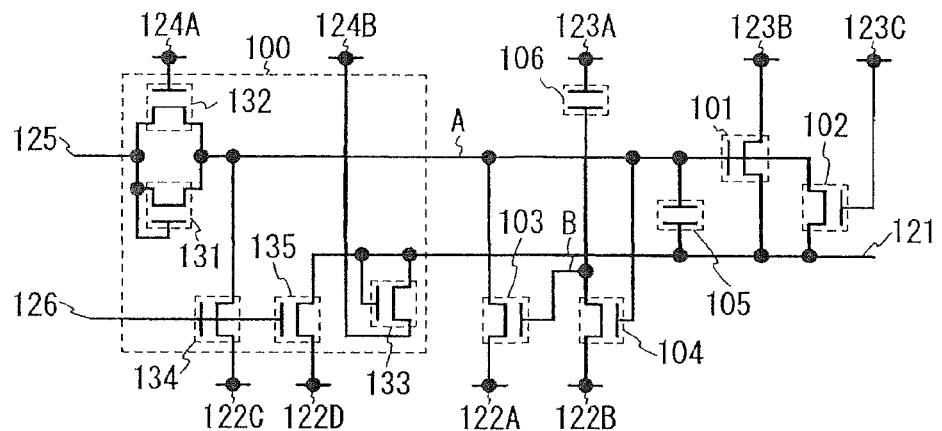

Note that as shown in FIG. 12B, the transistor 133 can be diode-connected. The diode-connected transistor 133 corresponds to the diode 133a. The first terminal of the transistor 133 is connected to the wiring 124B. The second terminal of the transistor 133 is connected to the wiring 121. The gate of the transistor 133 is connected to the wiring 121. However, this embodiment is not limited to this. The gate of the transistor 133 can be connected to the wiring 124B.

Note that as in FIG. 12B, the first terminal of the transistor 133 can be connected to the wiring 124B, the second terminal of the transistor 133 can be connected to the wiring 121, and the gate of the transistor 133 can be connected to the wiring 121 in FIGS. 9A to 9C, FIGS. 10A to 10C, FIGS. 11A to 11C, and FIG. 12A. However, this embodiment is not limited to this. The gate of the transistor 133 can be connected to the wiring 124B.

Figure 12C:
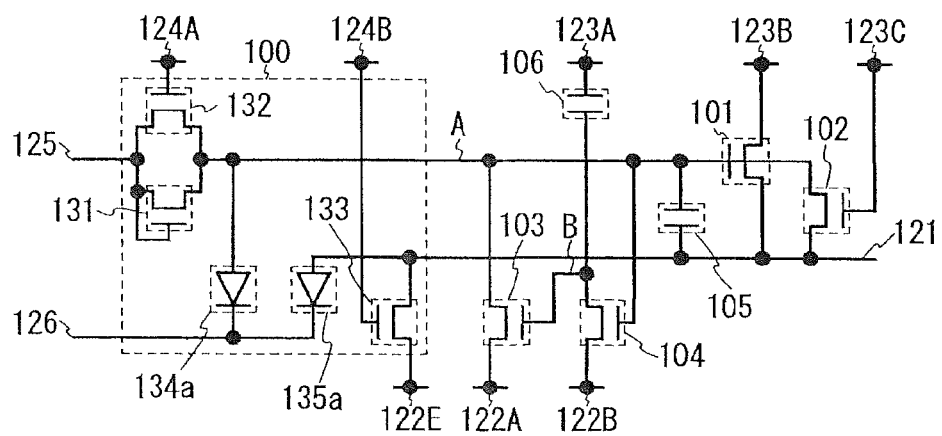

Note that as shown in FIG. 12C, the transistor 134 can be replaced with a diode 134a, and the transistor 135 can be replaced with a diode 135a. The diode 134a and the diode 135a correspond to the transistor 134 and the transistor 135, respectively. The diode 134a has a function of decreasing the potential of the node A when a signal in an L level is input to the wiring 126, and a function of bringing the wiring 126 and the node A out of electrical conduction when a signal in an H level is input to the wiring 126. The diode 135a has a function of decreasing the potential of the wiring 121 when a signal in an L level is input to the wiring 126, and a function of bringing the wiring 126 and the wiring 121 out of electrical conduction when a signal in an H level is input to the wiring 126. One terminal (hereinafter referred to as an input terminal or an anode) of the diode 134a is connected to the node A. The other terminal (hereinafter referred to as an output terminal or a cathode) of the diode 134a is connected to the wiring 126. One terminal (hereinafter referred to as an input terminal or an anode) of the diode 135a is connected to the wiring 121. The other terminal (hereinafter referred to as an output terminal or a cathode) of the diode 135a is connected to the wiring 126.

Note that in the case where the transistor 134 and the transistor 135 are replaced with diodes in FIG. 12C, an inverted signal of the signal S5 can be input to the wiring 126, for example.

Note that in FIG. 12C, only one of the transistor 134 and the transistor 135 can be replaced with a diode.

Note that as in FIG. 12C, the transistor 134 can be replaced with the diode 134a, one terminal of the diode 134a can be connected to the node A, and the other terminal of the diode 134a can be connected to the wiring 126 in FIGS. 9A to 9C, FIGS. 10A to 10C, FIGS. 11A to 11C, and FIGS. 12A and 12B. Alternatively, the transistor 135 can be replaced with the diode 135a, one terminal of the diode 135a can be connected to the wiring 121, and the other terminal of the diode 135a can be connected to the wiring 126.

Note that as shown in FIG. 13A, the transistor 134 and the transistor 135 can be diode-connected. The diode-connected transistor 134 and the diode-connected transistor 135 correspond to the diode 134a and the diode 135a, respectively. The first terminal of the transistor 134 is connected to the wiring 126. The second terminal of the transistor 134 is connected to the node A. The gate of the transistor 134 is connected to the node A. The first terminal of the transistor 135 is connected to the wiring 126. The second terminal of the transistor 135 is connected to the wiring 121. The gate of the transistor 135 is connected to the wiring 121. However, this embodiment is not limited to this. The gate of the transistor 134 can be connected to the wiring 126. The gate of the transistor 135 can be connected to the wiring 126.

Note that as in FIG. 13A, the first terminal of the transistor 134 can be connected to the wiring 126, the second terminal of the transistor 134 can be connected to the node A, and the gate of the transistor 134 can be connected to the node A in FIGS. 9A to 9C, FIGS. 10A to 10C, FIGS. 11A to 11C, and FIGS. 12A to 12C. Alternatively, the first terminal of the transistor 135 can be connected to the wiring 126, the second terminal of the transistor 135 can be connected to the wiring 121, and the gate of the transistor 135 can be connected to the wiring 121. However, this embodiment is not limited to this. The gate of the transistor 134 can be connected to the wiring 126. The gate of the transistor 135 can be connected to the wiring 126.

Note that as shown in FIG. 13B, a transistor 137 and a transistor 138 can be additionally provided. The transistor 137 and the transistor 138 are n-channel transistors. However, this embodiment is not limited to this. The transistor 137 and the transistor 138 can be p-channel transistors. A first terminal of the transistor 137 is connected to the wiring 122F. A second terminal of the transistor 137 is connected to the wiring 121. A gate of the transistor 137 is connected to the wiring 128. A first terminal of the transistor 138 is connected to the wiring 122G A second terminal of the transistor 138 is connected to the node A. A gate of the transistor 138 is connected to the wiring 128. For example, a signal S6 is input to the wiring 128. Therefore, the wiring 128 can function as a signal line. The signal S6 is a digital signal with an H level and an L level in many cases. For example, the signal S6 can function as a signal which resets all the stages. For example, the voltage V1 is supplied to the wiring 122F and the wiring 122G Therefore, the wiring 122F and the wiring 122G can function as power supply lines. Accordingly, the wirings 122A to 122G can be shared. In that case, the first terminal of the transistor 137 and the first terminal of the transistor 138 can be connected to the wiring 122 as shown in FIG. 11B. However, a variety of things such as current, voltage, or signal can be input to the wiring 128, the wiring 122F, and the wiring 122G.

Note that in FIG. 13B, the signal S6 can be in an H level during a period before a semiconductor device starts to operate. Alternatively, in the case where a semiconductor device shown in FIG. 13B is used as a shift register, the signal S6 can be in an H level during a period before the shift register starts to scan or a period after the shift register has completed the scanning. Therefore, as the signal S6, a start pulse of the shift register, an output signal from the lowest stage of the shift register, or the like can be used. However, one example of this embodiment is not limited to this.

Note that in FIG. 13B, only one of the transistor 137 and the transistor 138 can be additionally provided.

Note that as in FIG. 13B, the transistor 137 can be additionally provided, the first terminal of the transistor 137 can be connected to the wiring 122F, the second terminal of the transistor 137 can be connected to the wiring 121, and the gate of the transistor 137 can be connected to the wiring 128 in FIGS. 9A to 9C. FIGS. 10A to 10C, FIGS. 11A to 11C, FIGS. 12A to 12C, and FIG. 13A. Alternatively, the transistor 138 can be additionally provided, the first terminal of the transistor 138 can be connected to the wiring 122G, the second terminal of the transistor 138 can be connected to the node A, and the gate of the transistor 138 can be connected to the wiring 128.

[Embodiment 3]

In this embodiment, one example of a shift register is described. The shift register in this embodiment can include the semiconductor device of Embodiment 1 and Embodiment 2. Note that the shift register can also be referred to as a semiconductor device or a gate driver. Note that the content described in Embodiment 1 and Embodiment 2 can be applied to that of the shift register in this embodiment.

First, one example of the shift register will be described with reference to FIG. 14A. A shift register 220 is connected to wirings 201_1 to 201_N (N is a natural number), a wiring 202, a wiring 203, a wiring 204, a wiring 205, and a wiring 206.

The wiring 202 corresponds to the wiring 123 (the wirings 123A to 123C) described in Embodiment 1 and Embodiment 2 or the wiring 124 (the wirings 124A and 124B) described in Embodiment 1 and Embodiment 2 and can function as a signal line or a clock signal line. In addition, a signal GS2 is input from a circuit 221 to the wiring 202. The signal GS2 corresponds to the signal S2 or the signal S3 described in Embodiment 1 and Embodiment 2 and can function as a clock signal.

The wiring 203 corresponds to the wiring 123 (the wirings 123A to 123C) described in Embodiment 1 and Embodiment 2 or the wiring 124 (the wirings 124A and 124B) described in Embodiment 1 and Embodiment 2 and can function as a signal line or a clock signal line. In addition, a signal GS3 is input from the circuit 221 to the wiring 203. The signal GS3 corresponds to the signal S2 or the signal S3 described in Embodiment 1 and Embodiment 2 and can function as an inverted clock signal.

The wiring 204 corresponds to the wiring 122 (the wirings 122A to 122G) described in Embodiment 1 and Embodiment 2 and can function as a power supply line. In addition, voltage V1 is input from the circuit 221 to the wiring 204.

The wiring 205 corresponds to the wiring 125 described in Embodiment 1 and Embodiment 2 and can function as a signal line. In addition, a signal GS4 is input from the circuit 221 to the wiring 205. The signal GS4 corresponds to the signal S4 described in Embodiment 1 and Embodiment 2 and can function as a start signal (hereinafter referred to as a start pulse) or a vertical synchronizing signal.

The wiring 206 corresponds to the wiring 126 described in Embodiment 1 and Embodiment 2 and can function as a signal line. In addition, a signal GS5 is input from a circuit 221 to the wiring 206. The signal GS5 corresponds to the signal S5 described in Embodiment 1 and Embodiment 2 and can function as a reset signal.

However, this embodiment is not limited to the above description. A variety of things such as a signal, voltage, or current can be input to the wirings 202 to 206. Each wiring can be in a floating state.

Figure 6C:
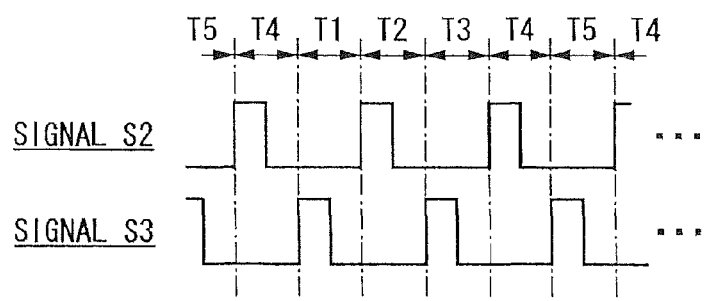

Note that as shown in FIG. 6C, an unbalanced clock signal can be used as the signal S2 or the signal S3. In that case, for example, the signal S3 can have a phase which is deviated from that of the S2 by 180°. Accordingly, in the case where the semiconductor device of this embodiment is used as a shift register, a selection signal in one stage can be prevented from overlapping with a selection signal in the previous stage or the next stage.

The wirings 201_1 to 201_N each correspond to the wiring 121 described in Embodiment 1 and Embodiment 2 and can each function as a gate line or a scan line. In addition, signals GS1_1 to GS1_N are output from the wirings 201_1 to 201_N, respectively. The signals GS1_1 to GS1_N each correspond to the signal S1 described in Embodiment 1 and Embodiment 2 and can each function as an output signal, a selection signal, a scanning signal, or a gate signal.

Figure 14B:
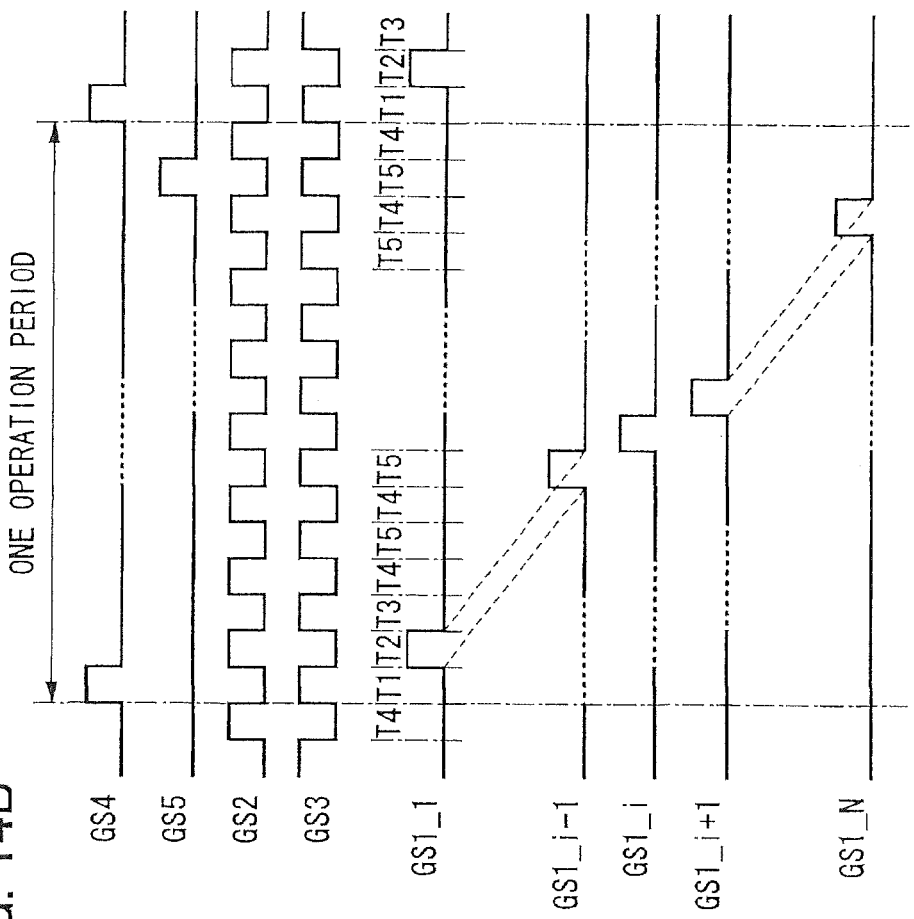
FIG. 14A is a circuit diagram of a shift register and FIG. 14B is a timing chart illustrating a driving method of the shift register.

Note that as shown in FIG. 14B, the signals GS1_1 to GS1_N go into an H level in order from the signal GS1_1. For example, the signal GS1_i−1 (i is any one of 1 to N) goes into an H level. After that, when the signal GS2 and the signal SG3 are inverted, the signal GS1_i−1 goes into an L level and the signal GS1_i goes into an H level. After that, when the signal GS2 and the signal SG3 are inverted again, the signal GS1_i goes into an L level and a signal GS_i+1 goes into an H level. In this manner, the signals GS1_1 to GS1_N sequentially go into an H level. In other words, the wirings 201_1 to 201_N are sequentially selected.

The circuit 221 has a function of supplying a signal, voltage, or the like to the shift register 220 to control the shift register 220 and can function as a control circuit or a controller or the like. In this embodiment, the circuit 211 supplies the signal GS2, the signal GS3, the voltage V1, the signal GS4, and the signal GS5 to the wiring 202, the wiring 203, the wiring 204, the wiring 205, and the wiring 206, respectively. However, this embodiment is not limited to this. The shift register 220 can supply a signal, current, voltage, or the like to a variety of circuits besides these wirings to control these circuits. For example, the circuit 221 can supply a signal, voltage, or the like to a signal line driver circuit, a scan line driver circuit, a pixel, and/or the like to control these circuits.

The circuit 221 includes a circuit 222 and a circuit 223, for example. The circuit 222 has a function of generating power supply voltage such as positive power supply voltage, negative power supply voltage, ground voltage, or reference voltage and can function as a power supply circuit or a regulator. The circuit 223 has a function of generating a variety of signals such as a clock signal, an inverted clock signal, a start signal, a reset signal, and/or a video signal and can function as a timing generator. However, this embodiment is not limited to this. The circuit 221 can include a variety of circuits or a variety of elements in addition to the circuit 222 and the circuit 223. For example, the circuit 221 can include an oscillator, a level shifter circuit, an inverter circuit, a buffer circuit, a DA converter circuit, an AD converter circuit, an operational amplifier, a shift register, a look-up table, a coil, a transistor, a capacitor, a resistor, a frequency divider, and/or the like.

Figure 15:
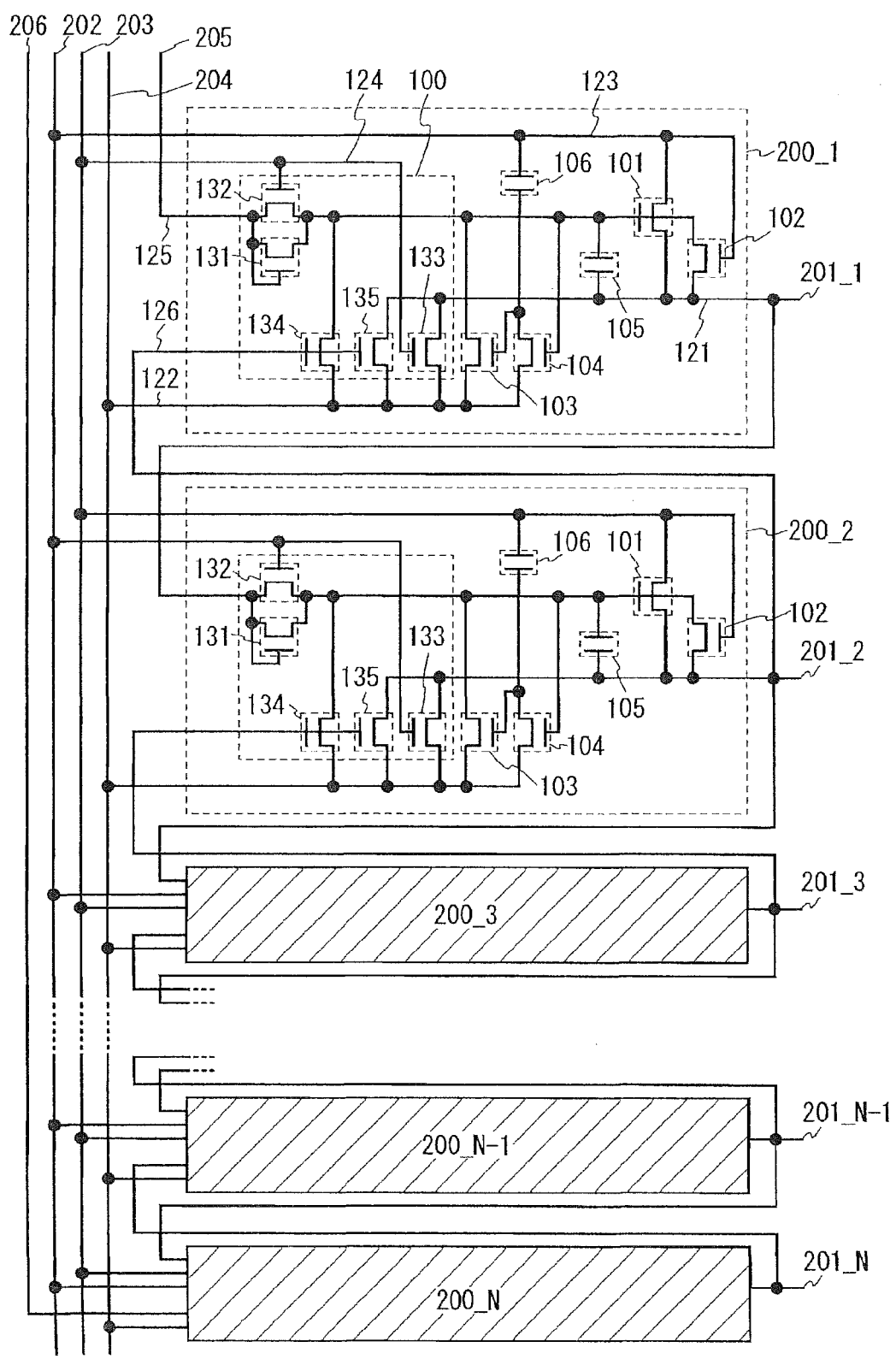
FIG. 15 is a circuit diagram of a shift register.

Next, one example of the shift register 220 will be described with reference to FIG. 15. The shift register in FIG. 15 includes a plurality of flip-flops of flip-flops 200_1 to 200_N (N is a natural number). The flip-flops 200_1 to 200_N each correspond to the semiconductor device described in Embodiment 1 and Embodiment 2. FIG. 15 shows a structure in which the semiconductor device in FIG. 9B is used as a flip-flop as an example.

Connection relations of the shift register are described. First, as an example, a connection relation of the flip-flop 200_i is described. In the flip-flop 200_i, the wiring 121, the wiring 122, the wiring 123, the wiring 124, the wiring 126, and the wiring 127 are connected to the wiring 201_i, the wiring 204, the wiring 202, the wiring 203, the wiring 201_i−1, and the wiring 201_i+1, respectively. However, the wirings to be connected to the wiring 123 and the wiring 124 are switched in a flip-flop of an odd-numbered stage and a flip-flop of an even-numbered stage in many cases. For example, if the wiring 123 is connected to the wiring 202 and the wiring 124 is connected to the wiring 203 in the flip-flop of the odd-numbered stage, the wiring 123 is connected to the wiring 203 and the wiring 124 is connected to the wiring 202 in the flip-flop of the even-numbered stage. On the other hand, if the wiring 123 is connected to the wiring 203 and the wiring 124 is connected to the wiring 202 in the flip-flop of the odd-numbered stage, the wiring 123 is connected to the wiring 202 and the wiring 124 is connected to the wiring 203 in the flip-flop of the even-numbered stage.

Note that in the flip-flop 200_1, the wiring 125 is connected to the wiring 205.

Note that in the flip-flop 200_N, the wiring 126 is connected to the wiring 206.

Next, one example of operation of the shift register shown in FIG. 15 is described with reference to a timing chart shown in FIG. 14B. Note that description of operation which is the same as that of the semiconductor device described in Embodiment 1 and Embodiment 2 is omitted.

Operation of the flip-flop 200_i is described. First, the signal GS1_i−1 goes into an H level. Then, the flip-flop 200_i starts operation in the period T1 and the signal GS1_i goes into an L level. After that, the signal GS2 and the signal GS3 are inverted. Then, the flip-flop 200_i starts operation in the period T2 and the signal GS1_i goes into an H level. The signal GS1_i is input to the flip-flop 200_i−1 as a reset signal and is input to the flip-flop 200_i+1 as a start signal. Accordingly, the flip-flop 200_i−1 starts operation in the period T3 and the flip-flop 200_i+1 starts operation in the period T1. After that, the signal GS2 and the signal GS3 are inverted again. Then, the flip-flop 200_i+1 starts operation in the period T2 and the signal GS1_i+1 goes into an H level. The signal GS1_i+1 is input to the flip-flop 200_i as a reset signal. Accordingly, since the flip-flop 200_i starts operation in the period T3, the signal GS1_i goes into an L level. After that, until the signal GS1_i−1 goes into an H level again, the flip-flop 200_i repeats the operation in the period T4 and the operation in the period T5 every time the signal GS2 and the signal GS3 are inverted.

Note that, instead of an output signal from a flip-flop of the previous stage, the signal GS4 is input from an external circuit to the flip-flop 200_1 through the wiring 205. Therefore, when the signal GS4 goes into an H level, the flip-flop 200_1 starts operation in the period T1.

Note that, instead of an output signal from a flip-flop of the next stage, the signal GS5 is input from an external circuit to the flip-flop 200_N through the wiring 206. Therefore, when the signal GS5 goes into an H level, the flip-flop 200_N starts operation in the period T3.

By using the semiconductor device described in Embodiment 1 and Embodiment 2 as the shift register in this embodiment, a similar advantage as the semiconductor device described in Embodiment 1 and Embodiment 2 can be obtained.

Note that the wiring 206 can be eliminated. In that case, for example, a structure in which the transistor 134 and the transistor 135 which are shown in FIG. 10C are eliminated can be employed for the flip-flop 200_N.

Note that in the case where a signal is used instead of the voltage V1 in the flip-flops 200_1 to 200_N, the wiring 204 can be eliminated.

Note that the signal GS4 can be input to the wiring 206 as in the case of the wiring 205. In that case, by connecting the wiring 206 to the wiring 205, the wiring 205 and the wiring 206 can be shared. Alternatively, the signal GS2 can be input to the wiring 206 as in the case of the wiring 202. In that case, by connecting the wiring 206 to the wiring 202, the wiring 206 and the wiring 202 can be shared. Further alternatively, the signal GS3 can be input to the wiring 206 as in the wiring 203. In that case, by connecting the wiring 206 to the wiring 203, the wiring 206 and the wiring 203 can be shared. Alternatively, the voltage V1 can be input to the wiring 206 as in the case of the wiring 204. In that case, by connecting the wiring 206 to the wiring 204, the wiring 206 and the wiring 204 can be shared.

Figure 16:
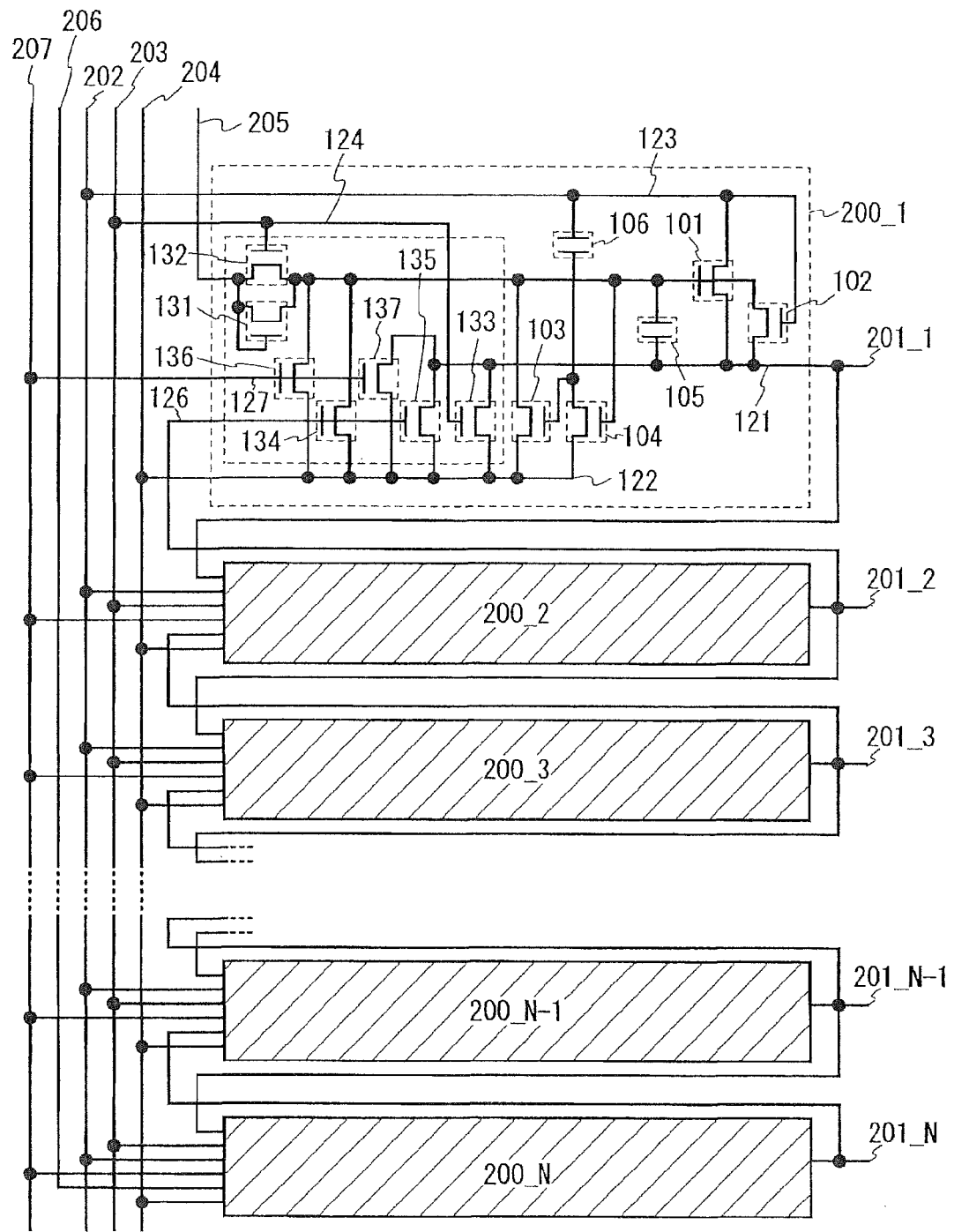
FIG. 16 is a circuit diagram of a shift register.

Note that in the case where a structure which requires the signal GS6 like that in FIG. 13B is used for the flip-flops 200_1 to 200_N, a wiring 207 can be added as shown in FIG. 16. The signal GS6 is input to the wiring 207. The signal GS6 corresponds to the signal S6 described in Embodiment 2 and can function as a reset signal in all stages. In addition, the wiring 207 corresponds to the wiring 128 in FIG. 13B and can function as a signal line.

However, this embodiment is not limited to this. By making the wiring 207 and a different wiring shared, the number of wirings or the number of signals or power supply voltages can be reduced. For example, the signal GS4 can be input to the wiring 207 as in the case of the wiring 205. Accordingly, by connecting the wiring 207 to the wiring 205, the wiring 207 and the wiring 205 can be shared. Alternatively, the signal GS5 can be input to the wiring 207 as in the case of the wiring 206. Accordingly, by connecting the wiring 207 to the wiring 206, the wiring 207 and the wiring 206 can be shared. Alternatively, a signal S1_N, which is an output signal from the flip-flop 200_N, can be input to the wiring 207. Accordingly, by connecting the wiring 207 to the wiring 201_N, the wiring 207 and the wiring 201_N can be shared.

Note that in the case where a structure which requires the voltage V2 like that in FIG. 9C is used for the flip-flops 200_1 to 200_N, a wiring can be additionally provided. The voltage V2 is supplied to the wiring that is additionally provided. In addition, the wiring corresponds to the wiring 127 in FIG. 9C and can function as a power supply line.

Note that as described in Embodiment 1 and Embodiment 2, in the case where a signal whose potential in an L level is lower than V1, a signal whose potential in an H level is lower than V2, or a signal whose amplitude voltage is lower than (V2−V1), or the like is input to the flip-flop in order to suppress deterioration of characteristics of the transistor, a wiring can be additionally provided. A signal is input to the wiring. The wiring can function as a signal line.

Figure 17A:
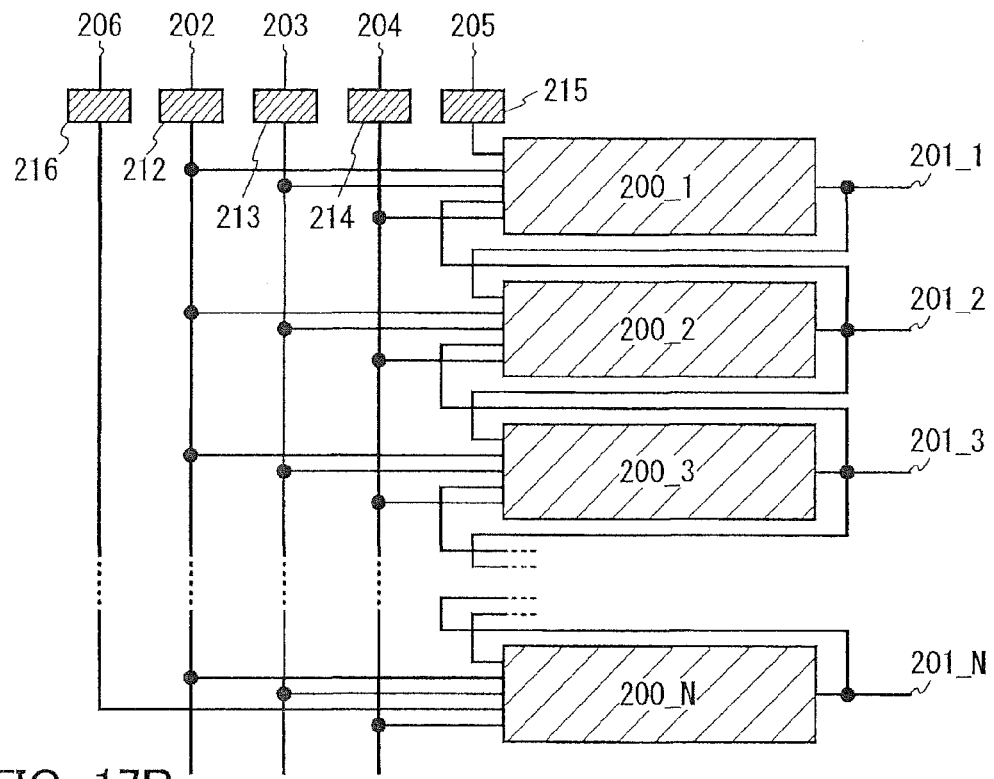
FIGS. 17A and 17B are circuit diagrams of a shift register.

Note that as shown in FIG. 17A, the shift register can include a circuit 212, a circuit 213, a circuit 214, a circuit 215, and/or a circuit 216. The circuits 212 to 216 each have a function of increasing (or decreasing) the amplitude voltage or input voltage of an input signal and outputting the input signal and can function as a level shifter circuit. Alternatively, the circuits 212 to 216 have a function of inverting an input signal and outputting the inverted input signal and can function as an inverter circuit or a buffer circuit. The wiring 202 is connected to the flip-flops through the circuit 212. The wiring 203 is connected to the flip-flops through the circuit 213. The wiring 204 is connected to the flip-flops through the circuit 214. The wiring 205 is connected to the flip-flops through the circuit 215. The wiring 206 is connected to the flip-flops through the circuit 216. In this manner, since a signal with low amplitude can be input to the shift register, the driving voltage of an external circuit can be reduced. Therefore, reduction in cost, power consumption, or the like of the external circuit can be achieved.

Note that as shown in FIG. 17A, the shift register can include any one, two, or more of the circuits 212 to 216.

Figure 17B:
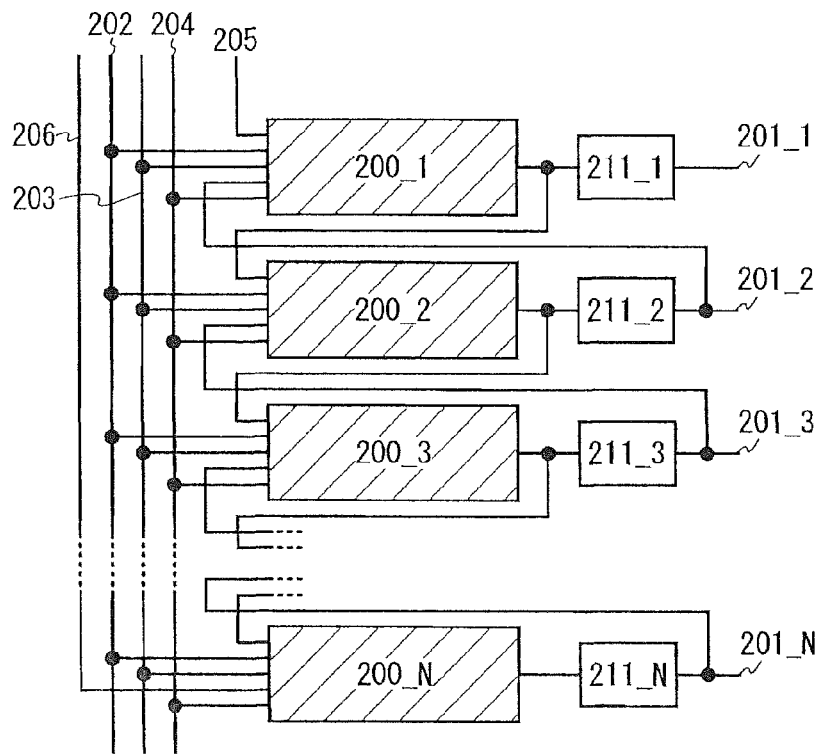

Note that as shown in FIG. 17B, the shift register can include circuits 211_1 to 211_N. The circuits 211_1 to 211_N each have a function of increasing the current capability of an input signal, increasing the amplitude voltage of the input signal, or inverting the input signal, and can function as a buffer circuit, a level shifter circuit, or an inverter circuit. The circuits 211_1 to 211_N are connected between the respective flip-flops 200_1 to 200_N and the respective wirings 201_1 to 201_N. For example, the circuit 211_i is connected between the flip-flop 200_i and the wiring 201_i. Then, the signal GS1_i which is an output signal from the flip-flop 200_i is output from the wiring 201_i through the circuit 211_i. In this manner, since the driving voltage of each flip-flop can be made low, reduction in power consumption, suppression of deterioration in characteristics of a transistor, or the like can be achieved. Alternatively, since the channel width of a transistor (in specific, the transistor 101) included in each flip-flop can be made small, reduction in a layout area can be achieved.

Note that in an example shown in FIG. 17B, the signal GS1_i is input as a reset signal to the flip-flop 200_i−1 through the circuit 211_i. Therefore, in the flip-flop 200_i−1, since a period of time when the transistor 101 is on is long during the period T3, falling time of the signal GS_i−1 which is an output signal from the flip-flop 200_i−1 can be shortened. On the other hand, the signal GS1_i is input as a start signal to the 200_i+1 without passing through the circuit 211_i. Therefore, in the flip-flop 200_i+1, since the potential of the node A can be quickly raised during the period T1, increase in driving frequency can be achieved. However, this embodiment is not limited to this. The signal GS1_i can be input as a reset signal to the flip-flop 200_i−1 without passing through the circuit 211_i. Alternatively, the signal GS1_i can be input as a start signal to the flip-flop 200_i+1 through the circuit 211_i.

Figure 14A:
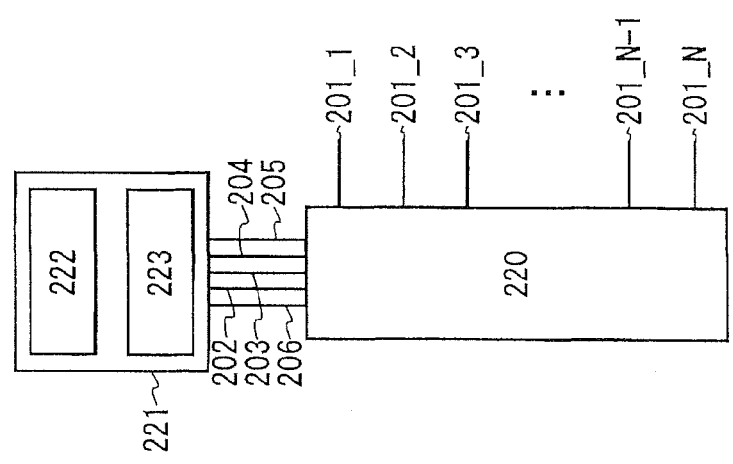

Note that in the shift register shown in FIG. 14A, the cycles of signals GS1_1 to GS1_N are different from each other by half a cycle of the signal S2 or by half a cycle of the signal S3. However, this embodiment is not limited to this. The cycles of the signals GS1_1 to GS1_N can be different from each other by ½×M (M is a natural number) of a cycle of the signal S2 or by ½×M of a cycle of the signal S3. That is, a period in which a signal among the signals GS1_1 to GS1_N in one row goes into an H level and a period in which a signal among the signals GS1_1 to GS1_N in a different row goes into an H level can overlap with each other. In order to realize this, a clock signal with a phase of 2×M can be input to the shift register.

Figure 24:
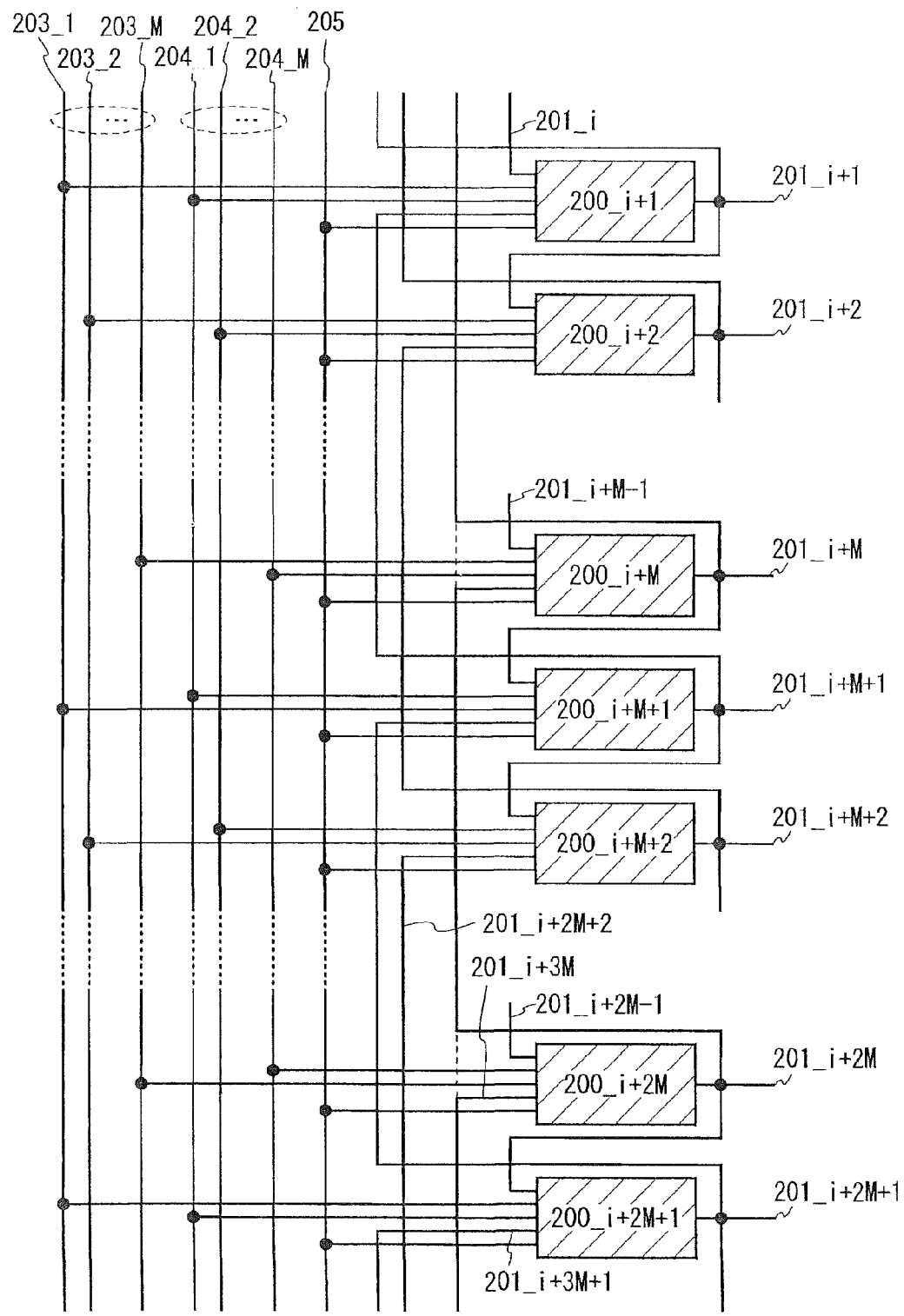
FIG. 24 is a circuit diagram of a shift register.
Figure 25A:
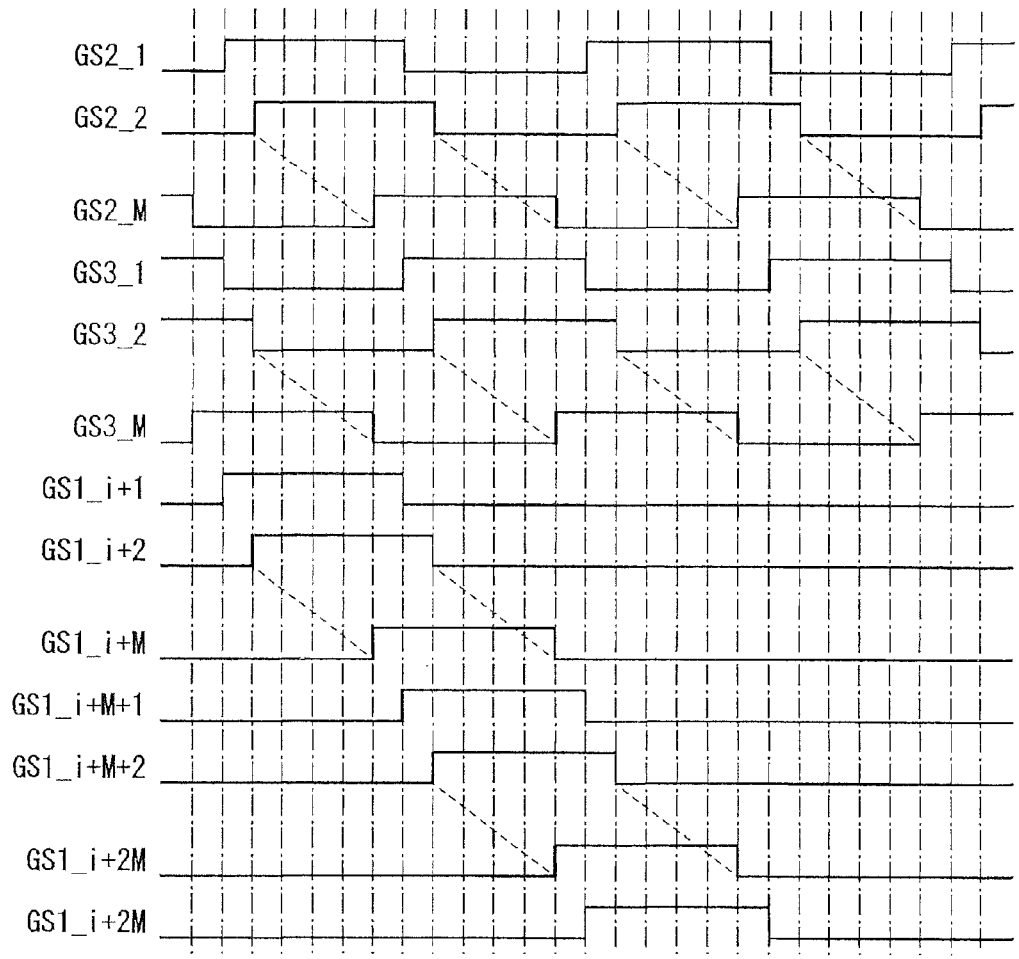
FIGS. 25A and 25B are timing charts each illustrating a driving method of a shift register.

A specific example is described with reference to a shift register in FIG. 24. FIG. 24 shows only the flip-flops 200_i+1 to 200_i+2M+1. The wirings 123 of the flip-flops 200_i+1 to 200_i+M are connected to wirings 203_1 to 203_M, respectively. The wirings 124 of the flip-flops 200_i+1 to 200_i+M are connected to wirings 204_1 to 204_M, respectively. The wirings 123 of the flip-flops 200_i+M+1 to 200_i+2M are connected to the wirings 204_1 to 204_M, respectively. The wirings 124 of the flip-flops 200_i+M+1 to 200_i+2M are connected to the wirings 203_1 to 203_M, respectively. In addition, the wiring 125 of the flip-flop 200_i+1 is connected to the wiring 121 of the flip-flop 200_i. The wiring 126 of the flip-flop 200_i+1 is connected to the wiring 121 of the flip-flop 200_i+M+1. Note that the wirings 203_1 to 203_M correspond to the wiring 203. The wirings 204_1 to 204_M correspond to the wiring 204. As shown in FIG. 25A, signals GS2_1 to GS2_M are input to the wirings 203_1 to 203_M, respectively. Signals GS3_1 to GS3_M are input to the wirings 204_1 to 204_M, respectively. The signals GS2_1 to GS2_M are M clock signals whose phases are different from each other by ½M of a cycle and correspond to the signal GS2. The signals GS3_1 to GS3_M are inverted signals of the signals GS2_1 to GS2_M and correspond to the signal GS3. In this manner, the cycles of the signals S1_1 to S1_N can be different from that of the signal S2 by ½×M (M is a natural number) of a cycle or different from that of the signal S3 by ½×M of a cycle.

Note that in FIG. 24, the wiring 125 of the flip-flop 200_i+1 can be connected the wiring 121 of any one of the flip flops 200_i−M+1 to 200_i−1. In this manner, since a timing when the transistor 131 in the flip-flop 200_i+1 is turned on can come up earlier, a timing when the potential of the node A is raised can come up earlier. Therefore, driving frequency can be increased. Alternatively, since the channel width of the transistor 131 or the transistor 132 can be reduced, reduction in a layout area can be achieved.

Note that in FIG. 24, the wiring 126 of the flip-flop 200_i+1 can be connected to the wiring 121 of any one of the flip-flops 200_i+M+2 to 200_i+2M. In this manner, a timing when the transistor 101 in the flip-flop 200_i+1 is turned off can come up later, falling time of the signal S1_i+1 can be shortened.

Note that in FIG. 24, the wiring 126 of the flip-flop 200_i+1 can be connected to the wiring 121 of any one of the flip-flops 200_i+2 to 200_i+M. In this manner, the pulse width of the signals S1_1 to S1_N can be made smaller than that of half a cycle of the clock signal. Therefore, driving frequency can be increased while reduction in power consumption is achieved.

Figure 25B:
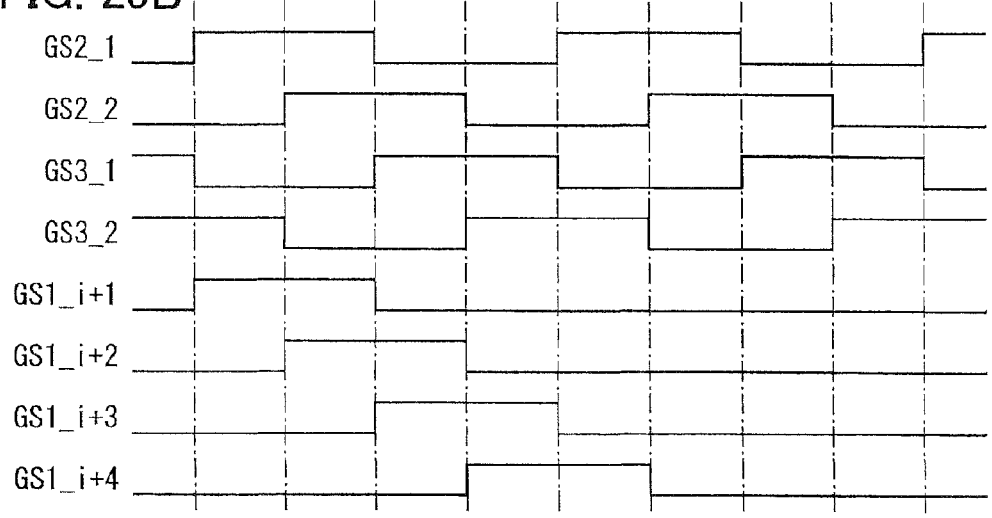

Note that in FIG. 24, it is preferable that M≤4. It is more preferable that M≤2. This is because, in the case where a shift register in FIGS. 23A to 23E is used for a scan line driver circuit of a display device, plural kinds of video signals are written to a pixel if M is too large a number. Therefore, a period in which an irregular video signal is input to the pixel gets long and display quality is impaired in some cases. FIG. 25B shows an example of a timing chart in the case where M=2.

[Embodiment 4]

In this embodiment, an example of a semiconductor device and a shift register including the semiconductor device will be described. Note that the content described in Embodiments 1 to 3 can be applied to that of the semiconductor device and the shift register in this embodiment.

First, the semiconductor device of this embodiment will be described with reference to FIG. 19A. Note that portions common to those of FIG. 1A are denoted by common reference numerals, and thus description thereof is omitted.

Figure 19A:
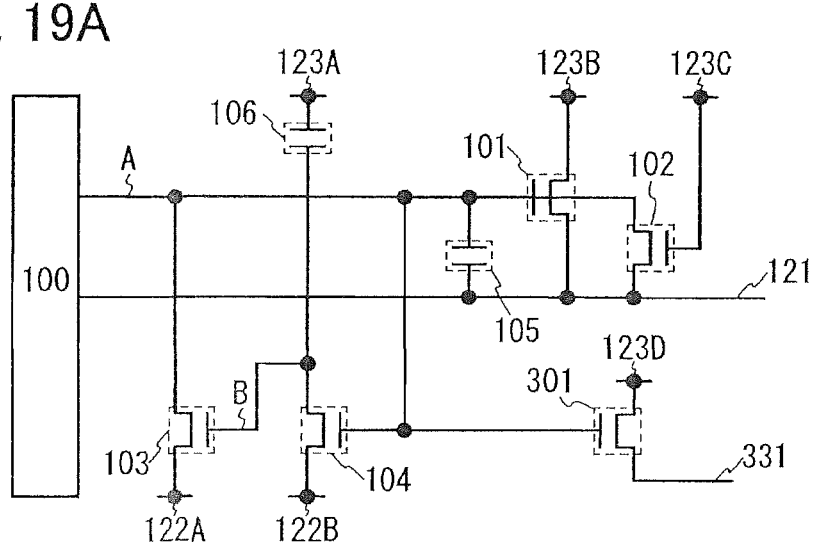
FIG. 19A is a circuit diagram of a semiconductor device and FIG. 19B is a timing chart illustrating a driving method of the semiconductor device.

The semiconductor device in FIG. 19A includes the circuit 100, the transistor 101, the transistor 102, the transistor 103, the transistor 104, the capacitor 105, the capacitor 106, and a transistor 301. The transistor 301 corresponds to the transistor 101 and has a similar function to the transistor 101. In addition, the transistor 301 is an n-channel transistor. Note that the transistor 301 can be a p-channel transistor.

A first terminal of the transistor 301 is connected to a wiring 123D. A second terminal of the transistor 301 is connected to a wiring 311. A gate of the transistor 301 is connected to the node A.

The wiring 123D corresponds to the wirings 123A to 123C. The signal S2 is input to the wiring 123D. Accordingly, as in FIG. 3D, the wiring 123D and the wirings 123A to 123C can be shared. In that case, the first terminal of the transistor 301 is connected to the wiring 123. A signal S7 is output from the wiring 311. The signal S7 corresponds to the signal S1.

Figure 19B:
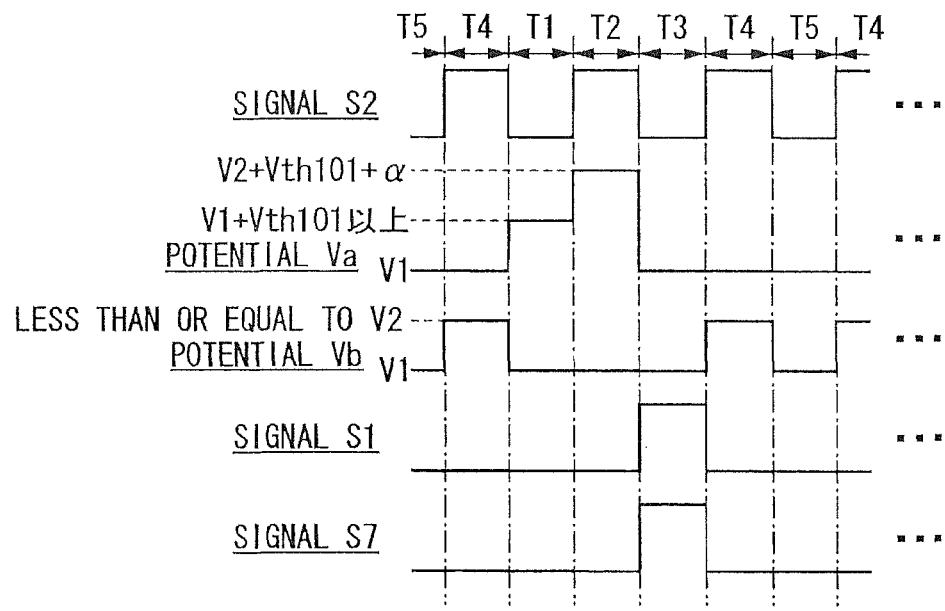

Next, operation of the semiconductor device in FIG. 19A is described with reference to a timing chart in FIG. 19B. Note that description of operation in common with the semiconductor device in FIG. 1A is omitted.

First, the potential of the node A starts to be raised in the period T1. Then, like the transistor 101, the transistor 301 is turned on when the potential of the node A becomes equal to the sum of the potential (V1) of the wiring 123D and the threshold voltage (Vth301) of the transistor 301, (V1+Vth301). Then, the wiring 123D and the wiring 311 are brought into electrical conduction. Therefore, since the signal S2 in an L level is supplied from the wiring 123D to the wiring 311, the potential of the wiring 311 is decreased to V1.

Next, since the potential of the node A gets (V1+Vth101+α) in the period T2, the transistor 301 is kept on. Accordingly, the wiring 123D and the wiring 311 are kept in electrical conduction. Therefore, since the signal S2 in an H level is supplied from the wiring 123D to the wiring 311, the potential of the wiring 311 is raised to V2.

Next, the potential of the node A starts to decrease to V1 in the period T3. Like the transistor 101, the transistor 301 is on until the potential of the node A becomes equal to the sum of the potential (V1) of the wiring 123D and the threshold voltage (Vth301) of the transistor 301, (V1+Vth301). Therefore, since the signal S1 in an L level is supplied from the wiring 123D to the wiring 311, the potential of the wiring 311 is decreased to V1. After that, when the potential of the node A is decreased to (V1+Vth301), the transistor 301 is turned off.

During the period T4 and the period T5, since the potential of the node A is maintained as V1, the transistor 301 is kept off. Therefore, the wiring 123D and the wiring 311 are kept out of electrical conduction.

In the semiconductor device in FIG. 19A, the wiring 121 and the wiring 311 can output signals with the same timings. Therefore, one of the signal S1 output from the wiring 121 and the signal S7 output from the wiring 311 can be used for driving a load such as a gate line or a pixel and the other thereof can be used as a signal for driving a different circuit, such as a signal for transferring. In this manner, the different circuit can be driven without being adversely influenced by distortion, delay, or the like of a signal caused by driving the load or the like.

Note that a capacitor can be connected between the gate and the second terminal of the transistor 301. The capacitor corresponds to the capacitor 105.

Figure 20A:
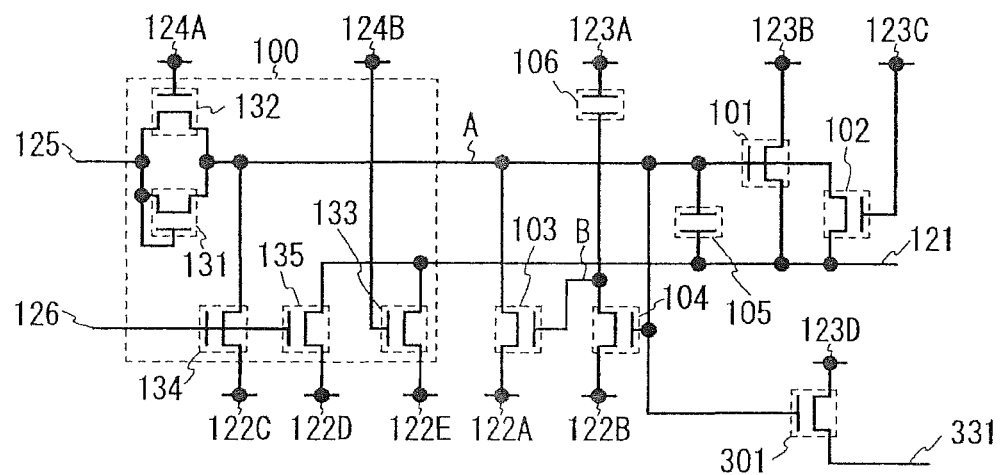
FIGS. 20A and 20B are circuit diagrams of a semiconductor device.

Note that as shown in FIG. 20A, the transistor 301 can be added to the semiconductor device in FIG. 6A.

Figure 20B:
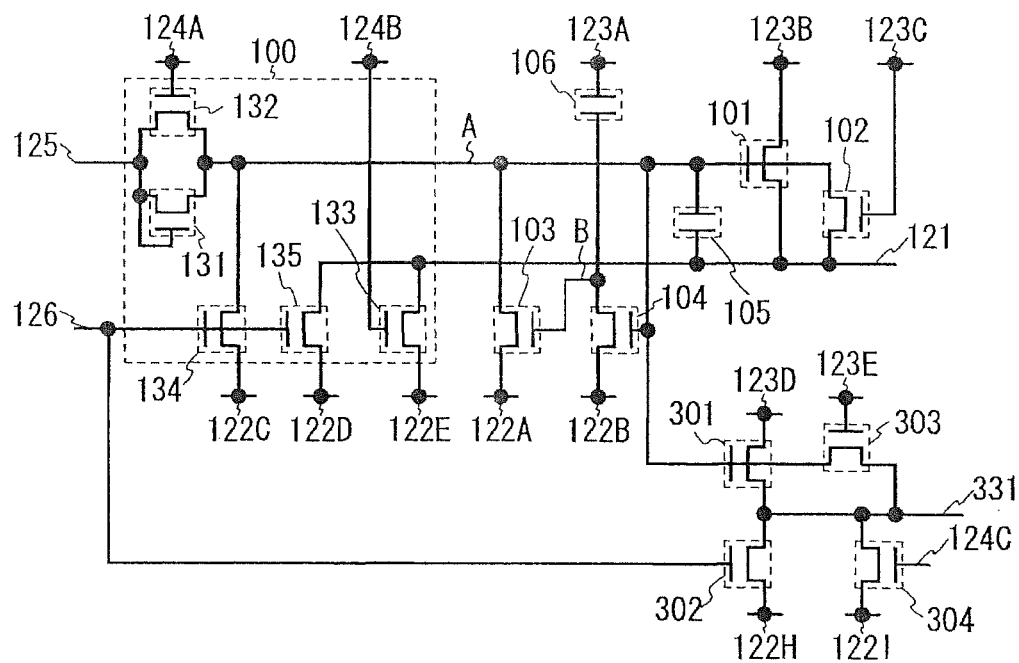

Note that as shown in FIG. 20B, a transistor 302, a transistor 303, and/or a transistor 304 can be added. The transistor 302, the transistor 303, and the transistor 304 correspond and have similar functions to the transistor 134, the transistor 102, and the transistor 133, respectively. A first terminal of the transistor 302 is connected to a wiring 122H. A second terminal of the transistor 302 is connected to a wiring 331. A gate of the transistor 302 is connected to the wiring 126. A first terminal of the transistor 303 is connected to the wiring 331. A second terminal of the transistor 303 is connected to the node A. A gate of the transistor 303 is connected to a wiring 123E. A first terminal of the transistor 304 is connected to a wiring 122I. A second terminal of the transistor 304 is connected to the wiring 331. A gate of the transistor 304 is connected to a wiring 124C. However, this embodiment is not limited to this. Only one or two of the transistor 302, the transistor 303, and the transistor 304 can be added.

Note that in FIG. 20B, since the same signal (e.g., the signal S2) as the wirings 123A to 123C is input to the wiring 123D and the wiring 123E, the wiring 123D, the wiring 123E, and the wirings 123A to 123C can be shared. In that case, the first terminal of the transistor 301 and the gate of the transistor 303 are connected to the wiring 123.

Note that in FIG. 20B, since the same voltage (e.g., the voltage V1) as the wirings 122A to 122E is input to the wiring 122H and the wiring 122I, the wiring 122H, the wiring 122I, and the wirings 122A to 122E can be shared. In that case, the first terminal of the transistor 302 and the gate of the transistor 304 are connected to the wiring 122.

Note that in FIG. 20B, like the transistor 135, the transistor 302 can be replaced with a diode or a diode-connected transistor. Alternatively, like the transistor 133, the transistor 304 can be replaced with a diode or a diode-connected transistor.

Next, one example of a shift register including the above-described semiconductor device is described with reference to FIG. 21. Note that description of the content described in Embodiment 3 is omitted. Alternatively, the same portions as those in FIG. 14 are denoted by the same reference numerals and description thereof is omitted.

The shift register includes a plurality of flip-flops of flip-flops 320_1 to 320_N. The flip-flops 320_1 to 320_N correspond to the flip-flops 200_1 to 200_N in FIG. 14. Alternatively, the flip-flops 320_1 to 320_N correspond to the semiconductor device in FIG. 19A, FIG. 20A, or FIG. 20B. FIG. 21 shows one example of the case where the semiconductor device in FIG. 20A is used.

In the flip-flop 320_i, the wiring 311 is connected to the wiring 321_i. Then, the wiring 126 is connected to the wiring 321_i−1.

Signals GS7_1 to GS7_N are output from the wirings 321_1 to 321_N, respectively. The signals GS7_1 to GS7_N correspond to the signal S7 and each can function as a transfer signal, an output signal, a selection signal, a scan signal, or a gate signal.

Figure 21:
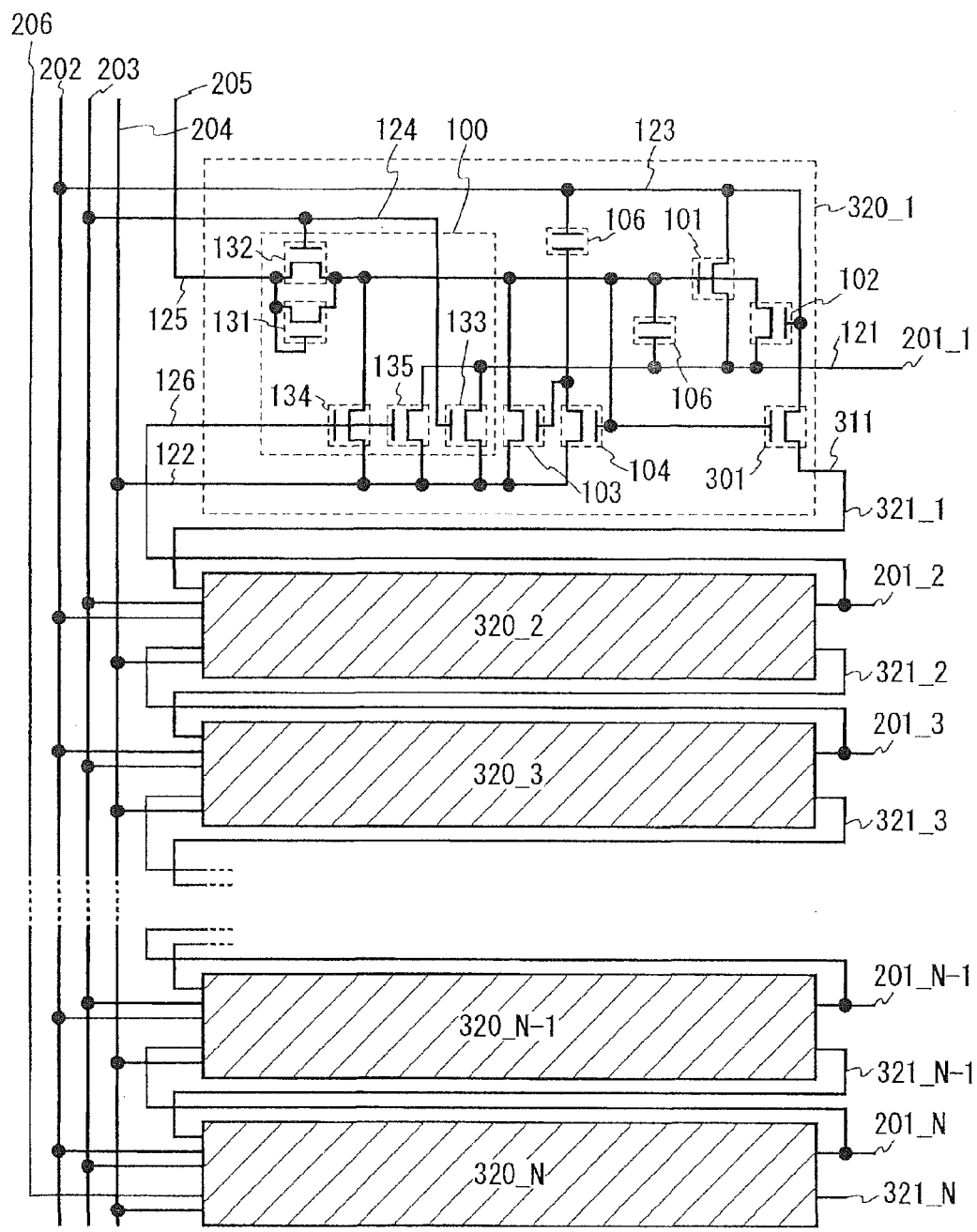
FIG. 21 is a circuit diagram of a shift register.

Next, operation of the shift register shown in FIG. 21 is described with reference to the timing chart in FIG. 14B.

Operation of the flip-flop 320_i is described. First, the signal GS7_i−1 goes into an H level. Then, the flip-flop 320_i starts operation in the period T2 and the signal GS1_i and the signal GS7_i go into an L level. After that, the signal GS2 and the signal GS3 are inverted. Then, the flip-flop 320_i starts operation in the period T2 and the signal GS1_i and the signal GS7_i go into an H level. The signal GS1_i is input to the flip-flop 320_i−1 as a reset signal and the signal GS7_i is input to the flip-flop 320_i+1 as a start signal. Accordingly, the flip-flop 320_i−1 starts operation in the period T3 and the flip-flop 320_i+1 starts operation in the period T1. After that, the signal GS2 and the signal GS3 are inverted again. Then, the flip-flop 320_i+1 starts operation in the period T2 and the signal GS1_i+1 goes into an H level. The signal GS1_i+1 is input to the flip-flop 320_i as a reset signal. Accordingly, since the flip-flop 320_i starts operation in the period T3, the signal GS1_i and the signal GS7_i go into an L level. After that, until the signal GS7_i−1 goes into the H level again, the flip-flop 320_i repeats the operation in the period T4 and the operation in the period T5 every time the signal GS2 and the signal GS3 are inverted.

In the shift register in this embodiment, since the signals GS7_1 to GS7_N are used as start signals, delay time of the signals S1_1 to S1_N can be shortened. This is because, since the signals GS7_1 to GS7_N are not input to the gate line, the pixel, or the like, delay or distortion of the signals GS7_1 to GS7_N is slight as compared to the signals S1_1 to S1_N.

Alternatively, in the shift register of this embodiment, since the signals GS1_1 to GS1_N are used as reset signals, a period of time when the transistor 101 is on in operation of each flip-flop during the period T3 can be made longer. Therefore, falling time of the signals S1_1 to S1_N and falling time of the signals GS7_1 to GS7_N can be shortened.

Note that the signals GS1_1 to GS1_N can be input to the flip-flop in the next stage as start signals. For example, the signal GS1_i can be input to the flip-flop 320_i+1 as a start signal.

Note that the signals GS7_1 to GS7_N can be input to the flip-flop in the previous stage as reset signals. For example, the signal GS7_i can be input to the flip-flop 320_i−1 as a reset signal.

[Embodiment 5]

In this embodiment, an example of a display device is described.

First, an example of a system block of a liquid crystal display device is described with reference to FIG. 22A. The liquid crystal display device includes a circuit 5361, a circuit 5362, a circuit 5363_1, a circuit 5363_2, a pixel portion 5364, a circuit 5365, and a lighting device 5366. A plurality of wirings 5371 which is extended from the circuit 5362 and a plurality of wirings 5372 which is extended from the circuit 5363_1 and the circuit 5363_2 are provided in the pixel portion 5364. In addition, pixels 5367 which include display elements such as liquid crystal elements are provided in matrix in respective regions where the plurality of wirings 5371 and the plurality of wirings 5372 intersect with each other.

The circuit 5361 has a function of outputting a signal, voltage, or the like to the circuit 5362, the circuit 5363_1, the circuit 5363_2, and the circuit 5365 in response to a video signal 5360 and can function as a controller, a control circuit, a timing generator, a regulator, or the like.

For example, the circuit 5361 outputs a signal such as a signal line driver circuit start signal (SSP), a signal line driver circuit clock signal (SCK), a signal line driver circuit inverted clock signal (SCKB), a video signal data (DATA), or a latch signal (LAT) to the circuit 5362. The circuit 5362 has a function of outputting video signals to the plurality of wirings 5371 in response to such a signal and functions as a signal line driver circuit.

Note that in the case where the video signals are input to the plurality of wirings 5371, the plurality of wirings 5371 can function as signal lines, video signal lines, source lines, or the like.

For example, the circuit 5361 outputs a signal such as a scan line driver circuit start signal (GSP), a scan line driver circuit clock signal (GCK), or a scan line driver circuit inverted clock signal (GCKB) to the circuit 5363_1 and the circuit 5363_2. The circuit 5363_1 and the circuit 5363_2 each have a function of outputting scan signals to the plurality of wirings 5372 in response to such a signal and function as a scan line driver circuit.

Note that in the case where scan signals are input to the plurality of wirings 5372, the plurality of wirings 5372 can function as signal lines, scan lines, gate lines, or the like.

Note that since the same signal is input to the circuit 5363_1 and the circuit 5363_2 from the circuit 5361, scan signals output from the circuit 5363_1 to the plurality of wirings 5367 and scan signals output from the circuit 5363_2 to the plurality of wirings 5367 have approximately the same timings in many cases. Therefore, load caused by driving of the circuit 5363_1 and the circuit 5363_2 can be reduced.

Accordingly, the display device can be made larger. Alternatively, the display device can have higher definition. Alternatively, since the channel width of transistors included in the circuit 5363_1 and the circuit 5363_2 can be reduced, a display device with a narrower frame can be obtained.

For example, the circuit 5361 outputs a backlight control signal (BLC) to the circuit 5365. The circuit 5365 has a function of controlling the luminance (or the average luminance) of the lighting device 5366 by controlling the amount of electric power supplied to the lighting device 5366, time to supply the electric power to the lighting device 5366, or the like in accordance with the backlight control signal (BLC) and functions as a power supply circuit.

Note that one of the circuit 5363_1 and the circuit 5363_2 can be eliminated.

Note that a wiring such as a capacitor line, a power supply line, or a scan line can be newly provided in the pixel portion 5364. Then, the circuit 5361 can output a signal, voltage, or the like to such a wiring. In addition, a circuit similar to the circuit 5363_1 or the circuit 5363_2 can be additionally provided. The additionally provided circuit can output a signal such as a scan signal to the additionally provided wiring.

Note that the pixel 5367 can include a light-emitting element such as an EL element as a display element. In that case, as shown in FIG. 22B, since the display element emits light, the circuit 5365 and the lighting device 5366 can be eliminated. In addition, in order to supply electric power to the display element, a plurality of wirings 5373 which can function as power supply lines can be provided in the pixel portion 5364. The circuit 5361 can supply power supply voltage called voltage (ANO) to the wirings 5373. The wirings 5373 can be separately connected the pixels in accordance with color elements or connected to all the pixels.

Note that FIG. 22B shows an example in which the circuit 5361 supplies different signals to the circuit 5363_1 and the circuit 5363_2. The circuit 5361 outputs a signal such as a scan line driver circuit start signal (GSP1), a scan line driver circuit clock signal (GCK1), and a scan line driver circuit inverted clock signal (GCKB1) to the circuit 5363_1. In addition, the circuit 5361 outputs a signal such as a scan line driver circuit start signal (GSP2), a scan line driver circuit clock signal (GCK2), and a scan line driver circuit inverted clock signal (GCKB2) to the circuit 5363_2. In that case, the circuit 5363_1 can scan only wirings in odd-numbered rows of the plurality of wirings 5372 and the circuit 5363_2 can scan only wirings in even-numbered rows of the plurality of wirings 5372. Accordingly, the driving frequency of the circuit 5363_1 and the circuit 5363_2 can be lowered, whereby reduction in power consumption can be achieved. Alternatively, an area in which a flip-flop of one stage can be laid out can be made larger. Therefore, a display device can have higher definition. Alternatively, a display device can be made larger.

Figure 22A:
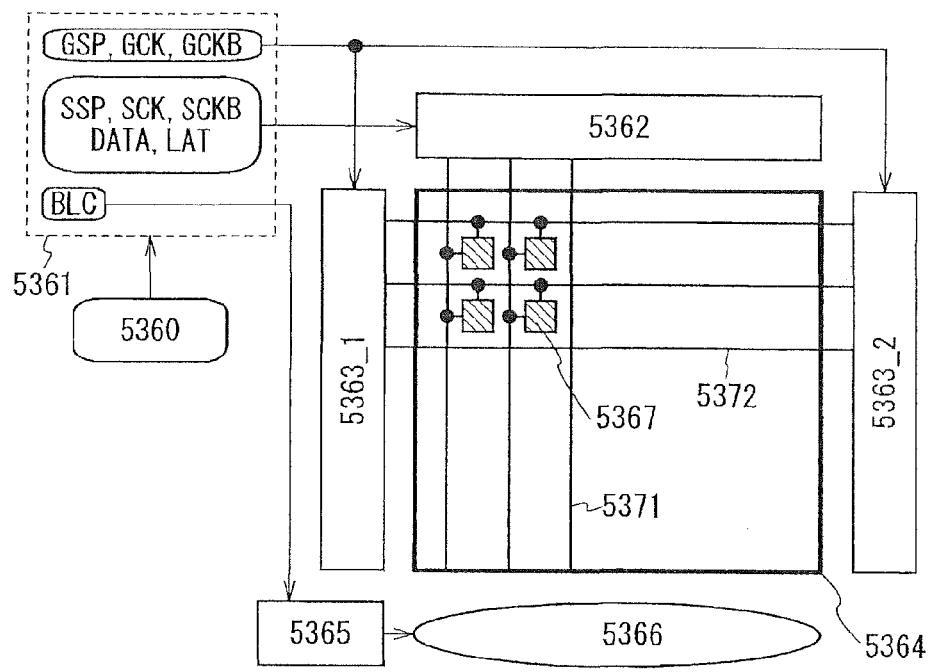
FIGS. 22A and 22B are system block diagrams of a display device.
Figure 22B:
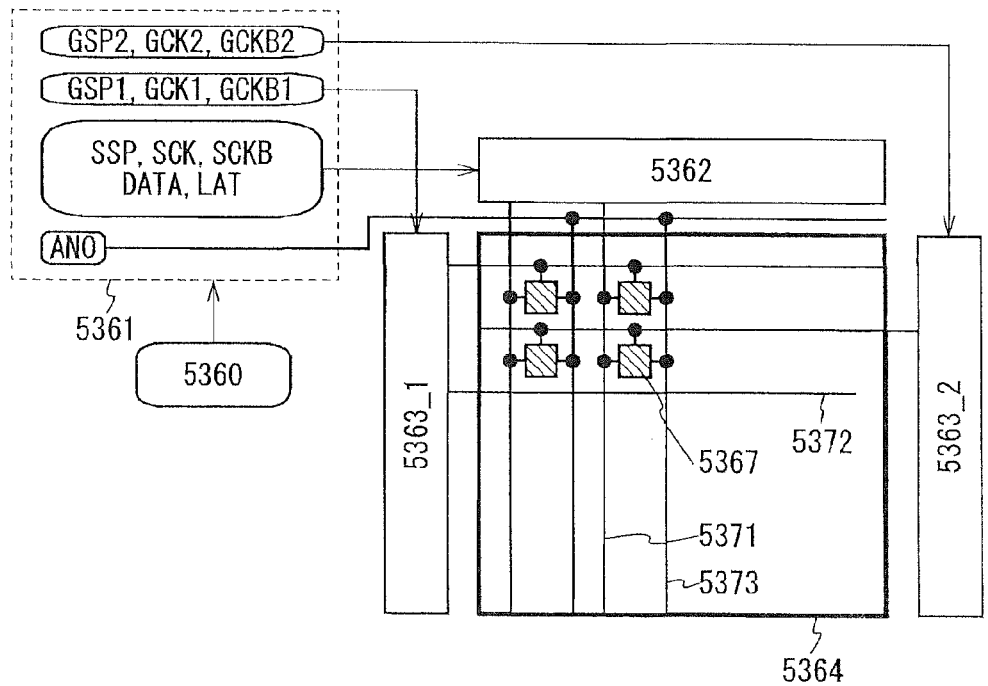

Note that as in FIG. 22B, the circuit 5361 can supply different signals to the circuit 5363_1 and the circuit 5363_2 in FIG. 22A.

Next, one example of a structure of the display device are described with reference to FIGS. 23A to 23E.

Figure 23A:
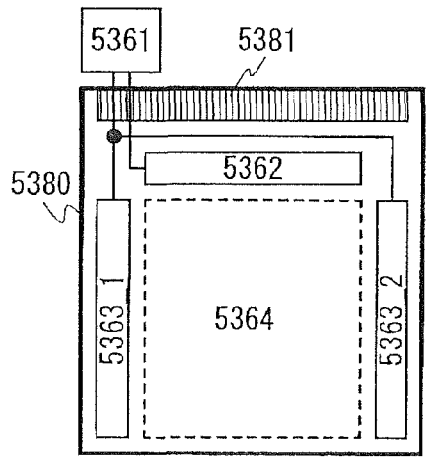
FIGS. 23A to 23E are diagrams each illustrating a structure of a display device.

In FIG. 23A, circuits which have a function of outputting signals to the pixel portion 5364 (e.g., the circuit 5362, the circuit 5363_1, and the circuit 5363_2) are formed over a substrate 5380 over which the pixel portion 5364 is also formed. In addition, the circuit 5361 is formed over a different substrate from the pixel portion 5364. In this manner, since the number of external components is reduced, reduction in cost can be achieved. Alternatively, since the number of signals or voltages input to the substrate 5380 is reduced, the number of connections between the substrate 5380 and the external component can be reduced. Therefore, improvement in reliability or increase in yield can be achieved.

Note that in the case where the circuit is formed over a different substrate from the pixel portion 5364, the substrate can be mounted on an FPC (flexible printed circuit) by a TAB (tape automated bonding) method. Alternatively, the substrate can be mounted on the same substrate 5380 as the pixel portion 5364 by a COG (chip on glass) method.

Note that in the case where the circuit is formed over a different substrate from the pixel portion 5364, a transistor formed using a single crystal semiconductor can be formed on the substrate. Therefore, the circuit formed over the substrate can have advantages such as improvement in driving frequency, improvement in driving voltage, or suppression of variations in output signals.

Note that a signal, voltage, current, or the like is input from an external circuit through an input terminal 5381 in many cases.

Figure 23B:
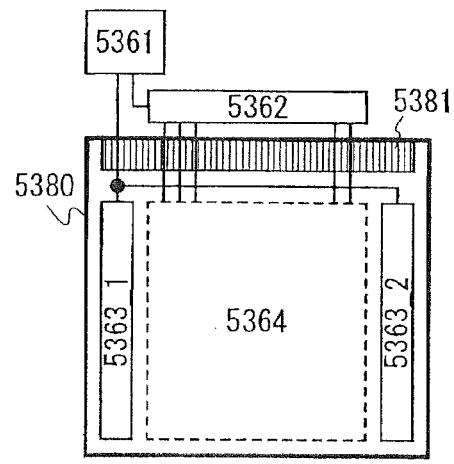

In FIG. 23B, circuits with low driving frequency (e.g., the circuit 5363_1 and the circuit 5363_2) are formed over the substrate 5380 as the pixel portion 5364. In addition, the circuit 5361 and the circuit 5362 are formed over a different substrate from the pixel portion 5364. In this manner, since the circuit formed over the substrate 5380 can be formed using a transistor with low mobility, a non-single-crystal semiconductor, a microcrystalline semiconductor, an organic semiconductor, an oxide semiconductor, or the like can be used for a semiconductor layer of the transistor. Accordingly, increase in the size of the display device, reduction in the number of steps, reduction in cost, improvement in yield, or the like can be achieved.

Figure 23C:
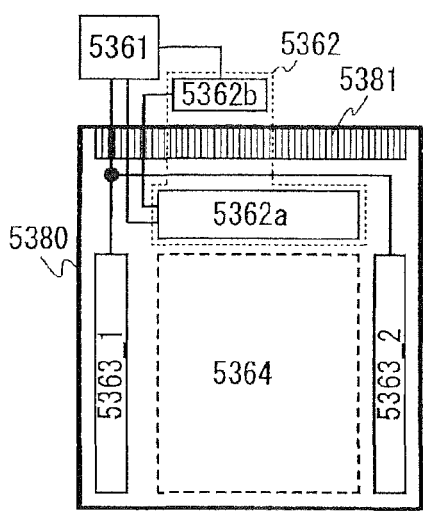

Note that as shown in FIG. 23C, part of the circuit 5362 (a circuit 5362*a*) can be formed over the substrate 5380 over which the pixel portion 5364 is formed and the other part of the circuit 5362 (a circuit 5362*b*) can be formed over a different substrate from the pixel portion 5364. The circuit 5362*a* includes a circuit which can be formed using a transistor with low mobility in many cases (e.g., a shift register, a selector, or a switch). In addition, the circuit 5362*b* includes a circuit which is preferably formed using a transistor with high mobility and few variations in characteristics in many cases (e.g., a shift register, a latch circuit, a buffer circuit, a DA converter circuit, or an AD converter circuit). In this manner, as in FIG. 23B, a non-single-crystal semiconductor, a microcrystalline semiconductor, an organic semiconductor, an oxide semiconductor, or the like can be used for a semiconductor layer of the transistor. Further, reduction in external components can be achieved.

Figure 23D:
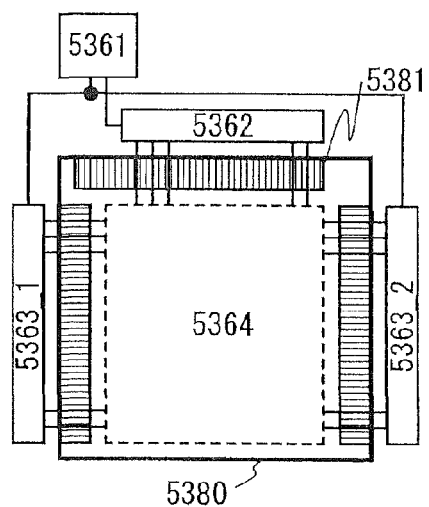

In FIG. 23D, circuits which have a function of outputting signals to the pixel portion 5364 (e.g., the circuit 5362, the circuit 5363_1, and the circuit 5363_2) and a circuit which has a function of controlling these circuits (e.g., the circuit 5361) are formed over a different substrate from the pixel portion 5364. In this manner, since the pixel portion and peripheral circuits thereof can be formed over different substrates, improvement in yield can be achieved.

Figure 23E:
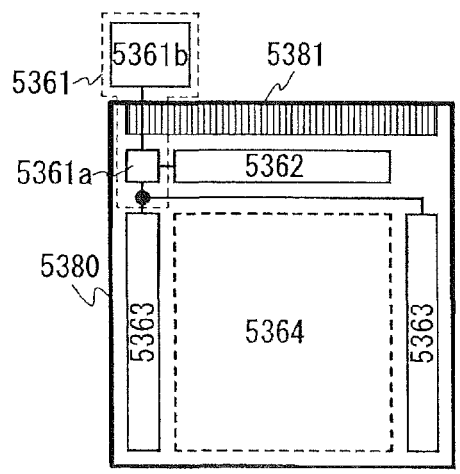

In FIG. 23E, part of the circuit 5361 (a circuit 5361*a*) is formed over the substrate 5380 over which the pixel portion 5364 and the other part of the circuit 5361 (a circuit 5361*b*) is formed over a different substrate from the pixel portion 5364. The circuit 5361*a* includes a circuit which can be formed using a transistor with low mobility in many cases (e.g., a switch, a selector, or a level shift circuit). In addition, the circuit 5361*b* includes a circuit which is preferably formed using a transistor with high mobility and few variations in many cases (e.g., a shift register, a timing generator, an oscillator, a regulator, or an analog buffer).

Note that as the circuit 5363_1 and the circuit 5363_2, the semiconductor device or shift register in Embodiments 1 to 4 can be used. In that case, if the circuit 5363_1 and the circuit 5363_2 are formed over the same substrate as the pixel portion, the polarity of all transistors formed over the substrate can be n-type or p-type. Accordingly, reduction in the number of steps, improvement in yield, or reduction in cost can be achieved. In specific, by setting the polarities of all the transistors n-type, a non-single-crystal semiconductor, a microcrystalline semiconductor, an organic semiconductor, an oxide semiconductor, or the like can be used for a semiconductor layer of the transistor. Therefore, increase in the size of the display device, reduction in cost, improvement in yield, or the like can be achieved.

Note that deterioration of characteristics, such as increase in threshold voltage or decrease in mobility, is caused in many cases in the transistor whose semiconductor layer is formed using a non-single-crystal semiconductor, a microcrystalline semiconductor, an organic semiconductor, an oxide semiconductor, or the like. However, since deterioration of the characteristics of the transistor can be suppressed in the semiconductor device or shift register in Embodiments 1 to 4, the life of the display device can be made longer.

Note that the semiconductor device or shift register in Embodiments 1 to 4 can be used as part of the circuit 5362. For example, the circuit 5362a shown in FIG. 23C can include the semiconductor device or shift register in Embodiments 1 to 4.

[Embodiment 6]

In this embodiment, a layout view (hereinafter also referred to as a top view) of a shift register will be described. In this embodiment, for example, a layout view of the shift register shown in FIG. 15 will be described. Note that a content described in this embodiment can be applied to the semiconductor device, the shift register, or the display device in Embodiments 1 to 5 in addition to the shift register in FIG. 15. Note that the layout view in this embodiment is one example and this embodiment is not limited to this.

Figure 30:
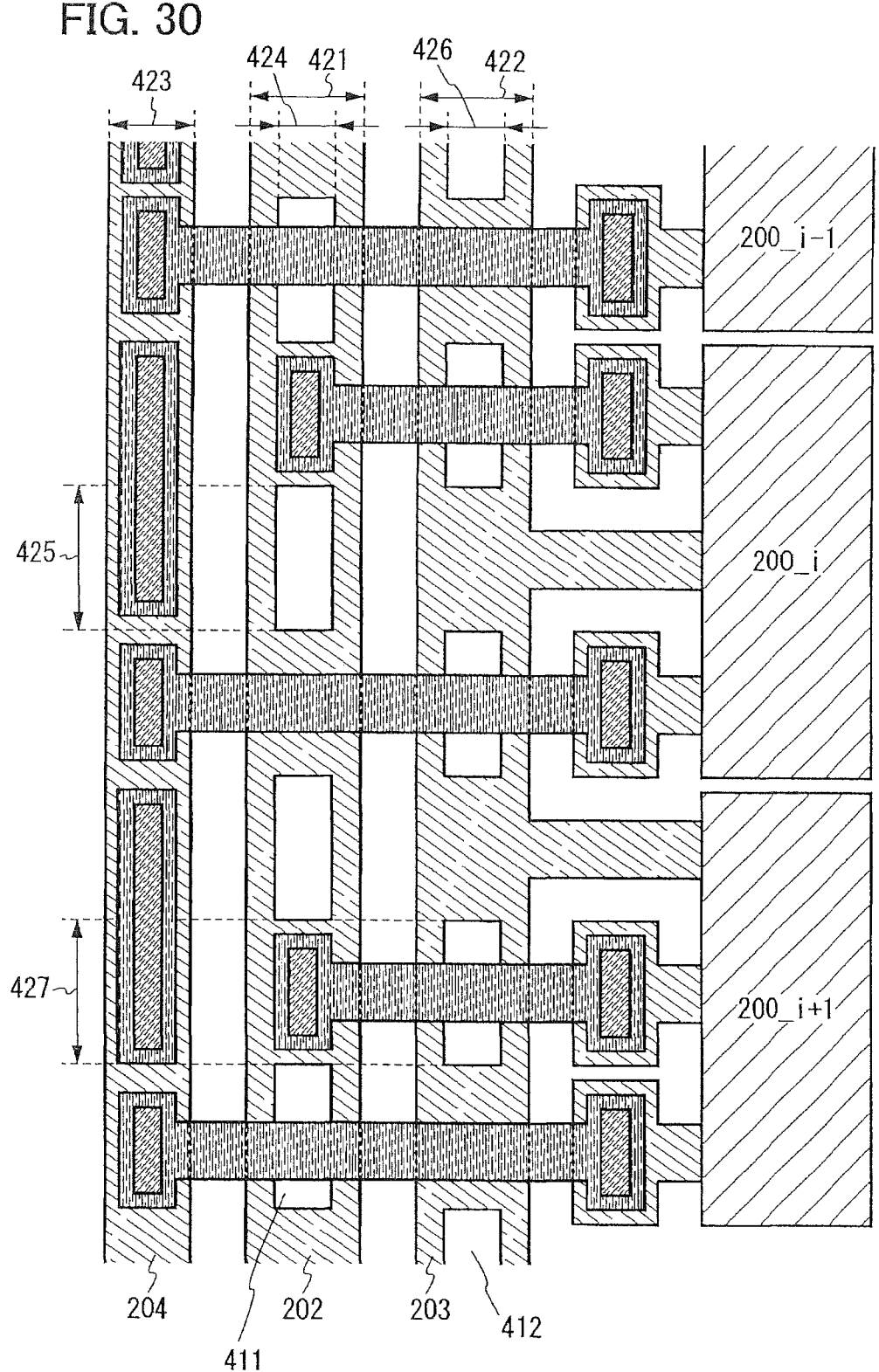
FIG. 30 is a layout view of a shift register.
Figure 31:
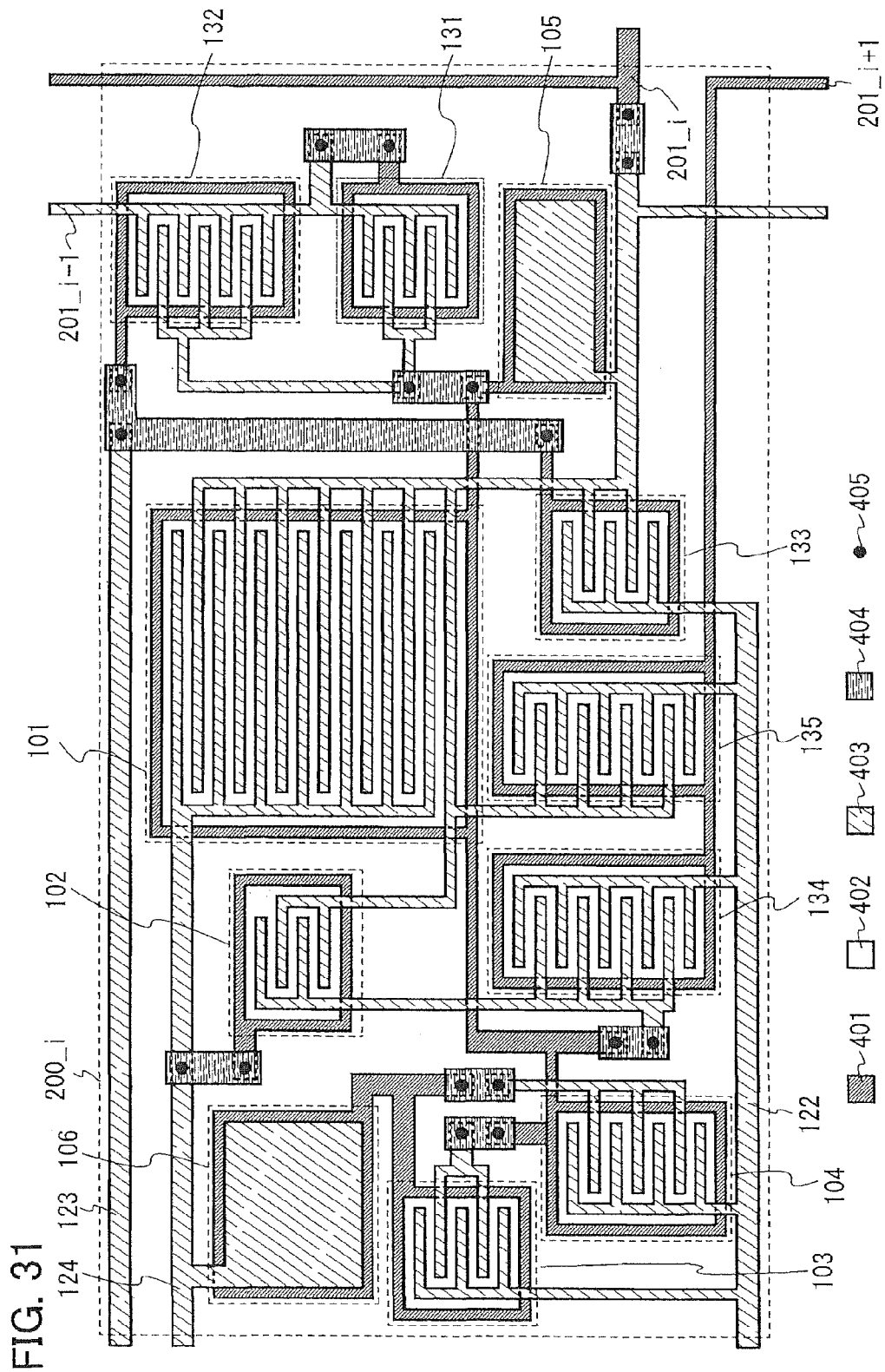
FIG. 31 is a layout view of a shift register.

The layout view in this embodiment is described with reference to FIG. 30 and FIG. 31. FIG. 30 illustrates one example of a layout view of part of the shift register. FIG. 31 illustrates a layout view of the flip-flop 200$_{13}$ i, for example.

A transistor, a capacitor, a wiring, and the like shown in FIG. 30 and FIG. 31 each include a conductive layer 401, a semiconductor layer 402, a conductive layer 403, a conductive layer 404, and a contact hole 405. However, this embodiment is not limited to this. A different conductive layer, insulating film, or a different contact hole can be newly formed. For example, a contact hole which connects the conductive layer 401 to the conductive layer 403 can be additionally provided.

The conductive layer 401 can include a portion which functions as a gate electrode or a wiring. The semiconductor layer 402 can include a portion which functions as a semiconductor layer of the transistor. The conductive layer 403 can include a portion which functions as a wiring or a source or drain. The conductive layer 404 can include a portion which functions as a transparent electrode, a pixel electrode, or a wiring. The contact hole 405 can be used in order to connect the conductive layer 401 and the conductive layer 404 or in order to connect the conductive layer 403 and the conductive layer 404.

In the example in FIG. 30, the wiring 202 includes an opening portion 411 and the wiring 203 includes an opening portion 412. In this manner, since the wiring 202 and the wiring 203 include the opening portions, parasitic capacitance can be reduced. Alternatively, breakdown of the transistor due to electrostatic discharge can be suppressed. However, this embodiment is not limited to this. Like the wiring 204, the opening portion 411 or the opening portion 412 can be eliminated. Alternatively, like the wiring 202 or the wiring 203, an opening portion can be provided for the wiring 204.

In the example in FIG. 30, by providing an opening portion in part of an intersection portion of the wiring 202 or the wiring 203 and a different wiring, the cross-over capacitance of the wiring can be reduced. Accordingly, reduction in noise or reduction in delay or distortion of a signal can be achieved.

In the example in FIG. 30, the conductive layer 404 is formed over part of the conductive layer 403 included in the wiring 204. Then, the conductive layer 404 is connected to the conductive layer 403 through the contact hole 405. In this manner, since wiring resistance can be made low, suppression of voltage drop or reduction in delay or distortion of a signal can be achieved. However, this embodiment is not limited to this. The conductive layer 404 and the contact hole 405 can be eliminated. Alternatively, like the wiring 204, the conductive layer 404 can be formed over part of the conductive layer 403 in the wiring 202 or the wiring 203 so that the conductive layer 404 can be connected to the conductive layer 403.

Here, in the example in FIG. 30, the width of the wiring 202, the width of the wiring 203, and the width of the wiring 204 are denoted as wiring width 421, wiring width 422, and width 423, respectively. Then, the width of the opening portion 411, the length of the opening portion 411, the width of the opening portion 412, and the length of the opening portion 412 are denoted as width 424, length 425, width 426, and length 427, respectively.

Note that signals input to the wiring 202 and the wiring 203 are inverted signals of each other in many cases. Therefore, the wiring resistance or the parasitic capacitance of the wiring 202 is preferably set so as to be approximately equal to that of the wiring 203. Accordingly, the wiring 202 preferably includes a portion whose width is approximately equal to the wiring width 422. Alternatively, the opening portion 411 preferably includes a portion whose width is approximately equal to the width 426 of the opening portion 412 or a portion whose length is approximately equal to the length 427 of the opening portion 412. However, this embodiment is not limited to this. The wiring width 421, the wiring width 422, the width 424 of the opening portion 411, the length 425 of the opening portion 411, or the length 427 of the opening portion 412 can have a variety of values. For example, when the cross-over capacitance of the wiring 202 and a different wiring is higher than that of the wiring 203 and a different wiring, delay or distortion of signals input to the wiring 202 and the wiring 203 can be made approximately the same by decreasing the wiring resistance of the wiring 202. Therefore, the wiring 202 can include a portion which is wider than the wiring width 422. Alternatively, the opening portion 411 can include a portion which is narrower than the width 426 of the opening portion 412. Alternatively, the opening portion 411 can include a portion which is shorter than the length 427 of the opening portion 412. On the other hand, when the cross-over capacitance of the wiring 202 and a different wiring is lower than that of the wiring 203 and a different wiring, the wiring 202 can include a portion whish is narrower than the wiring width 422. Alternatively, the opening portion 411 can include a portion which is wider than the width 426 of the opening portion 412. Alternatively, the opening portion 411 can include a portion which is longer than the length 427 of the opening portion 412.

In the case where the wiring 204 does not include the opening portion, the wiring 204 preferably includes a portion which is narrower than the wiring width 421 or the wiring width 422. This is because the wiring 204 does not include an opening portion, and the wiring resistance of the wiring 204 is low. However, this embodiment is not limited to this. The wiring 204 can include a portion which is wider than the wiring width 421 or the wiring width 422.

In the example in FIG. 31, one electrode of each of the capacitor 105 and the capacitor 106 is formed using the conductive layer 401 and the other electrode of each of the capacitor 105 and the capacitor 106 is formed using a conductive layer 403. Accordingly, since a capacitance value per unit area can be large, reduction in a layout area can be achieved. However, this embodiment is not limited to this. The semiconductor layer 402 can be provided between the conductive layer 401 and the conductive layer 403. In this manner, short circuit between the conductive layer 401 and the conductive layer 403 can be suppressed. Alternatively, the capacitor 105 or the capacitor 106 may be a MOS capacitor.

In the example in FIG. 31, in the transistor 101, the transistor 103, the transistor 104, the transistor 131, the transistor 132, the transistor 133, the transistor 134, and the transistor 135, an area where the conductive layers 401 and the conductive layers 403 of the second terminals overlap with each other is preferably smaller than an area where the conductive layers 401 and the conductive layers 403 of the first terminals overlap with each other. In this manner, reduction in noise of the gate of the transistor 101 or the wiring 201_i can be achieved. Alternatively, since concentration of an electric field on the second terminal can be suppressed, deterioration of the transistor or breakdown of the transistor can be suppressed.

Note that the semiconductor layer 402 can be provided for a portion in which the conductive layer 401 and the conductive layer 403 overlap with each other. Accordingly, the parasitic capacitance between the conductive layer 401 and the conductive layer 403 can be reduced, whereby reduction in noise can be achieved. Because of a similar reason, the semiconductor layer 402 or the conductive layer 403 can be provided for a portion in which the conductive layer 401 and the conductive layer 404 overlap with each other.

Note that the conductive layer 404 can be formed over part of the conductive layer 401 and can be connected to the conductive layer 401 through the contact hole 405. Accordingly, wiring resistance can be reduced. Alternatively, the conductive layer 403 and the conductive layer 404 can be formed over part of the conductive layer 401, so that the conductive layer 401 is connected to the conductive layer 404 through the contact hole 405 and the conductive layer 403 can be connected to the conductive layer 404 through the different contact hole 405. In this manner, the wiring resistance can be further reduced.

Note that the conductive layer 404 can be formed over part of the conductive layer 403, so that the conductive layer 403 can be connected to the conductive layer 404 through the contact hole 405. In this manner, wiring resistance can be reduced.

Note that the conductive layer 401 or the conductive layer 403 can be formed under part of the conductive layer 404, so that the conductive layer 404 can be connected to the conductive layer 401 or the conductive layer 403 through the contact hole 405. In this manner, wiring resistance can be reduced.

Figure 18:
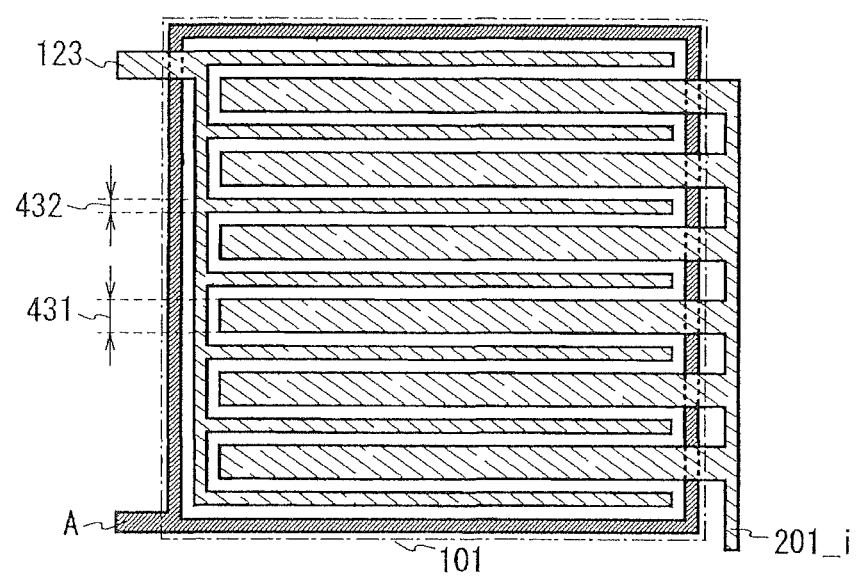
FIG. 18 is a layout view of a shift register.

Note that in the case where the capacitor 105 is eliminated, as described in Embodiment 1, the parasitic capacitance between the gate and the second terminal of the transistor 101 can be higher than the parasitic capacitance between the gate and the first terminal of the transistor 101. One example of a layout view of the transistor 101 in that case is shown in FIG. 18. In the example in FIG. 18, the width of the conductive layer 403 which can function as a first electrode of the transistor 101 is referred to as width 431 and the width of the conductive layer 403 which can function as a second electrode of the transistor 101 is referred to as width 432. In addition, the width 431 can be larger than the width 432. In this manner, as described in Embodiment 1, the parasitic capacitance between the gate and the second terminal of the transistor 101 can be higher than the parasitic capacitance between the gate and the first terminal of the transistor 101. However, this embodiment is not limited to this.

[Embodiment 7]

In this embodiment, one example of a signal line driver circuit will be described. Note that the signal line driver circuit can be referred to as a semiconductor device or a signal generation circuit.

One example of the signal line driver circuit is described with reference to FIG. 26A. The signal line driver circuit includes a plurality of circuits of circuits 502_1 to 502_N (N is a natural number), a circuit 500, and a circuit 501. In addition, the circuits 502_1 to 502_N each include a plurality of transistors of transistors 503_1 to 503_k (k is a natural number). The transistors 503_1 to 503_k are n-channel transistors. However, this embodiment is not limited to this. The transistors 503_1 to 503_k can be p-channel transistors or CMOS switches.

A connection relation of the signal line driver circuit will be described by using the circuit 502_1 as an example. First terminals of the transistors 503_1 to 503_k are connected to the wiring 505_1. Second terminals of the transistors 503_1 to 503_k are connected to wirings S1 to Sk, respectively. Gates of the transistors 503_1 to 503_k are connected to wirings 504_1 to 504_k, respectively. For example, the first terminal of the transistor 503_1 is connected to the wiring 505_1, the second terminal of the transistor 503_1 is connected to the wiring S1, and the gate of the transistor 503_1 is connected to the wiring 504_1.

The circuit 500 has a function of supplying a signal to the circuits 502_1 to 502_N through the wirings 504_1 to 504_k and can function as a shift register or a decoder or the like. The signal is a digital signal in many cases and can function as a selection signal. In addition, the wirings 504_1 to 504_k can function as signal lines.

The circuit 501 has a function of outputting a signal to the circuits 502_1 to 502_N and can function as a video signal generation circuit or the like. For example, the circuit 501 supplies the signal to the circuit 502_1 through the wiring 505_1. At the same time, the circuit 501 supplies the signal to the circuit 502_2 through the wiring 505_2. The signal is an analog signal in many cases and can function as a video signal. In addition, the wirings 505_1 to 505_N can function as signal lines.

The circuits 502_1 to 502_k each have a function of selecting a wiring to which an output signal from the circuit 501 is output and can function as a selector circuit. For example, the circuit 502_1 has a function of selecting one of the wirings S1 to Sk to output a signal output from the circuit 501 to the wiring 505_1.

The transistors 503_1 to 503_k have a function of controlling electric conduction state between the wiring 505_1 and the wirings S1 to Sk in accordance with the output signal from the circuit 500 and function as switches.

Figure 26A:
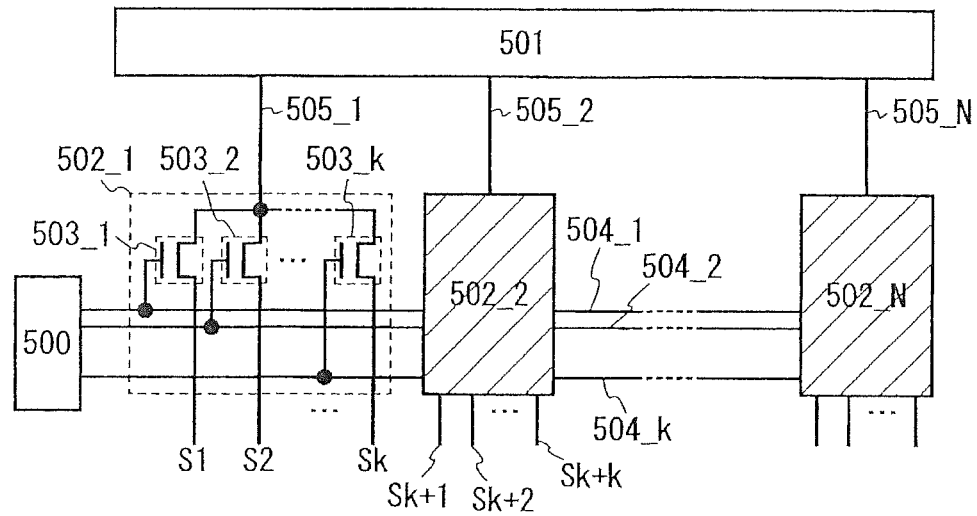
FIG. 26A is a circuit diagram of a signal line driver circuit and FIG. 26B is a timing chart illustrating a driving method of the signal line driver circuit.
Figure 26B:
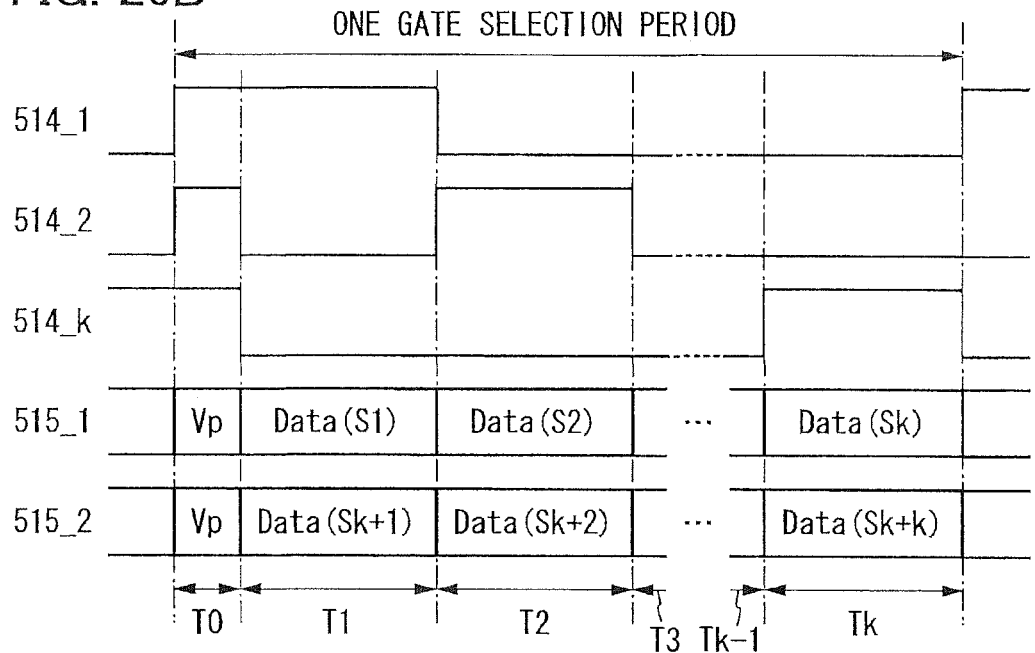

Next, operation of the signal line driver circuit shown in FIG. 26A is described with reference to a timing chart in FIG. 26B. FIG. 26B shows examples of a signal 514_1 input to the wiring 504_1, a signal 514_2 input to the wiring 504_2, a signal 514_k input to the wiring 504_k, a signal 515_1 input to the wiring 505_1, and a signal 515_2 input to the wiring 505_2.

Note that one operation period of the signal line driver circuit corresponds to one gate selection period in a display device. One gate selection period is a period in which a pixel which belongs to one row is selected and a video signal can be written to the pixel.

Note that one gate selection period is divided into a period T0 and a period T1 to a period Tk. The period T0 is a period for applying voltage for precharge on pixels which belong to a selected row at the same time and can be used as a precharge period. Each of the periods T1 to Tk is a period in which a video signal is written to pixels which belong to the selected row and can be used as a writing period.

Note that for simplicity, operation of the signal line driver circuit is described by using operation of the circuit 502_1 as an example.

First, during the period T0, the circuit 500 outputs a signal in an H level to the wirings 504_1 to 504_k. Then, the transistors 503_1 to 503_k are turned on, whereby the wiring 505_1 and the wirings S1 to Sk are brought into electrical conduction. At that time, the circuit 501 supplies precharge voltage Vp to the wiring 505_1, so that the precharge voltage Vp is output to the wirings S1 to Sk through the transistors 503_1 to 503_k, respectively. Then, the precharge voltage Vp is written to the pixels which belong to the selected row, whereby the pixels which belong to the selected row are precharged.

Next, during the period T1, the circuit 500 outputs a signal in an H level to the wirings 504_1. Then, the transistor 503_1 is turned on, whereby the wiring 505_1 and the wiring S1 are brought into electrical conduction. Then, the wiring 505_1 and the wirings S2 to Sk are brought out of electrical conduction. At that time, the circuit 501 supplies a signal Data (S1) to the wiring 505_1, so that the signal Data (S1) is output to the wiring S1 through the transistors 503_1. In this manner, the signal Data (S1) is written to, of the pixels connected to the wiring S1, the pixels which belong to the selected row.

Next, during the period T2, the circuit 500 outputs a signal in an H level to the wirings 504_2. Then, the transistor 503_2 is turned on, whereby the wiring 505_2 and the wiring S2 are brought into electrical conduction. Then, the wiring 505_1 and the wirings S1 are brought out of electrical conduction while the wiring 505_1 and the wirings S3 to Sk are kept out of electrical conduction. At that time, when the circuit 501 outputs a signal Data (S2) to the wiring 505_1, the signal Data (S2) is output to the wiring S2 through the transistors 503_2. In this manner, the signal Data (S2) is written to, of the pixels connected to the wiring S2, the pixels which belong to the selected row.

After that, since the circuit 500 sequentially outputs signals in an H level to the wirings 504_1 to 504_k until the end of the period Tk, the circuit 500 sequentially outputs the signal in the H level to the wirings 504_3 to 504_k from the period T3 to the period Tk, as in the period T1 and the period T2. Therefore, since the transistors 503_3 to 503_k are sequentially turned on, the transistors 503_1 to 503_k are sequentially turned on. Accordingly, a signal output from the circuit 501 is sequentially output to the wirings S1 to Sk. In this manner, the signal can be written to the pixels which belong to the selected row.

Since the signal line driver circuit in this embodiment includes the circuit which functions as a selector, the number of signals or wirings can be reduced. Alternatively, since voltage for precharging is written to the pixel before a video signal is written to the pixel (during period T0), a writing time of the video signal can be shortened. Accordingly, increase in the size of a display device and higher resolution of the display device can be achieved. However, this embodiment is not limited to this. It is possible that the period T0 is eliminated, so that the pixel is not precharged.

Note that if k is too large a number, a writing time of the pixel is shortened, whereby writing of a video signal to the pixel is not completed in the writing time in some cases. Accordingly, it is preferable that k≤6. It is more preferable that k≤3. It is further preferable that k=2.

In specific, in the case where a color element of a pixel is divided into n (n is a natural number), it is possible that k=n. For example, in the case where a color element of a pixel is divided into red (R), green (G), and blue (B), it is possible that k=3. In that case, one gate selection period is divided into a period T0, a period T1, a period T2, and a period T3. Then, a video signal can be written to the pixel of red (R), the pixel of green (G), and the pixel of blue (B) during the period T1, the period T2, and the period T3, respectively. However, this embodiment is not limited to this. The order of the period T1, the period T2, and the period T3 can be appropriately set.

In specific, in the case where a pixel is divided into n (n is a natural number) sub-pixels, it is possible that k=n. For example, in the case where the pixel is divided into two sub-pixels, it is possible that k=2. In that case, one gate selection period is divided into the period T0, the period T1, and the period T2. Then, a video signal can be written to one of the two sub-pixels during the period T1, and a video signal can be written to the other of the two sub-pixels during the period T2.

Note that since the driving frequencies of the circuit 500 and the circuits 502_1 to 502_N are low in many cases, the circuit 500 and the circuits 502_1 to 502_N can be formed over the same substrate as a pixel portion. In this manner, since the number of connections between the substrate over which the pixel portion is formed and an external circuit can be reduced, increase in yield, improvement in reliability, or the like can be achieved. Further, as shown in FIG. 23C, by also forming a scan line driver circuit over the same substrate as the pixel portion, the number of connections between the substrate over which the pixel portion is formed and the external circuit can be further reduced.

Note that the semiconductor device or shift register described in Embodiments 1 to 4 can be used as the circuit 500. In that case, the polarity of all transistors in the circuit 500 can be n-channel or the polarity of all the transistors in the circuit 500 can be p-channel. Accordingly, reduction in the number of steps, increase in yield, or reduction in cost can be achieved.

Note that the polarity of not only all the transistors included in the circuit 500 but also all transistors in the circuits 502_1 to 502_N can be n-channel or all the transistors in the circuits 502_1 to 502_N p-channel. Therefore, in the case where the circuit 500 and the circuits 502_1 to 502_N are formed over the same substrate as the pixel portion, reduction in the number of steps, increase in yield, or reduction in cost can be achieved. In specific, by setting the polarity of all transistors to be n-channel, non-single-crystal semiconductors, microcrystalline semiconductors, organic semiconductors, or oxide semiconductors can be used as semiconductor layers of the transistors. This is because the driving frequencies of the circuit 500 and the circuits 502_1 to 502_N are low in many cases.

[Embodiment 8]

In this embodiment, structures and operations of a pixel which can be applied to a liquid crystal display device are described.

FIG. 27A illustrates an example of a pixel structure which can be applied to the liquid crystal display device. A pixel 5080 includes a transistor 5081, a liquid crystal element 5082, and a capacitor 5083. A gate of the transistor 5081 is electrically connected to a wiring 5085. A first terminal of the transistor 5081 is electrically connected to a wiring 5084. A second terminal of the transistor 5081 is electrically connected to a first terminal of the liquid crystal element 5082. A second terminal of the liquid crystal element 5082 is electrically connected to a wiring 5087. A first terminal of the capacitor 5083 is electrically connected to the first terminal of the liquid crystal element 5082. A second terminal of the capacitor 5083 is electrically connected to a wiring 5086.

The wiring 5084 can function as a signal line. The signal line is a wiring for transmitting a signal voltage, which is input from the outside of the pixel, to the pixel 5080. The wiring 5085 can function as a scan line. The scan line is a wiring for controlling on and off of the transistor 5081. The wiring 5086 can function as a capacitor line. The capacitor line is a wiring for applying a predetermined voltage to the second terminal of the capacitor 5083. The transistor 5081 can function as a switch. The capacitor 5083 can function as a storage capacitor. The storage capacitor is a capacitor with which the signal voltage continues to be applied to the liquid crystal element 5082 even when the switch is off. The wiring 5087 can function as a counter electrode. The counter electrode is a wiring for applying a predetermined voltage to the second terminal of the liquid crystal element 5082. Note that a function of each wiring is not limited thereto, and each wiring can have a variety of functions. For example, by changing a voltage applied to the capacitor line, a voltage applied to the liquid crystal element can be adjusted. Note that the transistor 5081 can be a p-channel transistor or an n-channel transistor because it merely functions as a switch.

FIG. 27B illustrates an example of a pixel structure which can be applied to the liquid crystal display device. The example of the pixel structure illustrated in FIG. 27B is the same as that in FIG. 27A except that the wiring 5087 is eliminated and the second terminal of the liquid crystal element 5082 and the second terminal of the capacitor 5083 are electrically connected to each other. The example of the pixel structure in FIG. 27B can be particularly applied to the case of using a horizontal electric field mode (including an IPS mode and FFS mode) liquid crystal element. This is because in the horizontal electric field mode liquid crystal element, the second terminal of the liquid crystal element 5082 and the second terminal of the capacitor 5083 can be formed over one substrate, and thus it is easy to electrically connect the second terminal of the liquid crystal element 5082 and the second terminal of the capacitor 5083. With the pixel structure in FIG. 10B, the wiring 5087 can be eliminated, whereby a manufacturing process can be simplified, and manufacturing costs can be reduced.

A plurality of pixel structures illustrated in FIG. 27A or FIG. 27B can be arranged in matrix. Accordingly, a display portion of a liquid crystal display device is formed, and a variety of images can be displayed. FIG. 27C illustrates a circuit configuration in the case where a plurality of pixel structures illustrated in FIG. 27A are arranged in matrix. FIG. 27C is the circuit diagram illustrating four pixels among a plurality of pixels included in the display portion. A pixel arranged in ith row and jth column (each of i and j is a natural number) is represented as a pixel 5080_i, j, and a wiring 5084_i, a wiring 5085_j, and a wiring 5086_j are electrically connected to the pixel 5080_i, j. Similarly, a wiring 5084_i+1, the wiring 5085_j, and the wiring 5086_j are electrically connected to a pixel 5080_i+1, j. Similarly, the wiring 5084_i, a wiring 5085_j+1, and a wiring 5086_j+1 are electrically connected to a pixel 5080_i, 1+1. Similarly, the wiring 5084_i+1, the wiring 5085_j+1, and the wiring 5086_j+1 are electrically connected to a pixel 5080_i+1, j+1. Note that each wiring can be used in common with a plurality of pixels in the same row or the same column. In the pixel structure illustrated in FIG. 27C, the wiring 5087 is a counter electrode, which is used by all the pixels in common; therefore, the wiring 5087 is not indicated by the natural number i or j. Further, since the pixel structure in FIG. 27B can also be used in this embodiment, the wiring 5087 is not essential even in a structure where the wiring 5087 is described, and can be eliminated when another wiring functions as the wiring 5087, for example.

The pixel structure in FIG. 27C can be driven by a variety of driving methods. In particular, when the pixels are driven by a method called alternating-current driving, degradation (burn-in) of the liquid crystal element can be suppressed. FIG. 27D is a timing chart of voltages applied to each wiring in the pixel structure in FIG. 27C in the case where dot inversion driving which is a kind of alternating-current driving is performed. By the dot inversion driving, flickers seen when the alternating-current driving is performed can be suppressed. Note that FIG. 27D shows a signal 5185_j which is input to the wiring 5085_j, a signal 5185_j+1 which is input to the wiring 5085_j+1, a signal 5184_i which is input to the wiring 5084_i, a signal 5184_j+1 which is input to the wiring 5084_i+1, and voltage 5186 which is supplied to the wiring 5086_j and the wiring 5086_j+1.

In the pixel structure in FIG. 27C, a switch in a pixel electrically connected to the wiring 5085_j is brought into a selection state (an on state) in a jth gate selection period in one frame period, and into a non-selection state (an off state) in the other periods. Then, a (j+1)th gate selection period is provided after the jth gate selection period. By performing sequential scanning in such a manner, all the pixels are sequentially brought into a selection state within one frame period. In the timing chart of FIG. 27D, when a voltage is at high level, the switch in the pixel is brought into a selection state; when a voltage is at low level, the switch is brought into a non-selection state. Note that this is the case where the transistors in the pixels are n-channel transistors. In the case of using p-channel transistors, the relation between the voltage and the selection state is opposite to that in the case of using n-channel transistors.

In the timing chart illustrated in FIG. 27D, in the jth gate selection period in a kth frame (k is a natural number), a positive signal voltage is applied to the wiring 5084_i used as a signal line, and a negative signal voltage is applied to the wiring 5084_i+1. Then, in the (j+1)th gate selection period in the kth frame, a negative signal voltage is applied to the wiring 5084_i, and a positive signal voltage is applied to the wiring 5084_i+1. After that, signals whose polarity is reversed in each gate selection period are alternately supplied to the signal line. Thus, in the kth frame, the positive signal voltage is applied to the pixels 5080_i, j and 5080_i+1, j+1, and the negative signal voltage is applied to the pixels 5080_i+1, j and 5080_i, j+1. Then, in a (k+1)th frame, a signal voltage whose polarity is opposite to that of the signal voltage written in the kth frame is written to each pixel. Thus, in the (k+1)th frame, the positive signal voltage is applied to the pixels 5080_i+1, j and 5080_$_{-i, j+}$1, and the negative signal voltage is applied to the pixels 5080_i, j and 5080_i+1, j+1. In such a manner, the dot inversion driving is a driving method in which signal voltages whose polarity is different between adjacent pixels are applied in one frame and the polarity of the voltage signal for the pixel is reversed in each frame. By the dot inversion driving, flickers seen when the entire or part of an image to be displayed is uniform can be suppressed while degradation of the liquid crystal element is suppressed. Note that voltages applied to all the wirings 5086 including the wirings 5086_j and 5086_j+1 can be a fixed voltage. Moreover, only the polarity of the signal voltages for the wirings 5084 is shown in the timing chart, the signal voltages can actually have a variety of values in the polarity shown. Here, the case where the polarity is reversed per dot (per pixel) is described; however, this embodiment is not limited thereto, and the polarity can be reversed per a plurality of pixels. For example, the polarity of signal voltages to be written is reversed per two gate selection periods, whereby power consumed by writing the signal voltages can be reduced. Alternatively, the polarity may be reversed per column (source line inversion) or per row (gate line inversion).

Note that a fixed voltage may be applied to the second terminal of the capacitor 5083 in the pixel 5080 in one frame period. Since a voltage applied to the wiring 5085 used as a scan line is at low level in most of one frame period, which means that a substantially constant voltage is applied to the wiring 5085; therefore, the second terminal of the capacitor 5083 in the pixel 5080 may be connected to the wiring 5085. FIG. 27E illustrates an example of a pixel structure which can be applied to the liquid crystal display device. Compared to the pixel structure in FIG. 27C, a feature of the pixel structure in FIG. 27E is that the wiring 5086 is eliminated and the second terminal of the capacitor 5083 in the pixel 5080 and the wiring 5085 in the previous row are electrically connected to each other. Specifically, in the range illustrated in FIG. 27E, the second terminals of the capacitors 5083 in the pixels 5080_i, j+1 and 5080_i+1, j+1 are electrically connected to the wiring 5085_j. By electrically connecting the second terminal of the capacitor 5083 in the pixel 5080 and the wiring 5085 in the previous row in such a manner, the wiring 5086 can be eliminated, so that the aperture ratio of the pixel can be increased. Note that the second terminal of the capacitor 5083 may be connected to the wiring 5085 in another row instead of in the previous row. Further, the pixel structure in FIG. 27E can be driven by a similar driving method to that in the pixel structure in FIG. 27C.

Note that a voltage applied to the wiring 5084 used as a signal line can be made lower by using the capacitor 5083 and the wiring electrically connected to the second terminal of the capacitor 5083. A pixel structure and a driving method in that case will be described with reference to FIGS. 27F and 27G Compared to the pixel structure in FIG. 27A, a feature of the pixel structure in FIG. 27F is that two wirings 5086 are provided per pixel row, and in adjacent pixels, one wiring is electrically connected to every other second terminal of the capacitors 5083 and the other wiring is electrically connected to the remaining every other second terminal of the capacitors 5083. Two wirings 5086 are referred to as a wiring 5086-1 and a wiring 5086-2. Specifically, in the range illustrated in FIG. 27F, the second terminal of the capacitor 5083 in the pixel 5080_i, j is electrically connected to a wiring 5086-1_j; the second terminal of the capacitor 5083 in the pixel 5080_i+1, j is electrically connected to a wiring 5086-2_j; the second terminal of the capacitor 5083 in the pixel 5080_i, j+1 is electrically connected to a wiring 5086-2_j+1; and the second terminal of the capacitor 5083 in the pixel 5080_i+1, j+1 is electrically connected to a wiring 5086-1_j+1. Note that FIG. 27G shows the signal 5185_j which is input to the wiring 5085_j, the signal 5185_j+1 which is input to the wiring 5085_j+1, the signal 5184_i which is input to the wiring 5084_i, the signal 5184_i+1 which is input to the wiring 5084_i+1, a signal 5186-1_j which is input to the wiring 5086-1_j, a signal 5186-2_j which is input to the wiring 5086-2_j, a signal 5186-1_j+1 which is input to the wiring 5086-1_j+1, and a signal 5186-2_j+1 which is input to the wiring 5086-2_j+1.

For example, when a positive signal voltage is written to the pixel 5080_i, j in the kth frame as illustrated in FIG. 27G; the wiring 5086-1_j becomes low level, and is changed to high level after the jth gate selection period. Then, the wiring 5086-1_j is kept at high level in one frame period, and after a negative signal voltage is written in the jth gate selection period in the (k+1)th frame, the wiring 5086-1_j is changed to high level. In such a manner, a voltage of the wiring which is electrically connected to the second terminal of the capacitor 5083 is changed to the positive direction after a positive signal voltage is written to the pixel, whereby a voltage applied to the liquid crystal element can be changed to the positive direction by a predetermined amount. That is, a signal voltage written to the pixel can be reduced accordingly, so that power consumed by signal writing can be reduced. Note that when a negative signal voltage is written in the jth gate selection period, a voltage of the wiring which is electrically connected to the second terminal of the capacitor 5083 is changed to the negative direction after a negative signal voltage is written to the pixel. Accordingly, a voltage applied to the liquid crystal element can be changed to the negative direction by a predetermined amount, and the signal voltage written to the pixel can be reduced as in the case of the positive polarity. In other words, as for the wiring which is electrically connected to the second terminal of the capacitor 5083, different wirings are preferably used for a pixel to which a positive signal voltage is applied and a pixel to which a negative signal voltage is applied in the same row in one frame. FIG. 27F illustrates the example in which the wiring 5086-1 is electrically connected to the pixel to which a positive signal voltage is applied in the kth frame, and the wiring 5086-2 is electrically connected to the pixel to which a negative signal voltage is applied in the kth frame. Note that this is just an example, and for example, in the case of using a driving method in which pixels to which a positive signal voltage is applied and pixels to which a negative signal voltage is applied are arranged every two pixels, the wirings 5086-1 and 5086-2 are preferably electrically connected to every alternate two pixels accordingly. Furthermore, in the case where signal voltages of the same polarity are written in all the pixels in one row (gate line inversion), one wiring 5086 may be provided per row. In other words, in the pixel structure in FIG. 27C, the driving method where a signal voltage written to a pixel is reduced as described with reference to FIGS. 27F and 27G can be used.

Figure 28A:
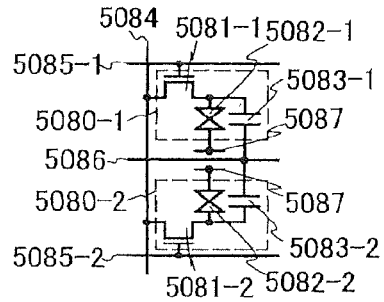
FIGS. 28A and 28B are circuit diagrams of a pixel.
Figure 28B:
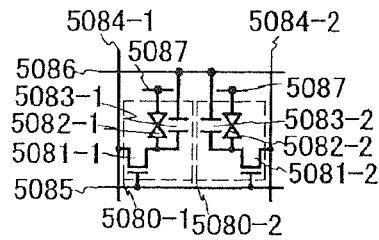

Next, a pixel structure and a driving method which are preferably employed particularly in the case where a liquid crystal element employs a vertical alignment (VA) mode typified by an MVA mode and a PVA mode. The VA mode has advantages such as no rubbing step in manufacture, little light leakage at the time of black display, and low driving voltage, but has a problem in that the image quality is degraded (the viewing angle is narrower) when a screen is seen from an oblique angle. In order to increase the viewing angle in the VA mode, a pixel structure where one pixel includes a plurality of subpixels as illustrated in FIGS. 28A and 28B is effective. Pixel structures illustrated in FIGS. 28A and 28B are examples of the case where the pixel 5080 includes two subpixels (a subpixel 5080-1 and a subpixel 5080-2). Note that the number of subpixels in one pixel is not limited to two and can be other numbers. The viewing angle can be further increased as the number of subpixels is increased. A plurality of subpixels can have the same circuit configuration; here, all the subpixels have the circuit configuration illustrated in FIG. 27A. The first subpixel 5080-1 includes a transistor 5081-1, a liquid crystal element 5082-1, and a capacitor 5083-1. The connection relation is the same as that in the circuit configuration in FIG. 27A. Similarly, the second subpixel 5080-2 includes a transistor 5081-2, a liquid crystal element 5082-2, and a capacitor 5083-2. The connection relation is the same as that in the circuit configuration in FIG. 27A.

The pixel structure in FIG. 28A includes, for two subpixels forming one pixel, two wirings 5085 (a wiring 5085-1 and a wiring 5085-2) used as scan lines, one wiring 5084 used as a signal line, and one wiring 5086 used as a capacitor line. When the signal line and the capacitor line are shared with two subpixels in such a manner, the aperture ratio can be increased. Further, since a signal line driver circuit can be simplified, manufacturing costs can be reduced. Moreover, since the number of connections between a liquid crystal panel and a driver circuit IC can be reduced, the yield can be increased. The pixel structure in FIG. 28B includes, for two subpixels forming one pixel, one wiring 5085 used as a scan line, two wirings 5084 (a wiring 5084-1 and a wiring 5084-2) used as signal lines, and one wiring 5086 used as a capacitor line. When the scan line and the capacitor line are shared with two subpixels in such a manner, the aperture ratio can be increased. Further, since the total number of scan lines can be reduced, one gate line selection period can be sufficiently long even in a high-definition liquid crystal panel, and an appropriate signal voltage can be written in each pixel.

Figure 28C:
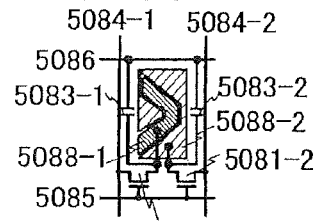
FIGS. 28C to 28E and 28G are layout diagrams of the pixel.
Figure 28D:
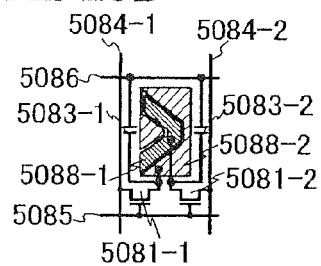

FIGS. 28C and 28D illustrate an example in which the liquid crystal element in the pixel structure in FIG. 28B is replaced with the shape of a pixel electrode and electrical connections of each element are schematically shown. In FIGS. 28C and 28D, an electrode 5088-1 represents a first pixel electrode, and an electrode 5088-2 represents a second pixel electrode. In FIG. 28C, the first pixel electrode 5088-1 corresponds to a first terminal of the liquid crystal element 5082-1 in FIG. 28B, and the second pixel electrode 5088-2 corresponds to a first terminal of the liquid crystal element 5082-2 in FIG. 28B. That is, the first pixel electrode 5088-1 is electrically connected to one of a source and a drain of the transistor 5081-1, and the second pixel electrode 5088-2 is electrically connected to one of a source and a drain of the transistor 5081-2. In FIG. 28D, the connection relation between the pixel electrode and the transistor is opposite to that in FIG. 28C. That is, the first pixel electrode 5088-1 is electrically connected to one of the source and the drain of the transistor 5081-2, and the second pixel electrode 5088-2 is electrically connected to one of the source and the drain of the transistor 5081-1.

Figure 28E:
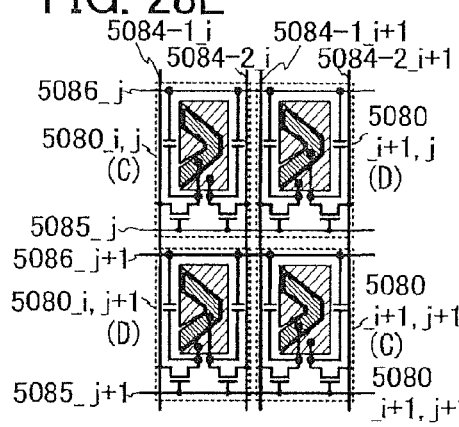
Figure 28F:
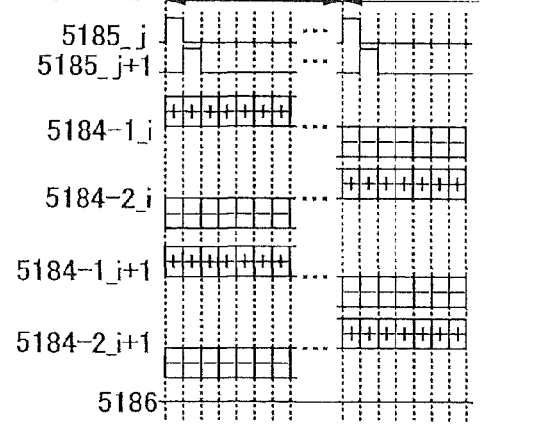
FIGS. 28F and 28H are timing charts each illustrating a driving method of the pixel.

By arranging a plurality of pixel structures as illustrated in FIG. 28C or FIG. 28D in matrix, an extraordinary effect can be obtained. FIGS. 28E and 28F illustrate an example of such a pixel structure and driving method. In the pixel structure in FIG. 28E, a portion corresponding to the pixels 5080_i, j and 5080_i+1, j+1 has the structure illustrated in FIG. 28C, and a portion corresponding to the pixels 5080_i+1, j and 5080_i, j+1 has the structure illustrated in FIG. 28D.

When this structure is driven as shown in the timing chart of FIG. 28F, a positive signal voltage is written to the first pixel electrode in the pixel 5080_i, j and the second pixel electrode in the pixel 5080_i+1, j, and a negative signal voltage is written to the second pixel electrode in the pixel 5080_i, j and the first pixel electrode in the pixel 5080_i+1, j. Then, in the (j+1)th gate selection period in the kth frame, a positive signal voltage is written to the second pixel electrode in the pixel 5080_i, j+1 and the first pixel electrode in the pixel 5080_i+1, j+1, and a negative signal voltage is written to the first pixel electrode in the pixel 5080_j, j+1 and the second pixel electrode in the pixel 5080_i+1, j+1. In the (k+1)th frame, the polarity of the signal voltage is reversed in each pixel. Accordingly, the polarity of the voltage applied to the signal line can be the same in one frame period while driving corresponding to dot inversion driving is realized in the pixel structure including subpixels, whereby power consumed by writing the signal voltages to the pixels can be drastically reduced. Note that voltages applied to all the wirings 5086 including the wirings 5086_j and 5086_j+1 can be a fixed voltage. Note that FIG. 27F shows the signal 5185_j which is input to the wiring 5085_j, the signal 5185_j+1 which is input to the wiring 5085_j+1, the signal 5184-1_i which is input to the wiring 5084-1_i, the signal 5184-2_i which is input to the wiring 5084-2_i, a signal 5184-1_i+1 which is input to the wiring 5084-1_i+1, a signal 5184-2_i+1 which is input to the wiring 5084-2_i+1, and the voltage 5186 which is supplied to the wiring 5086_j and the wiring 5086_j+1.

Figure 28G:
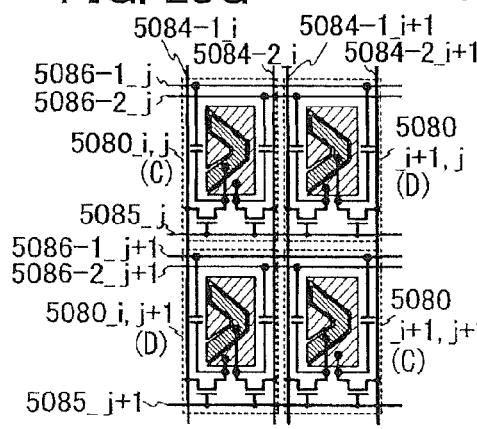
Figure 28H:
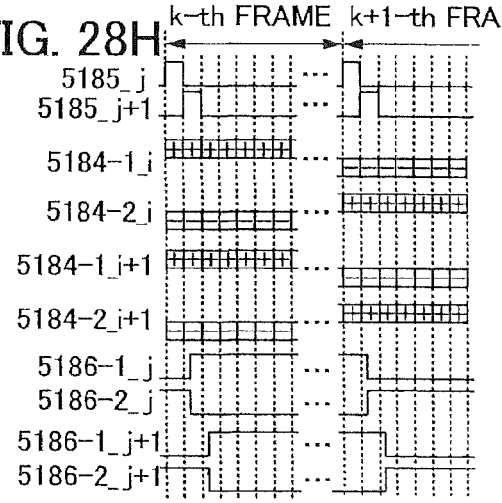

Further, by a pixel structure and a driving method illustrated in FIGS. 28G and 28H, the level of the signal voltage written to a pixel can be reduced. In the structure, a plurality of subpixels included in each pixel are electrically connected to respective capacitor lines. That is, according to the pixel structure and the driving method illustrated in FIGS. 28G and 28H, one capacitor line is shared with subpixels in one row, to which signal voltages of the same polarity are written in one frame; and subpixels to which signal voltages of the different polarities are written in one frame use different capacitor lines in one row. Then, when writing in each row is finished, voltages of the capacitor lines are changed to the positive direction in the subpixels to which a positive signal voltage is written, and changed to the negative direction in the subpixels to which a negative signal voltage is written; thus, the level of the signal voltage written to the pixel can be reduced. Specifically, two wirings 5086 (the wirings 5086-1 and 5086-2) used as capacitor lines are provided per row. The first pixel electrode in the pixel 5080_i, j and the wiring 5086-1_j are electrically connected through the capacitor. The second pixel electrode in the pixel 5080_i, j and the wiring 5086-2_j are electrically connected through the capacitor. The first pixel electrode in the pixel 5080_i+1, j and the wiring 5086-2_j are electrically connected through the capacitor. The second pixel electrode in the pixel 5080_i+1, j and the wiring 5086-1_j are electrically connected through the capacitor. The first pixel electrode in the pixel 5080_i, j+1 and the wiring 5086-2_j+1 are electrically connected through the capacitor. The second pixel electrode in the pixel 5080_i, j+1 and the wiring 5086-1_j+1 are electrically connected through the capacitor. The first pixel electrode in the pixel 5080_i+1, j+1 and the wiring 5086-1_j+1 are electrically connected through the capacitor. The second pixel electrode in the pixel 5080_i+1, j+1 and the wiring 5086-2_j+1 are electrically connected through the capacitor. Note that this is just an example, and for example, in the case of using a driving method in which pixels to which a positive signal voltage is applied and pixels to which a negative signal voltage is applied are arranged every two pixels, the wirings 5086-1 and 5086-2 are preferably electrically connected to every alternate two pixels accordingly. Furthermore, in the case where signal voltages of the same polarity are written in all the pixels in one row (gate line inversion), one wiring 5086 may be provided per row. In other words, in the pixel structure in FIG. 28E, the driving method where a signal voltage written to a pixel is reduced as described with reference to FIGS. 28G and 28H can be used. Note that FIG. 28H shows the signal 5185_j which is input to the wiring 5085_j, the signal 5185_j+1 which is input to the wiring 5085_j+1, the signal 5184-1_i which is input to the wiring 5084-1_i, the signal 5184-2_i which is input to the wiring 5084-2_i, the signal 5184-1_i+1 which is input to the wiring 5084-1_i+1, the signal 5184-2_i+1 which is input to the wiring 5084-2_i+1, the signal 5186-1_j which is input to the wiring 5086-1_j, the signal 5186-2_j which is input to the wiring 5086-2_j, the signal 5186-1_j+1 which is input to the wiring 5086-1_j+1, and the signal 5186-2_j+1 which is input to the wiring 5086-2_j+1.

By a combination of the pixel in this embodiment and the semiconductor device, shift register, or display device in Embodiments 1 to 7, a variety of advantages can be obtained. For example, in the case where the pixel with a sub-pixel structure is used, since the number of signals required for driving the display device is increased, the number of gate lines or source lines is increased in some cases. As a result, the number of connections between a substrate over which a pixel portion is formed and an external circuit is largely increased in some cases. However, even if the number of gate lines is increased, a scan line driver circuit can be formed over the same substrate as the pixel portion as shown in Embodiment 5. Accordingly, the pixel with the sub-pixel structure can be used without largely increasing the number of connections between the substrate over which the pixel portion is formed and the external circuit. Alternatively, even if the number of source lines is increased, the number of source lines can be decreased by using the signal line driver circuit in Embodiment 7. Therefore, the pixel with the sub-pixel structure can be used without largely increasing the number of connections between the substrate over which the pixel portion is formed and the external circuit.

Alternatively, in the case where a signal is input to a capacitor line, the number of connections between the substrate over which the pixel portion is formed and the external circuit is largely increased in some cases. Accordingly, the signal can be supplied to the capacitor line by using the semiconductor device or shift register in Embodiments 1 to 4. In addition, the semiconductor device or shift register in Embodiments 1 to 4 can be formed over the same substrate as the pixel portion. Therefore, the signal can be input to the capacitor line without largely increasing the number of connections between the substrate over which the pixel portion is formed and the external circuit.

Alternatively, in the case where alternate-current driving is employed, a writing time of a video signal to the pixel becomes long. As a result, enough writing time of the video signal to the pixel cannot be obtained in some cases. Similarly, in the case where the pixel with the sub-pixel structure is used, the writing time of the video signal to the pixel is shortened. As a result, enough writing time of the video signal to the pixel cannot be obtained in some cases. By using the signal line driver circuit in Embodiment 7, the video signal can be written to the pixel. In that case, since voltage for precharge is written to the pixel before the video signal is written to the pixel, the video signal can be written to the pixel in a short time. Alternatively, as shown in FIG. 24 and FIGS. 25A and 25B, by overlapping a period in which one row is selected and a period in which a different row is selected with each other, a video signal in a different row can be used as the voltage for precharging.

Note that by a combination of the driving method of the pixel in this embodiment and the driving method shown in FIG. 24 and FIGS. 25A and 25B, the writing time of the video signal to the pixel can be shortened. This is described in detail with reference to a timing chart in FIG. 29A and a pixel structure in FIG. 27C. A positive video signal is input to the wiring 5084_i and a negative video signal is input to the wiring 5084_i+1 in the kth frame. In addition, a negative video signal is input to the wiring 5084_i and a positive video signal is input to the wiring 5084_i+1 in the (k+1)th frame. In the (k+1)th frame, so-called source line inversion driving is performed. Moreover, for example, the latter half of a period in which an H signal is input to the wiring 5085_j and the first half of a period in which an H signal is input to the wiring 5085_j+1 overlap with each other. Further, a negative video signal is written to and held in the pixels 5080_i and 5080_j+1 in the (k−1)th frame. A positive video signal is written to and held in the pixels 5080_i+1 and 5080_j+1. Note that FIG. 29A shows the signal 5185_j which is input to the wiring 5085_j, the signal 5185_j+1 which is input to the wiring 5085_j+1, the signal 5184_i which is input to the wiring 5084_i, and the signal 5184_i+1 which is input to the wiring 5084_i+1.

First, in the kth frame, a positive video signal is written to the pixels 5080_i and 5080_j and a negative video signal is written to the pixels 5080_i+1 and 5080_j during a period when the period in which the H signal is input to the wiring 5085_j and the period in which the H signal is input to the wiring 5085_j+1 overlap with each other.

At that time, the positive video signal is also written to the pixels 5080_i and 5080_j+1 and the negative video signal is also written to the pixels 5080_i+1 and 5080_j+1. In this manner, pixels in a (j+1)th row are precharged by using the video signal written to pixels in a jth row. After that, in the kth frame, a positive video signal is written to the pixels 5080_i and 5080_j+1 and a negative video signal is written to the pixels 5080_i+1 and 5080_j+1 during the latter half of the period in which the H signal is input to the wiring 5080_j+1. It is needless to say that the positive video signal is written to the pixel 5080_i and a pixel 5080_j+2, whereby the pixels 5080_i and 5080_j+2 are precharged. Similarly, the negative video signal is written to the pixels 5080_i+1 and 5080_j+2, whereby the pixels 5080_i+1 and 5080_j+2 are precharged. In this manner, by precharging the pixels in the (j+1)th row by using the video signal written to the pixels in the jth row, a writing time of the video signal to the pixels in the (j+1)th row can be shortened.

Figure 29A:
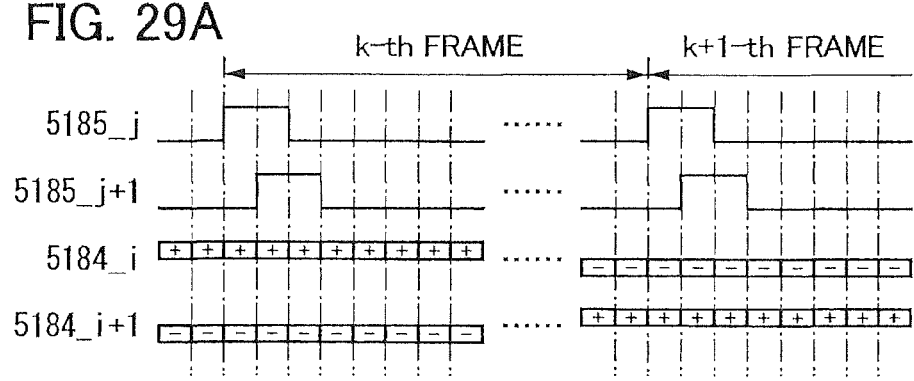
FIG. 29A is a timing chart illustrating a driving method of a pixel and FIG. 29B is a circuit diagram of the pixel.
Figure 29B:
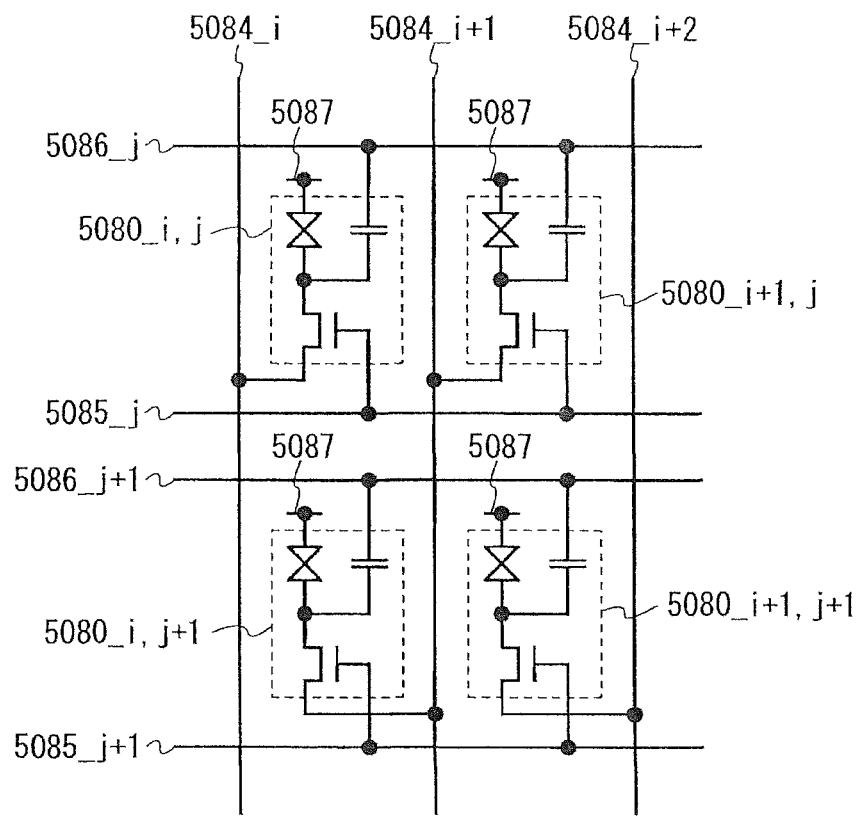

Note that by a combination of the driving method in FIG. 29A and the pixel structure in FIG. 29B, dot inversion driving can be realized. In the pixel structure in FIG. 29B, the pixels 5080_i and 5080_j are connected to the wiring 5084_i. On the other hand, the pixels 5080_i and 5080_j+1 are connected to the wiring 5084_i+1. That is, each of pixels in an ith column is alternately connected to the wiring 5084_i or the wiring 5084_i+1 with respect to one row. In this manner, since a positive video signal or a negative video signal is alternately written to each of the pixels in the ith column, the dot inversion driving can be realized. However, this embodiment is not limited to this. Each of the pixels in the ith column can be alternately connected to the wiring 5084_i or the wiring 5084_i+1 with respect to a plurality of rows (e.g., two rows or three rows).

[Embodiment 9]

In this embodiment, examples of structures of transistors are described with reference to FIGS. 32A, 32B, and 32C.

Figure 32A:
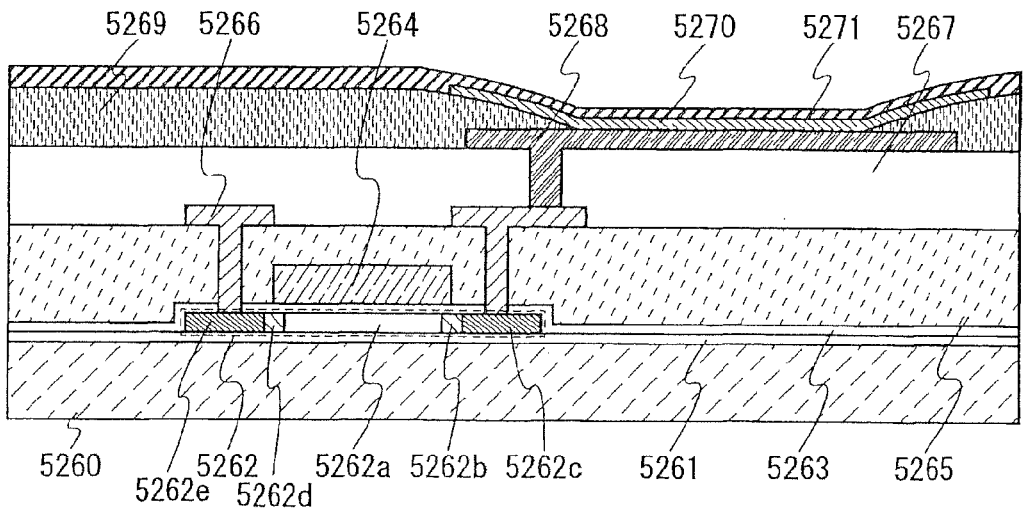
FIGS. 32A to 32C are cross-sectional views of a transistor.

FIG. 32A illustrates an example of a structure of a top-gate transistor. FIG. 32B illustrates an example of a structure of a bottom-gate transistor. FIG. 32C illustrates an example of a structure of a transistor formed using a semiconductor substrate.

FIG. 32A illustrates a substrate 5260; an insulating layer 5261 formed over the substrate 5260; a semiconductor layer 5262 which is formed over the insulating layer 5261 and is provided with a region 5262a, a region 5262b, a region 5262c, a region 5262d, and a region 5262e; an insulating layer 5263 formed so as to cover the semiconductor layer 5262; a conductive layer 5264 formed over the semiconductor layer 5262 and the insulating layer 5263; an insulating layer 5265 which is formed over the insulating layer 5263 and the conductive layer 5264 and is provided with openings; a conductive layer 5266 which is formed over the insulating layer 5265 and in the openings formed in the insulating layer 5265; an insulating layer 5267 which is formed over the conductive layer 5266 and the insulating layer 5265 and is provided with an opening; a conductive layer 5268 which is formed over the insulating layer 5267 and in the opening formed in the insulating layer 5267; an insulating layer 5269 which is formed over the insulating layer 5267 and the conductive layer 5268 and is provided with the opening; a light-emitting layer 5270 which is formed over the insulating layer 5269 and in the opening formed in the insulating layer 5269; and a conductive layer 5271 formed over the insulating layer 5269 and the light-emitting layer 5270.

Figure 32B:
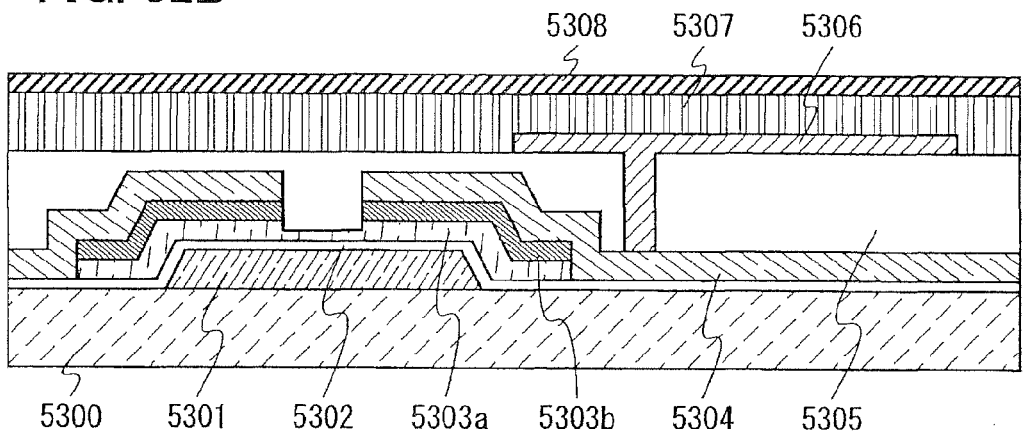

FIG. 32B illustrates a substrate 5300; a conductive layer 5301 formed over the substrate 5300; an insulating layer 5302 formed so as to cover the conductive layer 5301; a semiconductor layer 5303a formed over the conductive layer 5301 and the insulating layer 5302; a semiconductor layer 5303b formed over the semiconductor layer 5303a; a conductive layer 5304 formed over the semiconductor layer 5303b and the insulating layer 5302; an insulating layer 5305 which is formed over the insulating layer 5302 and the conductive layer 5304 and is provided with an opening; a conductive layer 5306 which is formed over the insulating layer 5305 and in the opening formed in the insulating layer 5305; a liquid crystal layer 5307 formed over the insulating layer 5305 and the conductive layer 5306; and a conductive layer 5308 formed over the liquid crystal layer 5307.

Figure 32C:
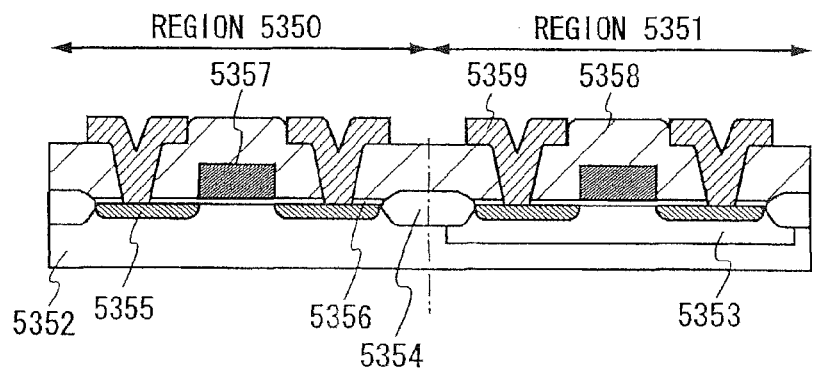

FIG. 32C illustrates a semiconductor substrate 5352 including a region 5353 and a region 5355; an insulating layer 5356 formed over the semiconductor substrate 5352; an insulating layer 5354 formed over the semiconductor substrate 5352; a conductive layer 5357 formed over the insulating layer 5356; an insulating layer 5358 which is formed over the insulating layer 5354, the insulating layer 5356, and the conductive layer 5357 and is provided with openings; and a conductive layer 5359 which is formed over the insulating layer 5358 and in the openings formed in the insulating layer 5358. Thus, a transistor is formed in each of a region 5350 and a region 5351.

The insulating layer 5261 can function as a base film. The insulating layer 5354 functions as an element isolation layer (e.g., a field oxide film). Each of the insulating layer 5263, the insulating layer 5302, and the insulating layer 5356 can function as a gate insulating film. Each of the conductive layer 5264, the conductive layer 5301, and the conductive layer 5357 can function as a gate electrode. Each of the insulating layer 5265, the insulating layer 5267, the insulating layer 5305, and the insulating layer 5358 can function as an interlayer film or a planarization film. Each of the conductive layer 5266, the conductive layer 5304, and the conductive layer 5359 can function as a wiring, an electrode of a transistor, an electrode of a capacitor, or the like. Each of the conductive layer 5268 and the conductive layer 5306 can function as a pixel electrode, a reflective electrode, or the like. The insulating layer 5269 can function as a bank. Each of the conductive layer 5271 and the conductive layer 5308 can function as a counter electrode, a common electrode, or the like.

As each of the substrate 5260 and the substrate 5300, a glass substrate, a quartz substrate, a silicon substrate, a metal substrate, a stainless steel substrate, a flexible substrate, or the like can be used, for example. As a glass substrate, a barium borosilicate glass substrate, an aluminoborosilicate glass substrate, or the like can be used, for example. For a flexible substrate, a flexible synthetic resin such as plastics typified by polyethylene terephthalate (PET), polyethylene naphthalate (PEN), and polyether sulfone (PES), or acrylic can be used, for example. Alternatively, an attachment film (formed using polypropylene, polyester, vinyl, polyvinyl fluoride, polyvinyl chloride, or the like), paper of a fibrous material, a base material film (formed using polyester, polyamide, an inorganic vapor deposition film, paper, or the like), or the like can be used.

As the semiconductor substrate 5352, for example, a single crystal silicon substrate having n-type or p-type conductivity can be used. Note that this embodiment is not limited to this, and a substrate which is similar to the substrate 5260 can be used. For example, the region 5353 is a region where an impurity is added to the semiconductor substrate 5352 and functions as a well. For example, in the case where the semiconductor substrate 5352 has p-type conductivity, the region 5353 has n-type conductivity and functions as an n-well. On the other hand, in the case where the semiconductor substrate 5352 has n-type conductivity, the region 5353 has p-type conductivity and functions as a p-well. For example, the region 5355 is a region where an impurity is added to the semiconductor substrate 5352 and functions as a source region or a drain region. Note that an LDD region can be formed in the semiconductor substrate 5352.

For the insulating layer 5261, a single-layer structure or a layered structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y) can be used, for example. In an example in the case where the insulating film 5261 has a two-layer structure, a silicon nitride film and a silicon oxide film can be formed as a first insulating film and a second insulating film, respectively. In an example in the case where the insulating film 5261 has a three-layer structure, a silicon oxide film, a silicon nitride film, and a silicon oxide film can be formed as a first insulating film, a second insulating film, and a third insulating film, respectively.

As an example of each of the semiconductor layer 5262, the semiconductor layer 5303a, and the semiconductor layer 5303b, a single layer structure or layered structure of an amorphous semiconductor, microcrystalline (microcrystal) semiconductor, a polycrystalline semiconductor, a single crystal semiconductor, an oxide semiconductor (e.g., zinc oxide (ZnO) or IGZO (InGaZnO), or compound semiconductor (e.g., gallium arsenide (GaAs)) can be given.

Note that for example, the region 5262a is an intrinsic region where an impurity is not added to the semiconductor layer 5262 and functions as a channel region. However, a slight amount of impurities can be added to the region 5262a. The concentration of the impurity added to the region 5262a is preferably lower than the concentration of an impurity added to the region 5262b, the region 5262c, the region 5262d, or the region 5262e. Each of the region 5262b and the region 5262d is a region to which an impurity is added at low concentration and functions as an LDD (lightly doped drain) region. Note that the region 5262b and the region 5262d can be eliminated. Each of the region 5262c and the region 5262e is a region to which an impurity is added at high concentration and functions as a source region or a drain region.

Note that in the case where the semiconductor layer 5262 is used for a transistor, the conductivity type of the region 5262c and the conductivity type of the region 5262e are preferably the same.

Note that the semiconductor layer 5303b is a semiconductor layer to which phosphorus or the like is added as an impurity element and has n-type conductivity.

Note that in the case where an oxide semiconductor or a compound semiconductor is used for the semiconductor layer 5303a, the semiconductor layer 5303b can be eliminated.

For each of the insulating layer 5263, the insulating layer 5302, and the insulating layer 5356, a single-layer structure or a layered structure of an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y) can be used, for example.

As each of the conductive layer 5264, the conductive layer 5266, the conductive layer 5268, the conductive layer 5271, the conductive layer 5301, the conductive layer 5304, the conductive layer 5306, the conductive layer 5308, the conductive layer 5357, and the conductive layer 5359, for example, a conductive film having a single-layer structure or a layered structure, or the like can be used. For example, for the conductive film, a single-layer film containing one element selected from the group consisting of aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), manganese (Mn), cobalt (Co), niobium (Nb), silicon (Si), iron (Fe), palladium (Pd), carbon (C), scandium (Sc), zinc (Zn), phosphorus (P), boron (B), arsenic (As), gallium (Ga), indium (In), tin (Sn), and oxygen (O); a compound containing one or more elements selected from the above group; or the like can be used. For example, the compound is an alloy containing one or more elements selected from the above group (e.g., an alloy material such as indium tin oxide (ITO), indium zinc oxide (IZO), indium tin oxide containing silicon oxide (ITSO), zinc oxide (ZnO), tin oxide (SnO), cadmium tin oxide (CTO), aluminum-neodymium (Al—Nd), magnesium-silver (Mg—Ag), molybdenum-niobium (Mo—Nb), molybdenum-tungsten (Mo—W), or molybdenum-tantalum (Mo—Ta)); a compound containing nitrogen and one or more elements selected from the above group (e.g., a nitride film containing titanium nitride, tantalum nitride, molybdenum nitride, or the like); or a compound containing silicon and one or more elements selected from the above group (e.g., a silicide film containing tungsten silicide, titanium silicide, nickel silicide, aluminum silicon, or molybdenum silicon); or the like. Alternatively, a nanotube material such as a carbon nanotube, an organic nanotube, an inorganic nanotube, or a metal nanotube can be used.

Note that silicon (Si) can contain an n-type impurity (e.g., phosphorus) or a p-type impurity (e.g., boron).

Note that in the case where copper is used for the conductive layer, a layered structure is preferably used in order to improve adhesion.

Note that for a conductive layer which is in contact with an oxide semiconductor or silicon, molybdenum or titanium is preferably used.

Note that by using an alloy material containing neodymium and aluminum for the conductive layer, aluminum does not easily cause hillocks.

Note that in the case where a semiconductor material such as silicon is used for the conductive layer, the semiconductor material such as silicon can be formed at the same time as a semiconductor layer of a transistor.

Note that since ITO, IZO, ITSO, ZnO, Si, SnO, CTO, a carbon nanotube, or the like has light-transmitting properties, such a material can be used for a portion through which light passes, such as a pixel electrode, a counter electrode, or a common electrode.

Note that by using a layered structure containing a low-resistance material (e.g., aluminum), wiring resistance can be lowered.

Note that by using a layered structure where a low heat-resistance material (e.g., aluminum) is interposed between high heat-resistance materials (e.g., molybdenum, titanium, or neodymium), advantages of the low heat-resistance material can be effectively utilized and heat resistance of a wiring, an electrode, or the like can be increased.

Note that a material whose properties are changed by reaction with a different material can be interposed between or covered with materials which do not easily react with the different material. For example, in the case where ITO and aluminum are connected to each other, titanium, molybdenum, or an alloy of neodymium can be interposed between ITO and aluminum. For example, in the case where silicon and aluminum are connected to each other, titanium, molybdenum, or an alloy of neodymium can be interposed between silicon and aluminum. Note that such a material can be used for a wiring, an electrode, a conductive layer, a conductive film, a terminal, a via, a plug, or the like.

Note that in the case where the above-described conductive film is formed to have a layered structure, for example, a structure in which Al is sandwiched between Mo, Ti, or the like is preferable. Thus, the resistance of Al to heat or chemical reaction can be improved.

For each of the insulating layer 5265, the insulating layer 5267, the insulating layer 5269, the insulating layer 5305, and the insulating layer 5358, an insulating film having a single-layer structure or a layered structure, or the like can be used, for example. For example, as the insulating film, an insulating film containing oxygen or nitrogen, such as silicon oxide ($SiO_x$), silicon nitride ($SiN_x$), silicon oxynitride ($SiO_xN_y$) (x>y), or silicon nitride oxide ($SiN_xO_y$) (x>y); a film containing carbon such as diamond-like carbon (DLC); an organic material such as a siloxane resin, epoxy, polyimide, polyamide, polyvinyl phenol, benzocyclobutene, or acrylic; or the like can be used.

For the light-emitting layer 5270, an organic EL element, an inorganic EL element, or the like can be used, for example. For the organic EL element, for example, a single-layer structure or a layered structure of a hole injection layer formed using a hole injection material, a hole transport layer formed using a hole transport material, a light-emitting layer formed using a light-emitting material, an electron transport layer formed using an electron transport material, an electron injection layer formed using an electron injection material, or a layer in which a plurality of these materials are mixed can be used.

Note that an insulating layer which functions as an alignment film, an insulating layer which functions as a protrusion portion, or the like can be formed over the insulating layer 5305 and the conductive layer 5306.

Note that an insulating layer or the like which functions as a color filter, a black matrix, or a protrusion portion can be formed over the conductive layer 5308. An insulating layer which functions as an alignment film can be formed below the conductive layer 5308.

Note that the insulating layer 5269, the light-emitting layer 5270, and the conductive layer 5271 can be eliminated in the cross-sectional structure in FIG. 32A, and the liquid crystal layer 5307 and the conductive layer 5308 which are illustrated in FIG. 32B can be formed over the insulating layer 5267 and the conductive layer 5268.

Note that the liquid crystal layer 5307 and the conductive layer 5308 can be eliminated in the cross-sectional structure in FIG. 32B, and the insulating layer 5269, the light-emitting layer 5270, and the conductive layer 5271 which are illustrated in FIG. 32A can be formed over the insulating layer 5305 and the conductive layer 5306.

Note that in the cross-sectional structure in FIG. 32C, the insulating layer 5269, the light-emitting layer 5270, and the conductive layer 5271 which are illustrated in FIG. 32A can be formed over the insulating layer 5358 and the conductive layer 5359.

Alternatively, the liquid crystal layer 5307 and the conductive layer 5308 which are illustrated in FIG. 32B can be formed over the insulating layer 5267 and the conductive layer 5268.

The shift register in this embodiment can be used for the semiconductor device, shift register, or display device in Embodiments 1 to 8. In specific, in the case where a non-single crystal semiconductor, microcrystalline semiconductor, an organic semiconductor, an oxide semiconductor, or the like is used as a semiconductor layer of the transistor in FIG. 32B, the transistor deteriorates in some cases. In such a case too, deterioration of the transistor can be suppressed in the semiconductor, shift register, or display device in Embodiments 1 to 8.

[Embodiment 10]

In this embodiment, examples of electronic devices are described.

FIGS. 33A to 33H and FIGS. 34A to 34D are diagrams illustrating electronic devices. These electronic devices can each include a housing 5000, a display portion 5001, a speaker 5003, an LED lamp 5004, an operation key 5005, a connecting terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 5008, and the like.

Figure 33A:
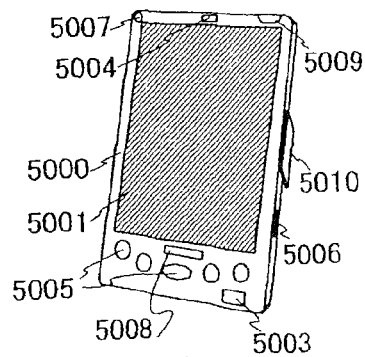
FIGS. 33A to 33H are diagrams illustrating electronic devices.
Figure 33B:
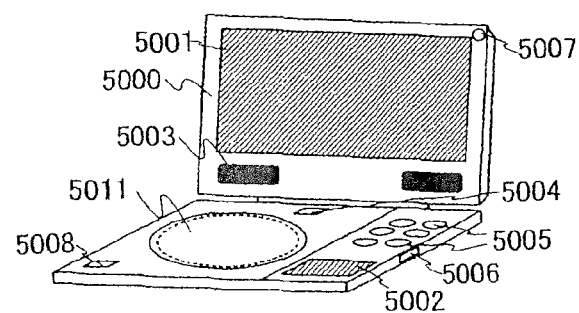
Figure 33C:
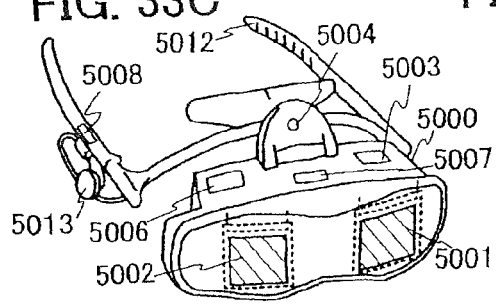
Figure 33D:
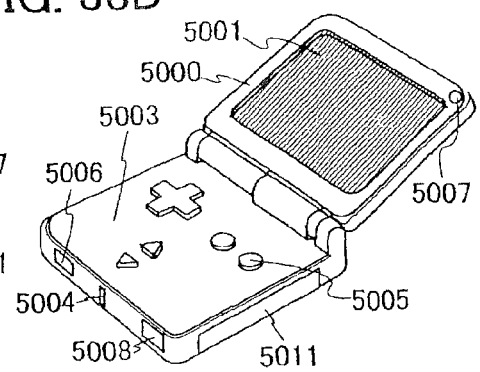
Figure 33E:
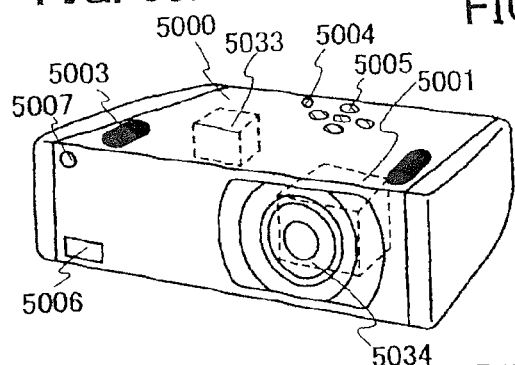
Figure 33F:
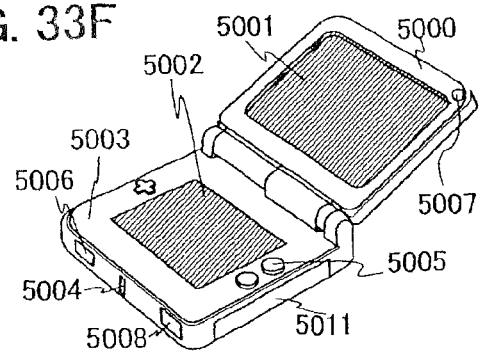
Figure 33G:
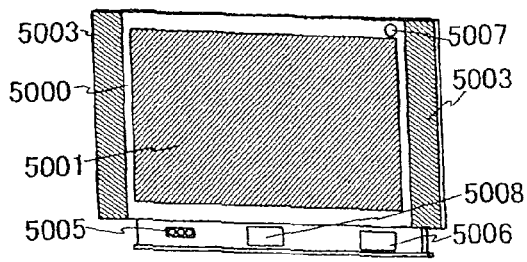
Figure 33H:
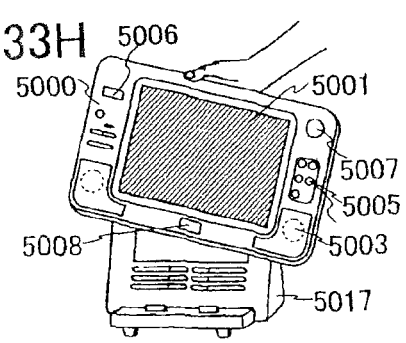
Figure 34A:
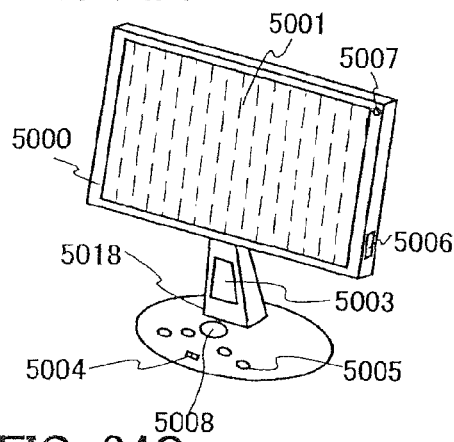
FIGS. 34A to 34H are diagrams illustrating electronic devices.
Figure 34B:
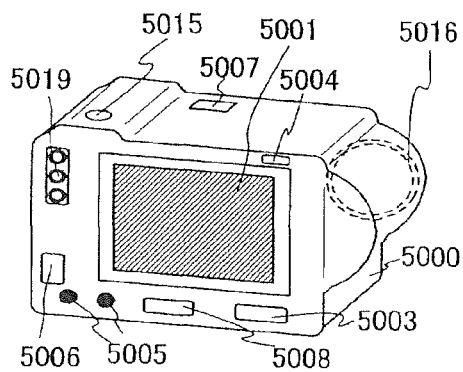
Figure 34C:
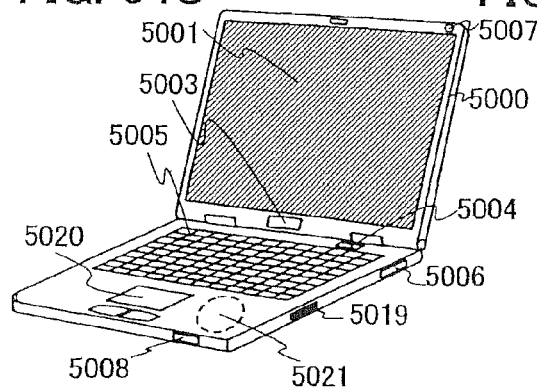
Figure 34D:
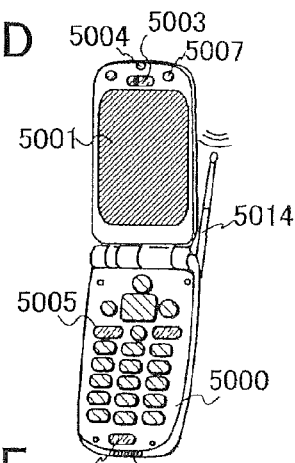

FIG. 33A is a mobile computer which can include a switch 5009, an infrared rays port 5010, and the like in addition to the above-described objects. FIG. 33B illustrates a portable image reproducing device (e.g., a DVD reproducing device) provided with a memory medium, which can include a second display portion 5002, a memory medium reading portion 5011, and the like in addition to the above objects. FIG. 33C illustrates a goggle-type display which can include the second display portion 5002, a supporting portion 5012, an earphone 5013, and the like in addition to the above objects. FIG. 33D illustrates a portable game machine which can include the memory medium reading portion 5011 and the like in addition to the above objects. FIG. 33E is a projector which can include a light source 5033, a projecting lens 5034, and the like in addition to the above-described objects. FIG. 33F is a portable game machine which can include a second display portion 5002, a memory medium reading portion 5011, and the like in addition to the above-described objects. FIG. 33G is a television receiver which can include a tuner, an image processing portion, and the like in addition to the above-described objects. FIG. 33H illustrates a portable television receiver which can include a charger 5017 which can transmit and receive signals and the like in addition to the above objects. FIG. 34A illustrates a display which can include a supporting board 5018 and the like in addition to the above objects. FIG. 34B is a camera which can include an external connecting port 5019, a shutter button 5015, an image receiver portion 5016, and the like in addition to the above-described objects. FIG. 34C is a computer which can include a pointing device 5020, an external connecting port 5019, a reader/writer 5021, and the like in addition to the above-described objects. FIG. 34D illustrates a mobile phone which can include an antenna 5014, a tuner of one-segment partial reception service for mobile phones and mobile terminals ("1seg"), and the like in addition to the above objects.

The electronic devices shown in FIGS. 33A to 33H and FIGS. 34A to 34D can have a variety of functions. For example, a function of displaying a variety of information (a still image, a moving image, a text image, and the like) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading program or data stored in a memory medium and displaying the program or data on a display portion can be given. Further, the electronic device including a plurality of display portions can have a function of displaying image information mainly on one display portion while displaying text information on another display portion, a function of displaying a three-dimensional image by displaying images where parallax is considered on a plurality of display portions, or the like. Furthermore, the electronic device including an image receiver portion can have a function of shooting a still image, a function of shooting a moving image, a function of automatically or manually correcting a shot image, a function of storing a shot image in a memory medium (an external memory medium or a memory medium incorporated in the camera), a function of displaying a shot image on the display portion, or the like. Note that functions which can be provided for the electronic devices shown in FIGS. 33A to 33H and FIGS. 34A to 34D are not limited thereto, and the electronic devices can have a variety of functions.

Electronic devices described in this embodiment are characterized by having a display portion for displaying some sort of information. By a combination of the electronic device in this embodiment and the semiconductor device, shift register, or display device in Embodiments 1 to 9, improvement in reliability, improvement in yield, reduction in cost, increase in the size of the display portion, increase in the definition of the display portion, or the like can be achieved.

Next, application examples of a semiconductor device are described.

Figure 34E:
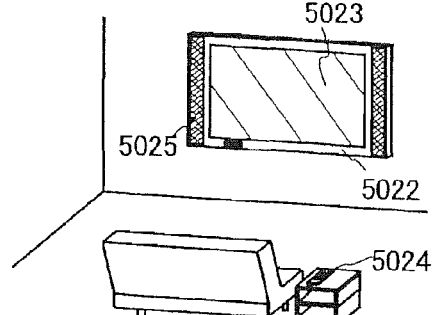

FIG. 34E shows an example in which a semiconductor device is provided so as to be integrated with a building. In FIG. 34E, a housing 5022, a display portion 5023, a remote controller device 5024 which is an operation portion, a speaker 5025, and the like are included. The semiconductor device is incorporated in the constructed object as a wall-hanging type and can be provided without requiring a large space.

Figure 34F:
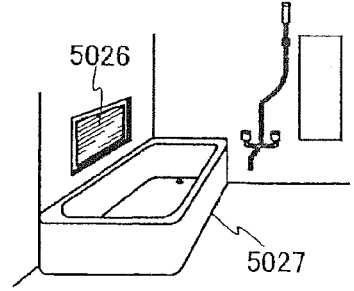

FIG. 34F illustrates an example where a semiconductor device is incorporated in a constructed object. The display panel 5026 is integrated with a prefabricated bath 5027, so that a person who takes a bath can watch the display panel 5026.

Note that although this embodiment gives the wall and the prefabricated bath as examples of the building, this embodiment is not limited to them and the semiconductor device can be provided in a variety of buildings.

Next, examples where a semiconductor device is incorporated with a moving object are described.

Figure 34G:
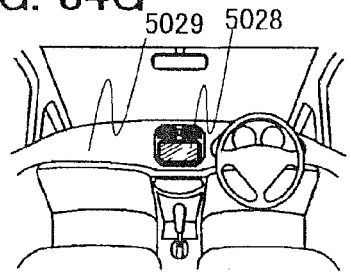

FIG. 34G illustrates an example in which the semiconductor device is provided in a vehicle. A display panel 5028 is provided in a body 5029 of the vehicle and can display information input from the operation of the body or the outside of the body on demand. Note that a navigation function may be provided.

Figure 34H:
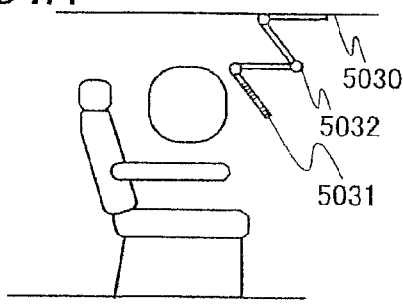

FIG. 34H shows an example in which the semiconductor device is provided so as to be integrated with a passenger airplane. FIG. 34H shows a usage pattern when a display panel 5031 is provided on a ceiling 5030 above a seat in the passenger airplane. The display panel 5031 is integrated with the ceiling 5030 through a hinge portion 5032, and a passenger can watch the display panel 5031 by extending and contracting the hinge portion 5032. The display panel 5031 has a function of displaying information when operated by the passenger.

Note that although this embodiment gives the body of the vehicle and the body of the plane as examples of the moving body, this embodiment is not limited thereto. The semiconductor device can be provided to a variety of moving bodies such as a two-wheel motor vehicle, a four-wheel vehicle (including a car, bus, and the like), a train (including a monorail, a railway, and the like), and a ship.

This application is based on Japanese Patent Application serial No. 2008-304124 filed with Japan Patent Office on Nov. 28, 2008, the entire contents of which are hereby incorporated by reference.

The invention claimed is:

1. A semiconductor device comprising:
a first transistor, a second transistor, and a third transistor each including a gate, a first terminal, and a second terminal;
a first conductive layer including the gate of the first transistor;
a second conductive layer including the gate of the second transistor;
a third conductive layer including the gate of the third transistor;
a fourth conductive layer including the first terminal of the first transistor;
a fifth conductive layer including the first terminal of the second transistor, the fifth conductive layer including the first terminal of the third transistor; and
a sixth conductive layer including the second terminal of the first transistor, the sixth conductive layer including the second terminal of the second transistor, and the sixth conductive layer including the second terminal of the third transistor,
wherein the first conductive layer and the sixth conductive layer overlap with each other in a first region,
wherein the first conductive layer and the fourth conductive layer overlap with each other in a second region,
wherein the second conductive layer and the sixth conductive layer overlap with each other in a third region,
wherein the second conductive layer and the fifth conductive layer overlap with each other in a fourth region,
wherein the third conductive layer and the sixth conductive layer overlap with each other in a fifth region,
wherein the third conductive layer and the fifth conductive layer overlap with each other in a sixth region,
wherein area of the first region is larger than area of the second region,
wherein area of the third region is smaller than area of the fourth region, and
wherein area of the fifth region is smaller than area of the sixth region.

2. The semiconductor device according to claim 1, further comprising:
a fourth transistor, a fifth transistor, a sixth transistor, and seventh transistor each including a gate, a first terminal, and a second terminal,
wherein the gate of the fourth transistor is electrically connected to the first terminal of the first transistor, the first terminal of the fourth transistor is electrically connected to the gate of the first transistor, and the second terminal of the fourth transistor is electrically connected to the second terminal of the first transistor,
wherein the first terminal of the fifth transistor is electrically connected to the gate of the first transistor,
wherein the gate of the sixth transistor is electrically connected to the gate of the first transistor, the first terminal of the sixth transistor is electrically connected to the first terminal of the fifth transistor, and the second terminal of the sixth transistor is electrically connected to the first terminal of the second transistor, and
wherein the gate of the seventh transistor is electrically connected to the gate of the third transistor, the first terminal of the seventh transistor is electrically connected to the gate of the first transistor, and the second terminal of the seventh transistor is electrically connected to the first terminal of the second transistor.

3. The semiconductor device according to claim 1, further comprising:
a capacitor including a first electrode and a second electrode,
wherein the first electrode is electrically connected to the gate of the first transistor, and
wherein the second electrode is electrically connected to the second terminal of the first transistor.

4. The semiconductor device according to claim 1, further comprising:
a capacitor including a first electrode and a second electrode, wherein the first electrode is electrically connected to the first terminal of the first transistor.

5. The semiconductor device according to claim 1, wherein a channel region of one of the first transistor, the second transistor and the third transistor comprises an oxide semiconductor.

6. The semiconductor device according to claim 1, wherein a channel region of one of the first transistor, the second transistor and the third transistor comprises amorphous silicon.

7. The semiconductor device according to claim 1, wherein a channel region of one of the first transistor, the second transistor and the third transistor comprises polycrystalline silicon.

8. A display module comprising:
the semiconductor device according to claim 1; and
an FPC.

9. An electric apparatus comprising:
the semiconductor device according to claim 1; and
at least one of an antenna, a microphone, a speaker, and a sensor.

10. A shift register comprising:
a first transistor, a second transistor, and a third transistor each including a gate, a first terminal, and a second terminal;
a first conductive layer including the gate of the first transistor;
a second conductive layer including the gate of the second transistor;
a third conductive layer including the gate of the third transistor;
a fourth conductive layer including the first terminal of the first transistor;
a fifth conductive layer including the first terminal of the second transistor, the fifth conductive layer including the first terminal of the third transistor; and
a sixth conductive layer including the second terminal of the first transistor, the sixth conductive layer including the second terminal of the second transistor, and the sixth conductive layer including the second terminal of the third transistor,
wherein the first conductive layer and the sixth conductive layer overlap with each other in a first region,
wherein the first conductive layer and the fourth conductive layer overlap with each other in a second region,
wherein the second conductive layer and the sixth conductive layer overlap with each other in a third region,
wherein the second conductive layer and the fifth conductive layer overlap with each other in a fourth region,
wherein the third conductive layer and the sixth conductive layer overlap with each other in a fifth region,
wherein the third conductive layer and the fifth conductive layer overlap with each other in a sixth region,
wherein area of the first region is larger than area of the second region,
wherein area of the third region is smaller than area of the fourth region, and
wherein area of the fifth region is smaller than area of the sixth region.

11. The shift register according to claim 10, further comprising:
a fourth transistor, a fifth transistor, a sixth transistor, and seventh transistor each including a gate, a first terminal, and a second terminal,
wherein the gate of the fourth transistor is electrically connected to the first terminal of the first transistor, the first terminal of the fourth transistor is electrically connected to the gate of the first transistor, and the second terminal of the fourth transistor is electrically connected to the second terminal of the first transistor,
wherein the first terminal of the fifth transistor is electrically connected to the gate of the first transistor,
wherein the gate of the sixth transistor is electrically connected to the gate of the first transistor, the first terminal of the sixth transistor is electrically connected to the first terminal of the fifth transistor, and the second terminal of the sixth transistor is electrically connected to the first terminal of the second transistor, and
wherein the gate of the seventh transistor is electrically connected to the gate of the third transistor, the first terminal of the seventh transistor is electrically connected to the gate of the first transistor, and the second terminal of the seventh transistor is electrically connected to the first terminal of the second transistor.

12. The shift register according to claim 10, further comprising:
a capacitor including a first electrode and a second electrode,
wherein the first electrode is electrically connected to the gate of the first transistor, and
wherein the second electrode is electrically connected to the second terminal of the first transistor.

13. The shift register according to claim 10, further comprising:
a capacitor including a first electrode and a second electrode, wherein the first electrode is electrically connected to the first terminal of the first transistor.

14. The shift register according to claim 10, wherein a channel region of one of the first transistor, the second transistor and the third transistor comprises an oxide semiconductor.

15. The shift register according to claim 10, wherein a channel region of one of the first transistor, the second transistor and the third transistor comprises amorphous silicon.

16. The shift register according to claim 10, wherein a channel region of one of the first transistor, the second transistor and the third transistor comprises polycrystalline silicon.

17. A display module comprising:
the shift register according to claim 10; and
an FPC.

18. An electric apparatus comprising:
the shift register according to claim 10; and
at least one of an antenna, a microphone, a speaker, and a sensor.

* * * * *